US012474788B2

(12) United States Patent
Powderly et al.

(10) Patent No.: US 12,474,788 B2
(45) Date of Patent: *Nov. 18, 2025

(54) SELECTING VIRTUAL OBJECTS IN A THREE-DIMENSIONAL SPACE

(71) Applicant: Magic Leap, Inc., Plantation, FL (US)

(72) Inventors: James M. Powderly, Ft. Lauderdale, FL (US); Savannah Niles, Ft. Lauderdale, FL (US); Frank Hamilton, Martinsburg, WV (US); Marshal A. Fontaine, St. Augustine, FL (US); Rony Abovitz, Weston, FL (US); Alysha Naples, London (GB)

(73) Assignee: MAGIC LEAP, INC., Plantation, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/744,145

(22) Filed: Jun. 14, 2024

(65) Prior Publication Data

US 2024/0329755 A1    Oct. 3, 2024

Related U.S. Application Data

(63) Continuation of application No. 18/346,722, filed on Jul. 3, 2023, now Pat. No. 12,056,293, which is a
(Continued)

(51) Int. Cl.
*G06F 3/0346* (2013.01)
*G06F 1/16* (2006.01)
(Continued)

(52) U.S. Cl.
CPC ............ *G06F 3/0346* (2013.01); *G06F 1/163* (2013.01); *G06F 3/011* (2013.01); *G06F 3/012* (2013.01);
(Continued)

(58) Field of Classification Search
CPC .......... G06F 1/163; G06F 3/011; G06F 3/012; G06F 3/013; G06F 3/016; G06F 3/017;
(Continued)

(56) References Cited

U.S. PATENT DOCUMENTS 5,590,268 A    12/1996  Doi et al.
5,952,993 A    9/1999   Matsuda et al.
(Continued)

FOREIGN PATENT DOCUMENTS

CN    1547131 A    11/2004
CN    1746821 A    3/2006
(Continued)

OTHER PUBLICATIONS

European Extended Search Report, re EP Application No. 24178132.7, dated Sep. 11, 2024, 11 pages.
(Continued)

*Primary Examiner* — Seth A Silverman
(74) *Attorney, Agent, or Firm* — KLINTWORTH & ROZENBLAT LLP

(57) ABSTRACT

Systems and methods for interacting with virtual objects in a three-dimensional space using a wearable system are disclosed. The wearable system can be programmed to permit user interaction with interactable objects in a field of regard (FOR) of a user. The FOR includes a portion of the environment around the user that is capable of being perceived by the user via the AR system. The system can determine a group of interactable objects in the FOR of the user and determine a pose of the user. The system can update, based on a change in the pose or a field of view (FOV) of the user, a subgroup of the interactable objects that are located in the FOV of the user and receive a selection of
(Continued)

a target interactable object from the subgroup of interactable objects. The system can initiate a selection event on the target interactable object.

17 Claims, 23 Drawing Sheets

Related U.S. Application Data continuation of application No. 17/981,311, filed on Nov. 4, 2022, now Pat. No. 11,733,786, which is a continuation of application No. 17/454,793, filed on Nov. 12, 2021, now Pat. No. 11,507,204, which is a continuation of application No. 16/682,794, filed on Nov. 13, 2019, now Pat. No. 11,175,750, which is a continuation of application No. 15/296,869, filed on Oct. 18, 2016, now Pat. No. 10,521,025.

(60) Provisional application No. 62/316,179, filed on Mar. 31, 2016, provisional application No. 62/301,422, filed on Feb. 29, 2016, provisional application No. 62/244,115, filed on Oct. 20, 2015.

(51) Int. Cl.
*G06F 3/01* (2006.01)
*G06F 3/04815* (2022.01)
*G06F 3/0482* (2013.01)
*G06F 3/04883* (2022.01)

(52) U.S. Cl.
CPC .............. *G06F 3/013* (2013.01); *G06F 3/016* (2013.01); *G06F 3/017* (2013.01); *G06F 3/04815* (2013.01); *G06F 3/0482* (2013.01); *G06F 3/04883* (2013.01)

(58) Field of Classification Search
CPC .. G06F 3/0346; G06F 3/04815; G06F 3/0482; G06F 3/04883
See application file for complete search history.

(56) References Cited

U.S. PATENT DOCUMENTS

| | | |
|---|---|---|
| 6,396,509 B1 | 5/2002 | Cheng |
| 6,532,007 B1 | 3/2003 | Matsuda |
| 6,771,294 B1 | 8/2004 | Pulli et al. |
| 6,850,221 B1 | 2/2005 | Tickle |
| 6,885,363 B2 | 4/2005 | Smith |
| D514,570 S | 2/2006 | Ohta |
| 7,457,733 B2 | 11/2008 | Maille et al. |
| 7,564,476 B1 | 7/2009 | Coughlan et al. |
| 7,834,846 B1 | 11/2010 | Bell |
| D658,094 S | 4/2012 | Dunn |
| 8,458,603 B2 | 6/2013 | Finn et al. |
| 8,466,931 B2 | 6/2013 | Finn et al. |
| 8,531,355 B2 | 9/2013 | Maltz |
| 8,593,510 B2 * | 11/2013 | Yoo ........................ G06F 3/017 348/51 |
| 8,854,433 B1 | 10/2014 | Rafii |
| 8,950,867 B2 | 2/2015 | Macnamara |
| 9,064,023 B2 | 6/2015 | Hyndman |
| 9,081,426 B2 | 7/2015 | Armstrong |
| 9,104,312 B2 | 8/2015 | Kay et al. |
| 9,122,053 B2 | 9/2015 | Geisner et al. |
| 9,176,579 B2 | 11/2015 | Hyndman et al. |
| 9,195,306 B2 | 11/2015 | Gomez |
| 9,202,313 B2 | 12/2015 | Bennet et al. |
| 9,215,293 B2 | 12/2015 | Miller |
| D752,529 S | 3/2016 | Loretan et al. |
| 9,292,973 B2 | 3/2016 | Bar-Zeev et al. |
| 9,310,559 B2 | 4/2016 | Macnamara |
| 9,310,611 B2 | 4/2016 | Forutanpour et al. |
| 9,319,632 B2 | 4/2016 | Kim et al. |
| 9,348,143 B2 | 5/2016 | Gao et al. |
| D758,367 S | 6/2016 | Natsume |
| D759,657 S | 6/2016 | Kujawski et al. |
| 9,360,933 B2 | 6/2016 | Anderson et al. |
| 9,384,594 B2 | 7/2016 | Maciocci et al. |
| 9,417,452 B2 | 8/2016 | Schowengerdt et al. |
| 9,437,170 B1 | 9/2016 | Quevedo Montesdeoca |
| 9,470,906 B2 | 10/2016 | Kaji et al. |
| 9,547,174 B2 | 1/2017 | Gao et al. |
| 9,645,397 B2 | 5/2017 | Da Veiga et al. |
| 9,671,566 B2 | 6/2017 | Abovitz et al. |
| D794,288 S | 8/2017 | Beers et al. |
| 9,740,006 B2 | 8/2017 | Gao |
| 9,791,700 B2 | 10/2017 | Schowengerdt |
| D805,734 S | 12/2017 | Fisher et al. |
| 9,851,563 B2 | 12/2017 | Gao et al. |
| 9,857,591 B2 | 1/2018 | Welch et al. |
| 9,874,749 B2 | 1/2018 | Bradski et al. |
| 9,928,661 B1 | 3/2018 | Kinstner et al. |
| 9,984,510 B1 | 5/2018 | Kinstner et al. |
| 9,990,774 B2 | 6/2018 | Mao |
| 10,078,919 B2 | 9/2018 | Powderly et al. |
| 10,203,762 B2 | 2/2019 | Bradski et al. |
| 10,417,831 B2 | 9/2019 | Powderly et al. |
| 10,466,794 B2 | 11/2019 | Maeda et al. |
| 10,510,191 B2 | 12/2019 | Powderly et al. |
| 10,521,025 B2 | 12/2019 | Powderly et al. |
| 10,627,625 B2 | 4/2020 | Hoover et al. |
| 10,629,003 B2 | 4/2020 | Miller et al. |
| 10,681,489 B2 | 6/2020 | Mangiat et al. |
| 10,733,806 B2 | 8/2020 | Powderly et al. |
| 10,768,693 B2 | 9/2020 | Powderly et al. |
| 10,838,484 B2 | 11/2020 | Naples et al. |
| 10,921,599 B2 | 2/2021 | Hoover et al. |
| 11,049,328 B2 | 6/2021 | Powderly et al. |
| 11,175,750 B2 | 11/2021 | Powderly et al. |
| 11,237,623 B2 | 2/2022 | Powderly et al. |
| 11,287,659 B2 | 3/2022 | Hoover et al. |
| 11,328,484 B2 | 5/2022 | Powderly et al. |
| 11,340,694 B2 | 5/2022 | Naples et al. |
| 11,507,204 B2 | 11/2022 | Powderly et al. |
| 11,657,579 B2 | 5/2023 | Powderly et al. |
| 2003/0169398 A1 | 9/2003 | Perrott et al. |
| 2003/0210227 A1 | 11/2003 | Smith |
| 2004/0113885 A1 | 6/2004 | Genc et al. |
| 2004/0164956 A1 | 8/2004 | Yamaguchi et al. |
| 2005/0096889 A1 | 5/2005 | Maille et al. |
| 2005/0275626 A1 | 12/2005 | Mueller et al. |
| 2006/0007304 A1 | 1/2006 | Anderson |
| 2006/0028436 A1 | 2/2006 | Armstrong |
| 2006/0183546 A1 | 8/2006 | Addington et al. |
| 2006/0197832 A1 | 9/2006 | Yamada et al. |
| 2007/0081123 A1 | 4/2007 | Lewis |
| 2007/0191112 A1 | 8/2007 | Ohta |
| 2007/0197287 A1 | 8/2007 | Shimizu |
| 2008/0211771 A1 | 9/2008 | Richardson |
| 2009/0066725 A1 | 3/2009 | Nogami et al. |
| 2009/0293012 A1 | 11/2009 | Alter et al. |
| 2010/0020080 A1 | 1/2010 | Iwanaga |
| 2010/0100509 A1 | 4/2010 | Johnston et al. |
| 2010/0125799 A1 | 5/2010 | Roberts et al. |
| 2010/0177117 A1 | 7/2010 | Finn et al. |
| 2010/0240988 A1 | 9/2010 | Varga et al. |
| 2010/0265182 A1 | 10/2010 | Ball et al. |
| 2010/0325572 A1 | 12/2010 | Morris et al. |
| 2011/0063286 A1 | 3/2011 | Roberts et al. |
| 2011/0122130 A1 | 5/2011 | Vesely et al. |
| 2011/0141043 A1 | 6/2011 | Soubrie |
| 2011/0161060 A1 | 6/2011 | Kim et al. |
| 2011/0191707 A1 | 8/2011 | Lee et al. |
| 2012/0002286 A1 | 1/2012 | Tanikawa |
| 2012/0013613 A1 | 1/2012 | Vesely |
| 2012/0022865 A1 | 1/2012 | Milstein |
| 2012/0056992 A1 | 3/2012 | Kuroda |
| 2012/0075343 A1 | 3/2012 | Chen et al. |
| 2012/0105486 A1 | 5/2012 | Lankford et al. |
| 2012/0113092 A1 | 5/2012 | Bar-Zeev et al. |
| 2012/0113223 A1 | 5/2012 | Hilliges et al. |

(56) References Cited

U.S. PATENT DOCUMENTS

| | | |
|---|---|---|
| 2012/0127062 A1 | 5/2012 | Bar-Zeev et al. |
| 2012/0127284 A1 | 5/2012 | Bar-Zeev et al. |
| 2012/0162549 A1 | 6/2012 | Gao et al. |
| 2012/0206452 A1 | 8/2012 | Geisner et al. |
| 2012/0210255 A1 | 8/2012 | Ooi et al. |
| 2012/0249416 A1 | 10/2012 | Maciocci et al. |
| 2012/0249590 A1 | 10/2012 | Maciocci et al. |
| 2012/0249741 A1 | 10/2012 | Maciocci et al. |
| 2012/0264510 A1 | 10/2012 | Wigdor et al. |
| 2012/0320080 A1 | 12/2012 | Giese et al. |
| 2013/0013229 A1 | 1/2013 | Norieda et al. |
| 2013/0044128 A1 | 2/2013 | Liu et al. |
| 2013/0046544 A1 | 2/2013 | Kay et al. |
| 2013/0073192 A1 | 3/2013 | Hota et al. |
| 2013/0082922 A1 | 4/2013 | Miller |
| 2013/0104085 A1 | 4/2013 | Mlyniec et al. |
| 2013/0117377 A1 | 5/2013 | Miller |
| 2013/0125027 A1 | 5/2013 | Abovitz |
| 2013/0155106 A1 | 6/2013 | Rolleston et al. |
| 2013/0174213 A1 | 7/2013 | Liu et al. |
| 2013/0208234 A1 | 8/2013 | Lewis |
| 2013/0215109 A1 | 8/2013 | Miesnieks et al. |
| 2013/0215230 A1 | 8/2013 | Miesnieks et al. |
| 2013/0235029 A1 | 9/2013 | Keough et al. |
| 2013/0242262 A1 | 9/2013 | Lewis |
| 2013/0246967 A1 | 9/2013 | Wheeler et al. |
| 2013/0285885 A1 | 10/2013 | Nowatzyk et al. |
| 2013/0321268 A1 | 12/2013 | Tuck et al. |
| 2013/0328925 A1 | 12/2013 | Latta et al. |
| 2014/0002351 A1 | 1/2014 | Nakayama |
| 2014/0003762 A1 | 1/2014 | Macnamara |
| 2014/0035959 A1 | 2/2014 | Lapstun |
| 2014/0063060 A1 | 3/2014 | Maciocci et al. |
| 2014/0071539 A1 | 3/2014 | Gao |
| 2014/0078175 A1 | 3/2014 | Forutanpour et al. |
| 2014/0125574 A1 | 5/2014 | Scavezze et al. |
| 2014/0129990 A1 | 5/2014 | Xin et al. |
| 2014/0132633 A1 | 5/2014 | Fekete et al. |
| 2014/0152558 A1 | 6/2014 | Salter et al. |
| 2014/0160157 A1 | 6/2014 | Poulos et al. |
| 2014/0168056 A1 | 6/2014 | Swaminathan et al. |
| 2014/0168261 A1 | 6/2014 | Margolis et al. |
| 2014/0168262 A1 | 6/2014 | Forutanpour et al. |
| 2014/0176607 A1 | 6/2014 | Yang et al. |
| 2014/0177023 A1 | 6/2014 | Gao et al. |
| 2014/0184588 A1 | 7/2014 | Cheng et al. |
| 2014/0184589 A1 | 7/2014 | Vesely |
| 2014/0191872 A1 | 7/2014 | Gomi et al. |
| 2014/0201674 A1 | 7/2014 | Holz |
| 2014/0204002 A1 | 7/2014 | Bennet et al. |
| 2014/0218468 A1 | 8/2014 | Gao et al. |
| 2014/0237366 A1 | 8/2014 | Poulos et al. |
| 2014/0240351 A1 | 8/2014 | Scavezze et al. |
| 2014/0258942 A1 | 9/2014 | Kutliroff et al. |
| 2014/0267228 A1 | 9/2014 | Ofek et al. |
| 2014/0267411 A1 | 9/2014 | Fein et al. |
| 2014/0267420 A1 | 9/2014 | Schowengerdt et al. |
| 2014/0282162 A1 | 9/2014 | Fein et al. |
| 2014/0292653 A1 | 10/2014 | Kamba et al. |
| 2014/0300565 A1 | 10/2014 | Anderson et al. |
| 2014/0306866 A1* | 10/2014 | Miller .................... H04L 67/10 |
| | | 345/8 |
| 2014/0306891 A1 | 10/2014 | Latta et al. |
| 2014/0306993 A1 | 10/2014 | Poulos et al. |
| 2014/0320389 A1 | 10/2014 | Scavezze et al. |
| 2014/0333666 A1 | 11/2014 | Poulos et al. |
| 2014/0354532 A1 | 12/2014 | Mullins |
| 2014/0364212 A1 | 12/2014 | Osman et al. |
| 2014/0372944 A1 | 12/2014 | Mulcahy et al. |
| 2014/0372957 A1 | 12/2014 | Keane et al. |
| 2014/0375683 A1 | 12/2014 | Salter et al. |
| 2014/0376773 A1* | 12/2014 | Holz .................... G06F 3/0304 |
| | | 382/103 |
| 2015/0007114 A1 | 1/2015 | Poulos et al. |
| 2015/0016777 A1 | 1/2015 | Abovitz et al. |
| 2015/0049018 A1 | 2/2015 | Gomez |
| 2015/0052479 A1 | 2/2015 | Ooi et al. |
| 2015/0061992 A1 | 3/2015 | Lamberty |
| 2015/0062003 A1 | 3/2015 | Rafii et al. |
| 2015/0062161 A1 | 3/2015 | Kim et al. |
| 2015/0091941 A1 | 4/2015 | Das et al. |
| 2015/0091943 A1 | 4/2015 | Lee et al. |
| 2015/0103306 A1 | 4/2015 | Kaji et al. |
| 2015/0116354 A1 | 4/2015 | Tomlin et al. |
| 2015/0138081 A1 | 5/2015 | Iwatsu et al. |
| 2015/0161762 A1 | 6/2015 | Fujiwara |
| 2015/0168731 A1 | 6/2015 | Robbins |
| 2015/0178939 A1 | 6/2015 | Bradski et al. |
| 2015/0187357 A1 | 7/2015 | Xia et al. |
| 2015/0193018 A1 | 7/2015 | Venable et al. |
| 2015/0193982 A1 | 7/2015 | Mihelich et al. |
| 2015/0205126 A1 | 7/2015 | Schowengerdt |
| 2015/0221115 A1 | 8/2015 | Matsubara |
| 2015/0221132 A1 | 8/2015 | Kruglick |
| 2015/0222863 A1 | 8/2015 | Kawakami |
| 2015/0222883 A1 | 8/2015 | Welch |
| 2015/0222884 A1 | 8/2015 | Cheng |
| 2015/0227194 A1 | 8/2015 | Kubota et al. |
| 2015/0227285 A1* | 8/2015 | Lee ...................... G06F 3/0488 |
| | | 715/765 |
| 2015/0231509 A1 | 8/2015 | Mcmain et al. |
| 2015/0235447 A1 | 8/2015 | Abovitz et al. |
| 2015/0243102 A1 | 8/2015 | Schowengerdt |
| 2015/0243104 A1 | 8/2015 | Schowengerdt |
| 2015/0243106 A1 | 8/2015 | Abovitz et al. |
| 2015/0262424 A1 | 9/2015 | Tabaka et al. |
| 2015/0268415 A1 | 9/2015 | Schowengerdt et al. |
| 2015/0268821 A1 | 9/2015 | Ramsby et al. |
| 2015/0286858 A1 | 10/2015 | Shaburov et al. |
| 2015/0302652 A1 | 10/2015 | Miller et al. |
| 2015/0304645 A1 | 10/2015 | Wilson et al. |
| 2015/0309263 A2 | 10/2015 | Abovitz et al. |
| 2015/0326570 A1 | 11/2015 | Publicover et al. |
| 2015/0338915 A1 | 11/2015 | Publicover et al. |
| 2015/0339468 A1 | 11/2015 | Son et al. |
| 2015/0341626 A1 | 11/2015 | Kim et al. |
| 2015/0346480 A1 | 12/2015 | Chen et al. |
| 2015/0346485 A1 | 12/2015 | Hayakawa et al. |
| 2015/0346490 A1 | 12/2015 | Tekolste et al. |
| 2015/0346495 A1 | 12/2015 | Welch et al. |
| 2015/0355805 A1 | 12/2015 | Chandler et al. |
| 2015/0378440 A1 | 12/2015 | Umlauf et al. |
| 2016/0011419 A1 | 1/2016 | Gao |
| 2016/0018885 A1 | 1/2016 | Kimura et al. |
| 2016/0026253 A1 | 1/2016 | Bradski et al. |
| 2016/0027217 A1 | 1/2016 | Da Veiga et al. |
| 2016/0027218 A1 | 1/2016 | Salter et al. |
| 2016/0042566 A1 | 2/2016 | Mao |
| 2016/0050345 A1 | 2/2016 | Longbotham et al. |
| 2016/0055676 A1 | 2/2016 | Kasahara et al. |
| 2016/0070108 A1 | 3/2016 | Nakada et al. |
| 2016/0112631 A1* | 4/2016 | Ackley .................. G01B 11/25 |
| | | 348/207.11 |
| 2016/0116979 A1 | 4/2016 | Border |
| 2016/0127624 A1 | 5/2016 | Woo et al. |
| 2016/0129344 A1 | 5/2016 | Shiina et al. |
| 2016/0140391 A1 | 5/2016 | Kim et al. |
| 2016/0148433 A1 | 5/2016 | Petrovskaya et al. |
| 2016/0178939 A1 | 6/2016 | Cheng et al. |
| 2016/0179336 A1 | 6/2016 | Ambrus et al. |
| 2016/0187974 A1 | 6/2016 | Mallinson |
| 2016/0188181 A1 | 6/2016 | Smith |
| 2016/0210276 A1 | 7/2016 | Kawano et al. |
| 2016/0210784 A1 | 7/2016 | Ramsby et al. |
| 2016/0246371 A1 | 8/2016 | Mullins |
| 2016/0246384 A1 | 8/2016 | Mullins et al. |
| 2016/0253842 A1 | 9/2016 | Shapira et al. |
| 2016/0343138 A1 | 11/2016 | Chew |
| 2016/0379408 A1 | 12/2016 | Wright et al. |
| 2017/0060230 A1* | 3/2017 | Faaborg .................. G06F 3/017 |
| 2017/0068323 A1 | 3/2017 | West et al. |
| 2017/0078825 A1 | 3/2017 | Mangiat et al. |
| 2017/0109936 A1 | 4/2017 | Powderly et al. |
| 2017/0169621 A1 | 6/2017 | Kawamoto et al. |

(56) References Cited

U.S. PATENT DOCUMENTS

| | | |
|---|---|---|
| 2017/0220225 A1 | 8/2017 | Joly et al. |
| 2017/0221264 A1 | 8/2017 | Perry |
| 2017/0273436 A1 | 9/2017 | Caulier et al. |
| 2017/0287218 A1 | 10/2017 | Nuernberger et al. |
| 2017/0287225 A1 | 10/2017 | Powderly et al. |
| 2017/0309079 A1 | 10/2017 | Naples et al. |
| 2017/0323158 A1 | 11/2017 | Gordon |
| 2017/0337742 A1 | 11/2017 | Powderly et al. |
| 2018/0045963 A1 | 2/2018 | Hoover et al. |
| 2018/0098059 A1 | 4/2018 | Valdivia et al. |
| 2018/0174366 A1 | 6/2018 | Nishibe et al. |
| 2018/0307303 A1 | 10/2018 | Powderly et al. |
| 2018/0342151 A1 | 11/2018 | Vanblon et al. |
| 2018/0357978 A1 | 12/2018 | Liao et al. |
| 2018/0365901 A1 | 12/2018 | Powderly et al. |
| 2019/0324634 A1 | 10/2019 | Gao et al. |
| 2019/0355180 A1 | 11/2019 | Powderly et al. |
| 2020/0013236 A1 | 1/2020 | Perez et al. |
| 2020/0042582 A1 | 2/2020 | Maerhufu et al. |
| 2020/0081555 A1 | 3/2020 | Powderly et al. |
| 2020/0082637 A1 | 3/2020 | Powderly et al. |
| 2020/0218074 A1 | 7/2020 | Hoover et al. |
| 2020/0327737 A1 | 10/2020 | Powderly et al. |
| 2020/0363865 A1 | 11/2020 | Powderly et al. |
| 2021/0011546 A1 | 1/2021 | Naples et al. |
| 2021/0208404 A1 | 7/2021 | Hoover et al. |
| 2021/0286483 A1 | 9/2021 | Josephson |
| 2022/0020218 A1 | 1/2022 | Powderly et al. |
| 2022/0075458 A1 | 3/2022 | Powderly et al. |
| 2022/0171453 A1 | 6/2022 | Powderly et al. |
| 2022/0179220 A1 | 6/2022 | Hoover et al. |
| 2022/0230404 A1 | 7/2022 | Powderly et al. |
| 2023/0057175 A1 | 2/2023 | Powderly et al. |

FOREIGN PATENT DOCUMENTS

| | | |
|---|---|---|
| CN | 101010700 A | 8/2007 |
| CN | 102193631 A | 9/2011 |
| CN | 102405453 A | 4/2012 |
| CN | 102419631 A | 4/2012 |
| CN | 103460256 A | 12/2013 |
| CN | 103713737 A | 4/2014 |
| CN | 104067316 A | 9/2014 |
| CN | 104137044 A | 11/2014 |
| CN | 104641319 A | 5/2015 |
| CN | 104932679 A | 9/2015 |
| CN | 105264461 A | 1/2016 |
| CN | 105283825 A | 1/2016 |
| CN | 105324736 A | 2/2016 |
| CN | 105339870 A | 2/2016 |
| CN | 105378625 A | 3/2016 |
| CN | 106104361 A | 11/2016 |
| EP | 1816552 A2 | 8/2007 |
| EP | 1837741 A2 | 9/2007 |
| EP | 2767953 A1 | 8/2014 |
| EP | 2784632 A2 | 10/2014 |
| EP | 3015954 A1 | 5/2016 |
| EP | 3118722 A1 | 1/2017 |
| EP | 3665550 A1 | 6/2020 |
| GB | 2376397 A | 12/2002 |
| JP | H04372012 A | 12/1992 |
| JP | H06337884 A | 12/1994 |
| JP | H0962864 A | 3/1997 |
| JP | H09222949 A | 8/1997 |
| JP | H11264929 A | 9/1999 |
| JP | H11288342 A | 10/1999 |
| JP | 2001522498 A | 11/2001 |
| JP | 2002170131 A | 6/2002 |
| JP | 2004110112 A | 4/2004 |
| JP | 2005222103 A | 8/2005 |
| JP | 2006126936 A | 5/2006 |
| JP | 2007222284 A | 9/2007 |
| JP | 2008307091 A | 12/2008 |
| JP | 2009069918 A | 4/2009 |
| JP | 2009070139 A | 4/2009 |
| JP | 2009151419 A | 7/2009 |
| JP | 2009187426 A | 8/2009 |
| JP | 2009237863 A | 10/2009 |
| JP | 2009295031 A | 12/2009 |
| JP | 2010218195 A | 9/2010 |
| JP | 2010238098 A | 10/2010 |
| JP | 2010279742 A | 12/2010 |
| JP | 2011059071 A | 3/2011 |
| JP | 2011123896 A | 6/2011 |
| JP | 2011159273 A | 8/2011 |
| JP | 2011528476 A | 11/2011 |
| JP | 2012059263 A | 3/2012 |
| JP | 2012084146 A | 4/2012 |
| JP | 2012108842 A | 6/2012 |
| JP | 2012155678 A | 8/2012 |
| JP | 2012168798 A | 9/2012 |
| JP | 2013054661 A | 3/2013 |
| JP | 2013131222 A | 7/2013 |
| JP | 2013145455 A | 7/2013 |
| JP | 2013152711 A | 8/2013 |
| JP | 2013218597 A | 10/2013 |
| JP | 2013222354 A | 10/2013 |
| JP | 2013541058 A | 11/2013 |
| JP | 2014017776 A | 1/2014 |
| JP | 2014085954 A | 5/2014 |
| JP | 2014093090 A | 5/2014 |
| JP | 2014134922 A | 7/2014 |
| JP | 2014174747 A | 9/2014 |
| JP | 2014182719 A | 9/2014 |
| JP | 2014186361 A | 10/2014 |
| JP | 2014531662 A | 11/2014 |
| JP | 2015503141 A | 1/2015 |
| JP | 2015114757 A | 6/2015 |
| JP | 2015133088 A | 7/2015 |
| JP | 2015155959 A | 8/2015 |
| JP | 2015524110 A | 8/2015 |
| JP | 2015536514 A | 12/2015 |
| JP | 2016029591 A | 3/2016 |
| JP | 2016031650 A | 3/2016 |
| JP | 2016506565 A | 3/2016 |
| JP | 2016507112 A | 3/2016 |
| JP | 2016508257 A | 3/2016 |
| JP | 2016516241 A | 6/2016 |
| JP | 2016522463 A | 7/2016 |
| JP | 5985116 B1 | 9/2016 |
| JP | 2016530600 A | 9/2016 |
| JP | 2017500673 A | 1/2017 |
| JP | WO2014208689 A1 | 2/2017 |
| JP | WO2015059976 A1 | 3/2017 |
| JP | WO 2015156149 A1 | 4/2017 |
| JP | WO2016013272 A1 | 4/2017 |
| JP | 2017526030 A | 9/2017 |
| JP | 2018517967 A | 7/2018 |
| JP | 7149289 B2 | 10/2022 |
| JP | 2023097014 A | 7/2023 |
| KR | 20010012091 A | 2/2001 |
| KR | 20050087377 A | 8/2005 |
| KR | 20120106519 A | 9/2012 |
| KR | 20140090683 A | 7/2014 |
| KR | 20140093970 A | 7/2014 |
| KR | 20140147378 A | 12/2014 |
| KR | 20150025115 A | 3/2015 |
| KR | 20150084485 A | 7/2015 |
| KR | 20150092165 A | 8/2015 |
| KR | 20150095868 A | 8/2015 |
| KR | 20150140807 A | 12/2015 |
| KR | 20150143659 A | 12/2015 |
| KR | 20160023888 A | 3/2016 |
| WO | WO 2012098621 A1 | 7/2012 |
| WO | WO2012135546 A1 | 10/2012 |
| WO | WO2013028813 A1 | 2/2013 |
| WO | WO2013093906 A1 | 6/2013 |
| WO | WO2014085789 A1 | 6/2014 |
| WO | WO2014093477 A1 | 6/2014 |
| WO | WO2014099231 A2 | 6/2014 |
| WO | WO2014/126966 A1 | 8/2014 |
| WO | WO2014128507 A2 | 8/2014 |
| WO | WO2014129105 A1 | 8/2014 |
| WO | WO2014158928 A2 | 10/2014 |

(56) References Cited

FOREIGN PATENT DOCUMENTS

| | | | |
|---|---|---|---|
| WO | WO2014164901 A1 | 10/2014 |
| WO | WO2014168901 A1 | 10/2014 |
| WO | WO2014168995 A1 | 10/2014 |
| WO | WO2014190099 A1 | 11/2014 |
| WO | WO2014197387 A1 | 12/2014 |
| WO | WO2014204755 A1 | 12/2014 |
| WO | WO2014208689 A1 | 12/2014 |
| WO | WO2014209772 A1 | 12/2014 |
| WO | WO2015051047 A1 | 4/2015 |
| WO | WO2015059976 A1 | 4/2015 |
| WO | WO2015126987 A1 | 8/2015 |
| WO | WO2015161307 A1 | 10/2015 |
| WO | WO2015192117 A1 | 12/2015 |
| WO | WO2016023123 A1 | 2/2016 |
| WO | WO2016031358 A1 | 3/2016 |
| WO | WO2016203792 A1 | 12/2016 |
| WO | WO2017034667 A1 | 3/2017 |
| WO | WO2017070121 A1 | 4/2017 |
| WO | WO2017131970 A1 | 8/2017 |
| WO | WO2017172982 A1 | 10/2017 |
| WO | WO2017184604 A1 | 10/2017 |
| WO | WO2017201329 A1 | 11/2017 |
| WO | WO2018031621 A1 | 2/2018 |
| WO | WO2018195099 A1 | 10/2018 |
| WO | WO2019067902 A1 | 4/2019 |

OTHER PUBLICATIONS

Japanese search report issued in connection with application No. 2023-97014 dated May 20, 2024, 48 pages.
Japanese search report issued in connection with application No. 2023-1014 dated Jan. 31, 2024, 59 pages.
Japanese search report issued in connection with JP application No. 2019-507143 dated Oct. 7, 2020, 60 pages.
Japanese search report issued in connection with JP application No. 2022-049399 Apr. 26, 2023, 62 pages.
Japanese search report issued in connection with JP application No. 2019-555935 dated Mar. 11, 2022, 41 pages.
Japanese search report issued in connection with JP application No. 2022-104508 Jun. 20, 2023, 42 pages.
International Search Report and Written Opinion for PCT Application No. PCT/US2018/028002 dated Aug. 23, 2018.
Invitation to Pay Additional Fees and Where Applicable Protest Fee for PCT Application No. PCT/US16/57554 dated Dec. 30, 2016.
Invitation to Pay Additional Fees for PCT Application No. PCT/US2018/028002 dated May 31, 2018.
International Search Report and Written Opinion for PCT Application No. PCT/US17/33399 dated Aug. 14, 2017.
International Search Report and Written Opinion for PCT Application No. PCT/US2017/024844, dated Jun. 22, 2017.
International Search Report and Written Opinion for PCT Application No. PCT/US2017/028297, mailed Jun. 29, 2017 (MLEAP.028W05).
International Preliminary Report on Patentability for PCT Application No. PCT/US2017/024844, dated Apr. 6, 2018.
International Preliminary Report on Patentability for PCT Application No. PCT/US2017/028297, issued Oct. 23, 2018 (MLEAP.028W05).
European Extended Search Report, re EP Application No. 17776592.2, dated Oct. 30, 2019.
U.S. Appl. No. 14/331,218, filed Jul. 14, 2014, Abovitz et al.
U.S. Appl. No. 14/555,585, filed Nov. 27, 2014, Schowengerdt.
European Extended Search Report, re EP Application No. 17786528.4, dated Sep. 24, 2019. (MLEAP.028EP5).
U.S. Appl. No. 62/005,807, filed May 30, 2014, Klug et al.
U.S. Appl. No. 62/012,273, filed Jun. 14, 2014, Bradski.
U.S. Appl. No. 14/212,961, filed Mar. 14, 2014, Schowengerdt et al.
U.S. Appl. No. 14/641,376, filed Mar. 7, 2015, Bradski et al.
U.S. Appl. No. 14/690,401, filed Apr. 18, 2015, Miller et al.

Watanabe It turns to the design of the multi-modal inquiry language in wisdom beauty, other 1 person, and virtual world database system, and is IEICE Technical Report, JP, Institute of Electronics, Information and Communication Engineers, Jul. 11, 2001, vol. 101 No. 192,121-128.
Chinese search report issued in connection with CN application No. 201680074220.6 dated Feb. 6, 2020, 1 page.
Chinese search report issued in connection with CN application No. 201780033339.3 dated Oct. 8, 2021, 1 page.
Chinese search report issued in connection with CN application No. 201780044955.9 dated Jan. 25, 2021, 1 page.
Chinese search report issued in connection with CN application No. 201780062338.1 dated Sep. 8, 2021, 1 page.
Chinese search report issued in connection with CN application No. 201880040284.3 dated Jun. 24, 2020, 1 page.
European Search Report, re EP Application No. 21165266.4 dated Jul. 9, 2021, 14 pages.
European Extended Search Report, re EP Application No. EP17800195.4 dated Jan. 23, 2020, 11 pages.
European Search Report, re EP Application No. EP22171762.2 dated Aug. 3, 2022, 08 pages.
European Extended Search Report, re EP Application No. EP17840184.0 dated Feb. 24, 2020, 09 pages.
European Extended Search Report, re EP Application No. EP18788499.4 dated Aug. 25, 2020, 09 pages.
European Search Report, re EP Application No. EP23177854.9 dated Jun. 26, 2023, 12 pages.
Japanese search report issued in connection with JP application No. 2018-519943 dated Aug. 21, 2020, 52 pages.
Japanese search report issued in connection with JP application No. 2021-012808 Jan. 28, 2022, 35 pages.
Japanese search report issued in connection with JP application No. 2018-550396 dated Feb. 10, 2021, 72 pages.
Japanese search report issued in connection with JP application No. 2023-001014 Jan. 31, 2024, 59 pages.
Japanese search report issued in connection with JP application No. 2018-560645 dated Mar. 31, 2021, 447 pages.
Japanese search report issued in connection with JP application No. 2020-105691 Apr. 16, 2021, 25 pages.
Japanese search report issued in connection with JP application No. 2021-119483 Jul. 28, 2022, 33 pages.
Azuma, "Predictive Tracking for Augmented Reality," TR95-007, Department of Computer Science, UNC-Chapel Hill, NC, Feb. 1995.
Z-Targeting, Z-targeting/Zelapedia/Fandom powered by Wikia. Retrieved from "https://zelda.fandom.com/wiki/Z-targeting?oldid=538812".
"Volume ray casting", Wikipedia, accessed Nov. 1, 2015, in 4 pages. URL: https://en.wikipedia.org/wiki/Volume_ray_casting.
"Speech Recognition", Wikipedia, accessed Jun. 10, 2016, in 19 pages. URL: https://en.wikipedia.org/wiki/Speech_recognition.
Wikipedia: "Simultaneous localization and mapping", Wikipedia, accessed Oct. 22, 2015, in 7 pages. URL: https://en.wikipedia.org/wiki/Simultaneous_localization_and_mapping.
Wikipedia: "Field of view", Wikipedia, retrieved Nov. 1, 2015, in 5 pages. URL: https://en.wikipedia.org/wiki/Field_of_view.
Wikipedia: "Ray casting", Wikipedia, accessed Nov. 1, 2015, in 4 pages. URL: https://en.wikipedia.org/wiki/Ray_casting.
"Cone Tracing," Wikipedia, accessed Nov. 1, 2015, in 3 pages. URL: https:/en.wikipedia.org/wiki/Cone_tracing.
"Augmented cognition", Wikipedia, printed Aug. 6, 2016, in 4 pages. URL: https://en.wikipedia.org/wiki/Augmented_cognition.
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).
Shumin, Z. et al, "Manual and Gaze Input Cascaded (MAGIC) Pointing", In Proceedings of CHI '99: ACM Conference on Human Factors in Computing Systems, May 1999, in 8 pages.
Sadshark, "Useful Shortcut Keys List—Eve Online," reddit.com, available: Jun. 27, 2013, https://www.reddit.com/r/Eve/comments/1gq0eu/useful_shortcut_keys_list/, https://web.archive.org/web/

(56) References Cited

OTHER PUBLICATIONS

20130627085144/https://www.reddit.com/r/Eve/comments/1gq0eu/useful_shortcut_keys_list/ (Year: 2013).
Melder, N. et al., "Translation and Rotation of Multi-Point Contacted Virtual Objects", Proceedings of the WorldHaptics Conference, 2003, in 10 pages.
Marti, S., "Put That There", YouTube, published Oct. 25, 2006, accessed Apr. 12, 2017, in 1 page. URL: https://www.youtube.com/watch?v=PeWwfhsSqsc.
Karlsson, N. et al., "The vSLAM Algorithm for Robust Localization and Mapping", Proc. of Int. Conf. on Robotics and Automation (IRCA), Jan. 2005, in 6 pages.
Kaiser, E. et al., "Mutual Disambiguation of 3D Multimodal Interaction in Augmented and Virtual Reality", Proceedings of the 5th international Conference on Multimodal Interfaces, 2003, in 9 pages. URL: http://www.academia.edu/download/307 44 360/p128-kaiser.pdf.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Heidemann, G. et al., "Multimodal Interaction in an Augmented Reality Scenario", Proceedings of the 6th International Conference on Multimodal Interfaces, 2004, in 8 pages. URL: https://ni.www.techfak.uni-bielefeld.de/files/heidemann_ba_bekel_etal_ICMI04_reprint.pdf.
Graves, A. et al., "Towards End-to-End Speech Recognition with Recurrent Neural Networks", Proceedings of the 31st International Conference on Machine Learning, vol. 32, Jun. 2014, in 9 pages.
Gawande, S. et al., "Neural Network based Hand Gesture Recognition", International Journal of Emerging Research in Management and Technology, Mar. 2013, in 5 pages.
"Kinect Sensor", Microsoft Corporation, 2012, printed Apr. 11, 2016, in 5 pages. URL: https://msdn.microsoft.com/enus/library/hh438998(d=printer).asp.
ARToolKit: https://web.archive.org/web/20051013062315/http://www.hitl.washington.edu:80/artoolkit/documentation/hardware.htm, archived Oct. 13, 2005.
Bernsen, "Speech and 2D deictic gesture reference to virtual scenes," In: International Tutorial Research Workshop on Perception and Interactive Technologies for Speech-Based Systems, Jun. 19, 2006.
Bimber, et al., "Spatial Augmented Reality—Merging Real and Virtual Worlds," 2005 https://web.media.mit.edu/raskar/book/BimberRaskarAugmentedRealityBook.pdf.
Bowman, D.A., et al.: "An Evaluation of techniques for Grabbing and Manipulating Report Objects in Immersive Virtual Environments." Proceedings of 1997 Symposium on Interactive 3D Graphics Apr. 27-30, 1997, Providence, RI, USA.
Cashion, J., "Intelligent Selection Techniques for Virtual Environments", Dissertation, University of Central Florida, Dec. 2014, in 198 pages.
Christoforou, C. et al., "From the eyes and the heart: a novel eye-gaze metric that predicts video preferences of a large audience", Frontiers in Psychology, vol. 6: 579, published online May 12, 2015, in 14 pages. URL: http://www.ncbi.nlm.nih.gov/pmc/articles/PMC4428128/.
Cox, "PS3 controller makes move on Android games," The A Register, Aug. 9, 2011, theregister.co.uk, https://www.theregister.co.uk/2011/08/09/ps3_controller_gets_android_support/ (Year: 2011).
Slambekova, et al., "Gaze and gesture based object manipulation in virtual worlds," Virtual Reality Software and Technology, ACM, 2 Penn Plaza, Suite 701, NY, NY, Dec. 10, 2012.
Debarba et al., "Disambiguation Canvas: a precise selection technique for virtual environments", Lecture Notes in Computer Science, vol. 8119. Springer, Berlin, Heidelberg, Sep. 2013.
European Extended Search Report re EP Application No. 16858075.1 dated May 9, 2019.
Bolt, R., "'Put-That-There': Voice and Gesture at the Graphics Interface", ACM SIGGRAPH Computer Graphics, Proceedings of the 7th annual Conference on Computer Graphics and Interactive Techniques, vol. 14, Jul. 1980, pp. 262-270, in 9 pages.
Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.
Maimone, A. et al., "Computational Augmented Reality Eyeglasses", 2013 IEEE International Symposium on Mi ed and Augmented Reality, 2013, in 10 pages. URL: https://pdfs.semanticscholar.org/31cf/7b9bbc9199b0432483789ec65d81 e64e4ddc.pdf.
International Search Report and Written Opinion for PCT Application No. PCT/US2017/46034 dated Oct. 18, 2017.
International Preliminary Report on Patentability for PCT Application No. PCT/US16/57554 dated Apr. 24, 2018.
International Preliminary Report on Patentability for PCT Application No. PCT/US17/33399 dated Nov. 20, 2018.
International Preliminary Report on Patentability for PCT Application No. PCT/US2017/46034 dated Feb. 12, 2019.
International Preliminary Report on Patentability for PCT Application No. PCT/US2018/028002 dated Oct. 22, 2019.
International Search Report and Written Opinion for PCT Application No. PCT/US16/57554 dated Mar. 2, 2017.
Markus Rader et al: "MobiZone", Mobile and Ubiquitous Multimedia, ACM, 2 Penn Plaza, Suite 701 New York NY 10121-0701 USA, Dec. 2, 2013 (Dec. 2, 2013), pp. 1-10, XP058036362, DOI: 10.1145/2541831.2541836 ISBN: 978-1-4503-2648-3.
European Extended Search Report, re EP Application No. 24187288.6, dated Oct. 15, 2024, 09 pages.
Declaration of Dr. Douglas A. Bowman Under 37 C. F.R. § 1132 including Appendix A (List of Materials Considered) and Appendix B (Curriculum Vitae) and Incorporated Claim Charts CC-1-CC-12.
S. Feiner et al., "A touring machine prototyping 3D mobile augmented reality systems for exploring the urban environment," Digest of Papers. First International Symposium on Wearable Computers, Cambridge, M.A, USA, pp. 74-81 (1997) ("Feiner").
P. Milgram and F. Kishino, "A Taxonomy of Mixed Reality Visual Displays," IEICE Transactions on Information and Systems, vol. E77-D, No. 12, p. 1321-29, Dec. 1994.
R. Azuma, "A Survey of Augmented Reality," Presence: Teleoperators and Virtual Environments, vol. 6, No. 4, p. 355-385, Aug. 1997.
S. Benford, et al., "Understanding and Constructing Shared Spaces with Mixed-Reality Boundaries," ACM Transactions on Computer-Human Interaction, vol. 5, No. 3, p. 185-223, Sep. 1998.
M. Billinghurst, et al., "The MagidBook a transitional AR interface," Computers & Graphics, vol. 25, No. 5, p. 745-53, Oct. 2001.
J. Carmigniani, et al., "Augmented reality technologies, systems and applications," Multimedia Tools and Applications, vol. 51, No. 1, p. 341-377, Dec. 2010.
D. Schmalstieg, et al., "The Studierstube Augmented Reality Project," Presence, vol. 11 No. 1, p. 33-54, Feb. 2002.
B. Ullmer, "Models and Mechanisms for Tangible User Interfaces," PhD Diss., Massachusetts Institute of Technology (Jun. 1997).
B. Ullmer and H. Ishii, "Emerging frameworks for tangible user interfaces," IBM Systems Journal, vol. 39, Nos. 3 & 4, pp. 915-931 (2000).
T. Hollerer, "User Interfaces for Mobile Augmented Reality Systems," PhD Diss., Columbia University (2004).
P. Antoniac, "Augmented Reality Based User Interface for Mobile Applications and Services," University of Oulu (Jun. 2005).
M. Levoy and R. Whitaker, "Gaze-Directed Volume Rendering," 13D '90: Proceedings of the 1990 Symposium on Interactive 3D Graphics, p. 217-223, Feb. 1990.
T. Ohshima et al., "Gaze-Directed Adaptive Rendering for Interacting with Virtual Space," Proceedings of the IEEE 1996 Virtual Reality Annual International Symposium, p. 103-110, 1996.
H. Zha et al, "Dynamic Gaze-Controlled Levels of Detail of Polygonal Objects in 3-D Environment Modeling," Second International Conference on 3-D Digital Imaging and Modeling 1999, p. 321-330, 1999.
M. Reddy, "Perceptualiy Optimized 30 Graphics," IEEE Computer Graphics and Applications 21, No. 5, p. 68-75, Jul.-Aug. 2001.
L. C. Loschky et al., "Perceptual Effects of a Gaze-Contingent Multi-Resolution Display Based on a Model of Visual Sensitivity,"

(56) References Cited

OTHER PUBLICATIONS

Proceedings of the ARL Federated Laboratory 5th Annual Symposium—ADID Consortium, p. 53-58, 2001.
L. C. Loschky and G. S. Wolverton, "How Late Can You Update Gaze-Contingent Multi-Resolutional Displays Without Detection?," ACM Transactions on Multimedia Computing, Communications, and Applications 3, No. 4, Art. 7, p. 1-10, 2007.
A.T. Duchowski and A. Coltekin, "Foveated Gaze-Contingent Displays for Peripheral LOD Management, 3D Visualization, and Stereo Imaging," ACM Transactions on Multimedia Computing, Communications, and Applications 3, No. 4, Art. 6, p. 1-18, 2007.
Request for Reexamination of U.S. Pat. No. 11,507,204 dated Dec. 23, 2024, Assigned Reexamination Control No. 90/019,786.
Claim Chart 1 (CC-1) filed with Request for Reexamination of U.S. Pat. No. 11,507,204 dated Dec. 23, 2024.
Claim Chart 2 (CC-2) filed with Request for Reexamination of U.S. Pat. No. 11,507,204 dated Dec. 23, 2024.
Claim Chart 3 (CC-3) filed with Request for Reexamination of U.S. Pat. No. 11,507,204 dated Dec. 23, 2024.
Claim Chart 4 (CC-4) filed with Request for Reexamination of U.S. Pat. No. 11,507,204 dated Dec. 23, 2024.
Claim Chart 5 (CC-5) filed with Request for Reexamination of U.S. Pat. No. 11,507,204 dated Dec. 23, 2024.
Claim Chart 6 (CC-6) filed with Request for Reexamination of U.S. Pat. No. 11,507,204 dated Dec. 23, 2024.
Claim Chart 7 (CC-7) filed with Request for Reexamination of U.S. Pat. No. 11,507,204 dated Dec. 23, 2024.
Claim Chart 8 (CC-8) filed with Request for Reexamination of U.S. Pat. No. 11,507,204 dated Dec. 23, 2024.
Claim Chart 9 (CC-9) filed with Request for Reexamination of U.S. Pat. No. 11,507,204 dated Dec. 23, 2024.
Claim Chart 10 (CC-10) filed with Request for Reexamination of U.S. Pat. No. 11,507,204 dated Dec. 23, 2024.
Claim Chart 11 (CC-11) filed with Request for Reexamination of U.S. Pat. No. 11,507,204 dated Dec. 23, 2024.
Claim Chart 12 (CC-12) filed with Request for Reexamination of U.S. Pat. No. 11,507,204 dated Dec. 23, 2024.

* cited by examiner

SELECTING VIRTUAL OBJECTS IN A THREE-DIMENSIONAL SPACE

CROSS-REFERENCE TO RELATED APPLICATIONS

This application is a continuation application of U.S. application Ser. No. 18/346,722, filed Jul. 3, 2023. U.S. application Ser. No. 18/346,722 is a continuation application of U.S. application Ser. No. 17/981,311, filed Nov. 4, 2022. U.S. application Ser. No. 17/981,311 is a continuation application of U.S. patent application Ser. No. 17/454,793, filed Nov. 12, 2021. U.S. patent application Ser. No. 17/454,793 is a continuation application of U.S. patent application Ser. No. 16/682,794, filed on Nov. 13, 2019. U.S. patent application Ser. No. 16/682,794 is a continuation application of U.S. patent application Ser. No. 15/296,869, filed on Oct. 18, 2016. U.S. patent application Ser. No. 15/296,869 is a nonprovisional application of U.S. Provisional Patent Application No. 62/244,115, filed on Oct. 20, 2015; U.S. Provisional Application No. 62/301,422, filed on Feb. 29, 2016; and U.S. Provisional Application No. 62/316,179, filed on Mar. 31, 2016. This application claims priority to each of U.S. application Ser. No. 18/346,722, U.S. application Ser. No. 17/981,311, U.S. patent application Ser. No. 17/454,793, U.S. patent application Ser. No. 16/682,794, U.S. patent application Ser. No. 15/296,869, U.S. Provisional Patent Application No. 62/244,115, U.S. Provisional Application No. 62/301,422, and U.S. Provisional Application No. 62/316,179, each of which is additionally incorporated herein by reference.

TECHNICAL FIELD

The present disclosure relates to virtual reality, augmented reality, and mixed reality imaging and visualization systems and in particular to systems for interacting with virtual objects in the three-dimensional (3D) space.

BACKGROUND

Modern computing and display technologies have facilitated the development of systems for so called "virtual reality", "augmented reality", or "mixed reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user; an mixed reality, or "MR", related to merging real and virtual worlds to produce new environments where physical and virtual objects co-exist and interact in real time. As it turns out, the human visual perception system is very complex, and producing a VR, AR, or MR technology that facilitates a comfortable, natural-feeling, rich presentation of virtual image elements amongst other virtual or real-world imagery elements is challenging. Systems and methods disclosed herein address various challenges related to VR, AR and MR technology.

SUMMARY

In some embodiments, a system for changing a user input mode for a wearable device is disclosed. The system can comprise a display system of the wearable device configured to present a three-dimensional (3D) view to a user where the 3D view comprises interactable objects, a user input device configured to receive a user input, a sensor configured to acquire data associated with a pose of the user, and a hardware processor in communication with the user input device. The hardware processor can be programmed to: determine whether a current user input mode for interacting with the interactable objects is a first user input mode or a second user input mode, wherein the first user input mode is based at least partly on the pose of the user and the second user input mode is based at least partly on the user input from the user input device. In response to a determination that the current user input mode is the first user input mode, the hardware processor can monitor the pose of the user using the sensor; present via the display system, based at least partly on the monitored pose, a focus indicator in a first shape associated with the first user input mode in a direction related to the pose of the user; receive a first indication to switch to the second user input mode; and switch the current user input mode to the second user input mode in response the first indication. In response to a determination that the current user input mode is the second user input mode: the hardware processor can monitor the user input from the user input device; present via the display system, based at least partly on the monitored input, the focus indicator in the second shape associated with the second user input mode; receive a second indication to switch to the first user input mode; and switch the current user input mode to the first user input mode in response the second indication.

In certain embodiments, a method for changing a user input mode for a wearable device is disclosed. The method may be performed under control of a wearable device comprising a computer processor. The wearable device can be configured to permit user interaction with interactable objects in a field of regard (FOR) of a user, the FOR comprising a portion of an environment around the user that is capable of being perceived by the user via a display system of the wearable device. The method comprises: determining a pose of a user; displaying, via the display system, a first focus indicator associated with a target interactable object in a direction related to the pose of the user, wherein the target interactable object comprises a plurality of virtual objects; receiving a selection of the target interactable object; presenting an option to the user for switching the user input mode from poses to hand gestures on a user input device; displaying, via the display system, the plurality of virtual objects; displaying, via the display system, a second focus indicator associated with a target virtual object of the plurality of virtual objects in response to a determination that the user has switched the user input mode from poses to hand gestures on the user input device; and updating the second focus indicator based at least partly on a user input from the user input device.

In some embodiments, a wearable system and a method for selecting a virtual object located in a three-dimensional (3D) space are disclosed. The wearable system can comprise a display system configured to present virtual objects in a 3D space; a non-transitory data store configured to store interactable objects in the 3D space; a sensor configured to determine a pose of a user; and a hardware processor programmed to communicate with the display system, the data store, and the sensor. The wearable system and the method can determine the pose of the user based at least partly on data received from the sensor; determine a field of view (FOV) of the user based at least partly on the pose of the user, the FOV comprising a portion of an environment of the user that is perceived at a given time by the user; identify a group of interactable objects in the FOV; identify a target interactable object in the FOV based least partly on the pose of the user; and initiate a selection event associated with the target interactable object.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

Figure 1:
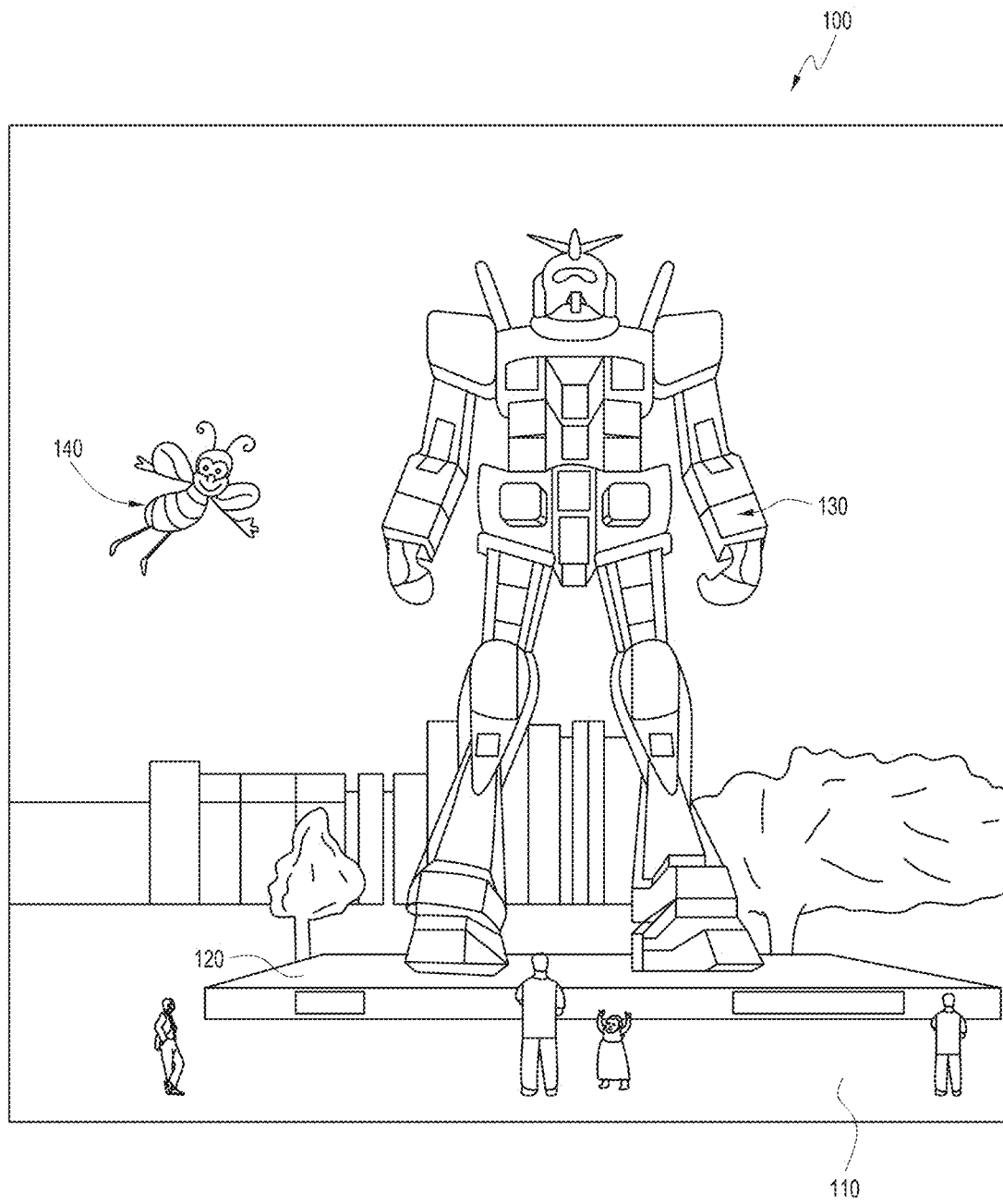
FIG. 1 depicts an illustration of a mixed reality scenario with certain virtual reality objects, and certain physical objects viewed by a person.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

With the use of the AR/VR/MR devices, a user may want to target and select an object in a three-dimensional (3D) space using a virtual user interface. For example, a user may select a virtual object using body poses such as physically approaching, grabbing or touching the items. The user may also select the virtual object by pointing at and clicking on the objects with virtual rays or beams. But these techniques can cause fatigue and can be difficult to select the objects with precision because the user may be required to hold his pose still to achieve the selection.

The present disclosure provides examples of wearable systems that address some or all of these problems. As one example, the user may move his head and look toward a group of objects. The object nearest to the center of the user's field of view can be highlighted as a potential target object, and the user can actuate a user input device (e.g., by swiping on a touchscreen) to transport the highlight from one object to another. The user can confirm the selection of the target object by actuating the user input device again (e.g. by touching the touchscreen). Once selected, the AR user interface may permit the user to perform additional actions on the selected target object (e.g., display or select from a menu associated with the object, perform an action associated with a game that the target object appears in, etc.). This technique may be particularly advantageous for selecting the objects that the user is interested in while reducing fatigue. This is because head poses are difficult to control with precision. The wearable system can preliminarily identify an object of interest based on the user's head pose and in the meantime, allow the user to select objects with precision using hand gestures.

In some implementations, an interactable object may include multiple virtual objects. For example, a virtual user interface plane may include multiple virtual applications such as, e.g., a video streaming application, a virtual classroom application, a weather application, a game application, an astronomy application, etc. The wearable system may support different user input modes based on the characteristics of the interactable object. For example, when the interactable object is a user interface plane (which may be large in size), the wearable system may allow the user to interact with it using poses. On the other hand, when the interactable object is relatively small, the wearable system may instead set the user input device as the default input mode to allow a user to interact with virtual objects with precision. These implementations may be advantageous because moving and targeting large objects may require less precision on user's movement while moving and selecting small objects may require the user to target with precision.

The wearable system can also determine the user input mode based on contextual information. For example, the wearable system can determine the layout of the virtual objects in the user's environment. When the wearable system detects a dense cluster of virtual objects in the user's direction of gaze, the wearable system may give the user the option to switch the input control from head control to hand control. This way, the user can interact with the virtual objects more precisely. As another example, the AR system may detect an orientation of the object (e.g., vertical or horizontal) and provide appropriate interactions for the user (e.g., volume controls for a television application that appears vertical in front of the user or typing controls for a virtual keyboard that appears horizontal on a user's desk).

The wearable system can permit a user to share virtual content with others (also wearing a wearable system), for example, by passing a world map of the user's environment or communicating the virtual content (or updates to the virtual content) among the wearable systems via a network.

Examples of 3D Display

FIG. 1 depicts an illustration of a mixed reality scenario with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane or based on observing different image features on different depth planes being out of focus. As discussed elsewhere herein, such depth cues provide credible perceptions of depth.

Figure 2:
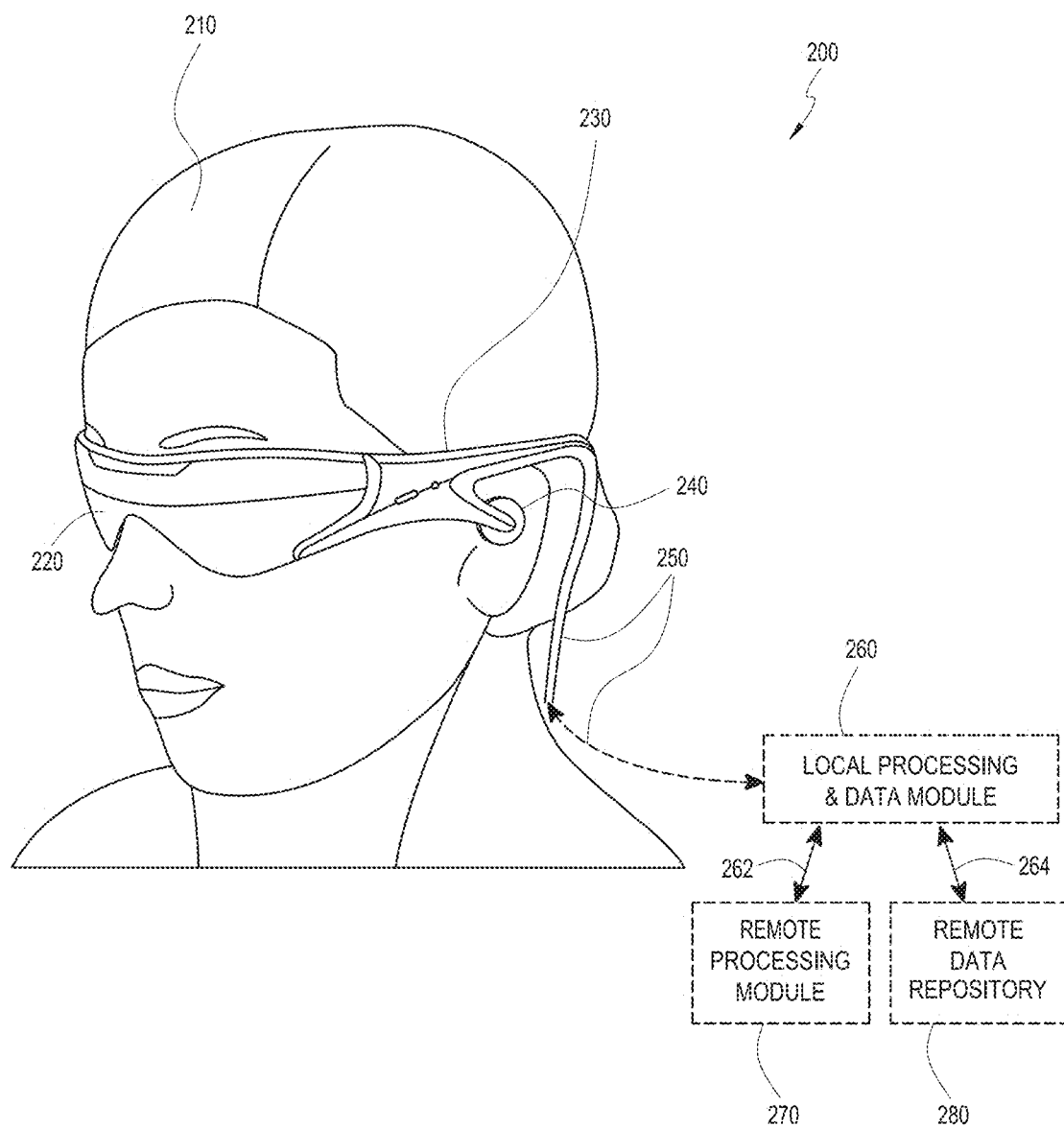
FIG. 2 schematically illustrates an example of a wearable system.

FIG. 2 illustrates an example of wearable system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display (HMD) that is worn on the head of the user. In some embodiments, a speaker 240 is coupled to the frame 230 and positioned adjacent the ear canal of the user (in some embodiments, another speaker, not shown, is positioned adjacent the other ear canal of the user to provide for stereo/shapeable sound control).

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 or 270, which may process image information acquired by the inward-facing imaging system to determine, e.g., the pupil diameters or orientations of the eyes, eye movements or eye pose of the user 210.

As an example, the wearable system 200 can use the outward-facing imaging system 464 or the inward-facing imaging system 462 to acquire images of a pose of the user. The images may be still images, frames of a video, or a video, in combination or the like.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), microphones, inertial measurement units (IMUs), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 280 and remote data repository 280 may be operatively coupled to each other.

In some embodiments, the remote processing module 270 may comprise one or more processors configured to analyze and process data and/or image information. In some embodiments, the remote data repository 280 may comprise a digital data storage facility, which may be available through the internet or other networking configuration in a "cloud" resource configuration. In some embodiments, all data is stored and all computations are performed in the local processing and data module, allowing fully autonomous use from a remote module.

The human visual system is complicated and providing a realistic perception of depth is challenging. Without being limited by theory, it is believed that viewers of an object may perceive the object as being three-dimensional due to a combination of vergence and accommodation. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Figure 3:
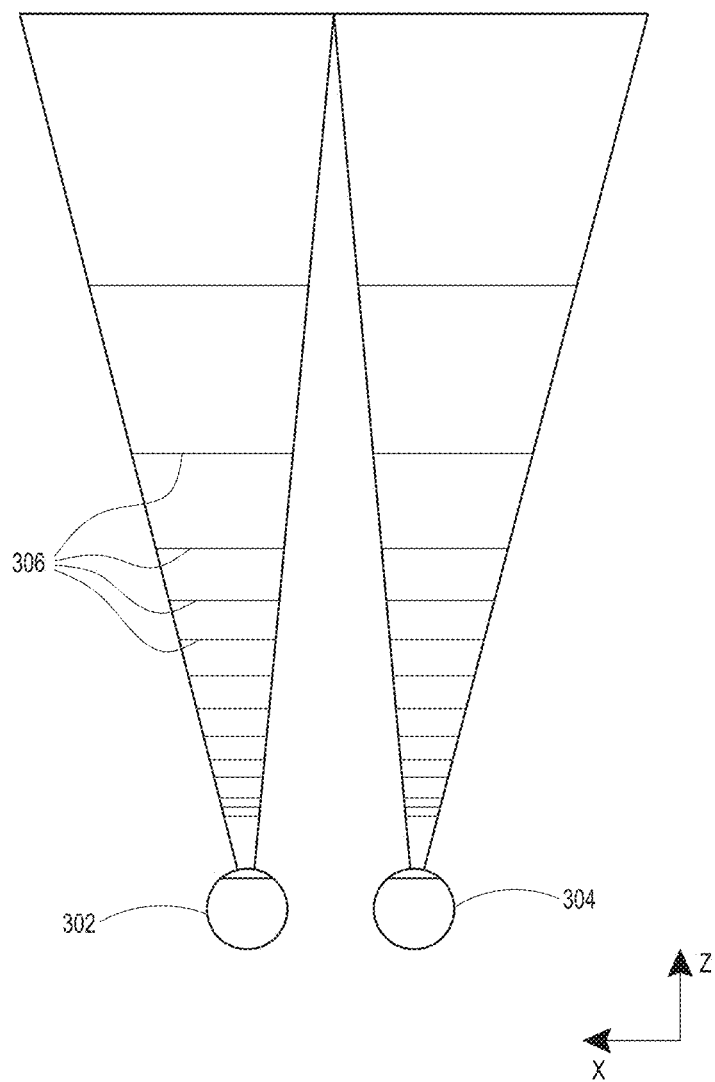
FIG. 3 schematically illustrates aspects of an approach for simulating three-dimensional imagery using multiple depth planes.

FIG. 3 illustrates aspects of an approach for simulating a three-dimensional imagery using multiple depth planes. With reference to FIG. 3, objects at various distances from eyes 302 and 304 on the z-axis are accommodated by the eyes 302 and 304 so that those objects are in focus. The eyes 302 and 304 assume particular accommodated states to bring into focus objects at different distances along the z-axis. Consequently, a particular accommodated state may be said to be associated with a particular one of depth planes 306, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 302 and 304, and also by providing different presentations of the image corresponding to each of the depth planes. While shown as being separate for clarity of illustration, it will be appreciated that the fields of view of the eyes 302 and 304 may overlap, for example, as distance along the z-axis increases. In addition, while shown as flat for the ease of illustration, it will be appreciated that the contours of a depth plane may be curved in physical space, such that all features in a depth plane are in focus with the eye in a particular accommodated state. Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes.

Waveguide Stack Assembly

Figure 4:
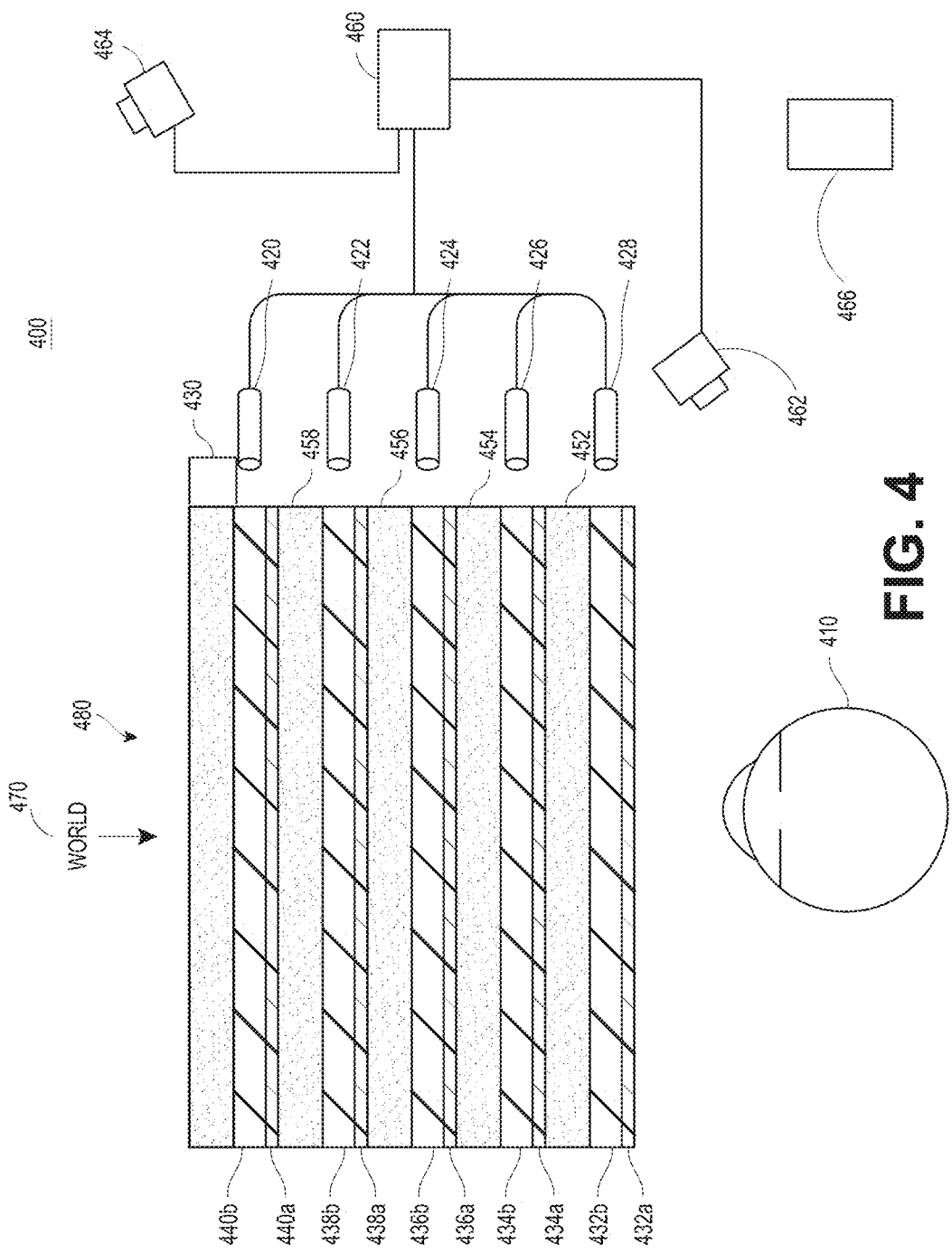
FIG. 4 schematically illustrates an example of a waveguide stack for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432b, 434b, 436b, 438b, 400b. In some embodiments, the wearable system 400 may correspond to wearable system 200 of FIG. 2, with FIG. 4 schematically showing some parts of that wearable system 200 in greater detail. For example, in some embodiments, the waveguide assembly 480 may be integrated into the display 220 of FIG. 2.

With continued reference to FIG. 4, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers or structures for forming air gaps).

The waveguides 432b, 434b, 436b, 438b, 440b or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440b, 438b, 436b, 434b, 432b, each of which may be configured to distribute incoming light across each respective waveguide, for output toward the eye 410. Light exits an output surface of the image injection devices 420, 422, 424, 426, 428 and is injected into a corresponding input edge of the waveguides 440b, 438b, 436b, 434b, 432b. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 420, 422, 424, 426, 428 are discrete displays that each produce image information for injection into a corresponding waveguide 440b, 438b, 436b, 434b, 432b, respectively. In some other embodiments, the image injection devices 420, 422, 424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440b, 438b, 436b, 434b, 432b. In some embodiments, the controller 460 may be a single integral device, or a distributed system connected by wired or wireless communication channels. The controller 460 may be part of the processing modules 260 or 270 (illustrated in FIG. 2) in some embodiments.

The waveguides 440b, 438b, 436b, 434b, 432b may be configured to propagate light within each respective waveguide by total internal reflection (TIR). The waveguides 440b, 438b, 436b, 434b, 432b may each be planar or have another shape (e.g., curved), with major top and bottom surfaces and edges extending between those major top and bottom surfaces. In the illustrated configuration, the waveguides 440b, 438b, 436b, 434b, 432b may each include light extracting optical elements 440a, 438a, 436a, 434a, 432a that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440a, 438a, 436a, 434a, 432a) may, for example, be reflective or diffractive optical features. While illustrated disposed at the bottom major surfaces of the waveguides 440b, 438b, 436b, 434b, 432b for ease of description and drawing clarity, in some embodiments, the light extracting optical elements 440a, 438a, 436a, 434a, 432a may be disposed at the top or bottom major surfaces, or may be disposed directly in the volume of the waveguides 440b, 438b, 436b, 434b, 432b. In some embodiments, the light extracting optical elements 440a, 438a, 436a, 434a, 432a may be formed in a layer of material that is attached to a transparent substrate to form the waveguides 440b, 438b, 436b, 434b, 432b. In some other embodiments, the waveguides 440b, 438b, 436b, 434b, 432b may be a monolithic piece of material and the light extracting optical elements 440a, 438a, 436a, 434a, 432a may be formed on a surface or in the interior of that piece of material.

With continued reference to FIG. 4, as discussed herein, each waveguide 440b, 438b, 436b, 434b, 432b is configured to output light to form an image corresponding to a particular depth plane. For example, the waveguide 432b nearest the eye may be configured to deliver collimated light, as injected into such waveguide 432b, to the eye 410. The collimated light may be representative of the optical infinity focal plane. The next waveguide up 434b may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434b as coming from a first focal plane closer inward toward the eye 410 from optical infinity. Similarly, the third up waveguide 436b passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436b as coming from a second focal plane that is even closer inward toward the person from optical infinity than was light from the next waveguide up 434b.

The other waveguide layers (e.g., waveguides 438b, 440b) and lenses (e.g., lenses 456, 458) are similarly configured, with the highest waveguide 440b in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4, the light extracting optical elements 440a, 438a, 436a, 434a, 432a may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440a, 438a, 436a, 434a, 432a may be volumetric or surface features, which may be configured to output light at specific angles. For example, the light extracting optical elements 440a, 438a, 436a, 434a, 432a may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety.

In some embodiments, the light extracting optical elements 440a, 438a, 436a, 434a, 432a are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 may be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) and the imaging system 464 is sometimes referred to as an FOV camera. The entire region available for viewing or imaging by a viewer may be referred to as the field of regard (FOR). The FOR may include 4π steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size and/or orientation of the pupil of the eye 304. The inward-facing imaging system 466 can be used to obtain images for use in determining the direction the user is looking (e.g., eye pose) or for biometric identification of the user (e.g., via iris identification). In some embodiments, at least one camera may be utilized for each eye, to separately determine the pupil size or eye pose of each eye independently, thereby allowing the presentation of image information to each eye to be dynamically tailored to that eye. In some other embodiments, the pupil diameter or orientation of only a single eye 410 (e.g., using only a single camera per pair of eyes) is determined and assumed to be similar for both eyes of the user. The images obtained by the inward-facing imaging system 466 may be analyzed to determine the user's eye pose or mood, which can be used by the wearable system 400 to decide which audio or visual content should be presented to the user. The wearable system 400 may also determine head pose (e.g., head position or head orientation) using sensors such as IMUs, accelerometers, gyroscopes, etc.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Figure 5:
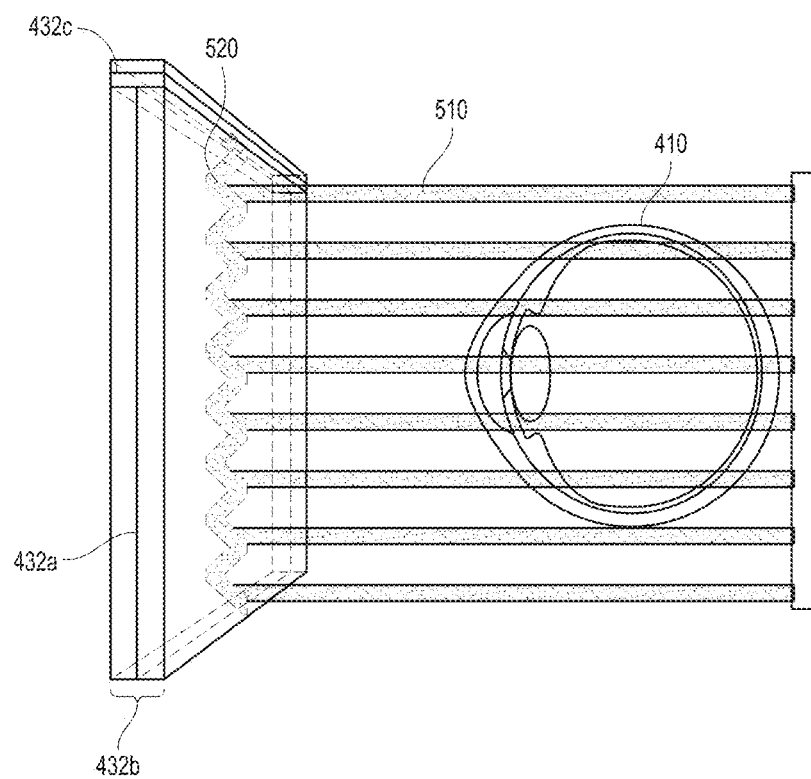
FIG. 5 shows example exit beams that may be outputted by a waveguide.

FIG. 5 shows an example of exit beams outputted by a waveguide. One waveguide is illustrated, but it will be appreciated that other waveguides in the waveguide assembly 480 may function similarly, where the waveguide assembly 480 includes multiple waveguides. Light 520 is injected into the waveguide 432b at the input edge 432c of the waveguide 432b and propagates within the waveguide 432b by TIR. At points where the light 520 impinges on the DOE 432a, a portion of the light exits the waveguide as exit beams 510. The exit beams 510 are illustrated as substantially parallel but they may also be redirected to propagate to the eye 410 at an angle (e.g., forming divergent exit beams), depending on the depth plane associated with the waveguide 432b. It will be appreciated that substantially parallel exit beams may be indicative of a waveguide with light extracting optical elements that outcouple light to form images that appear to be set on a depth plane at a large distance (e.g., optical infinity) from the eye 410. Other waveguides or other sets of light extracting optical elements may output an exit beam pattern that is more divergent, which would require the eye 410 to accommodate to a closer distance to bring it into focus on the retina and would be interpreted by the brain as light from a distance closer to the eye 410 than optical infinity.

Figure 6:
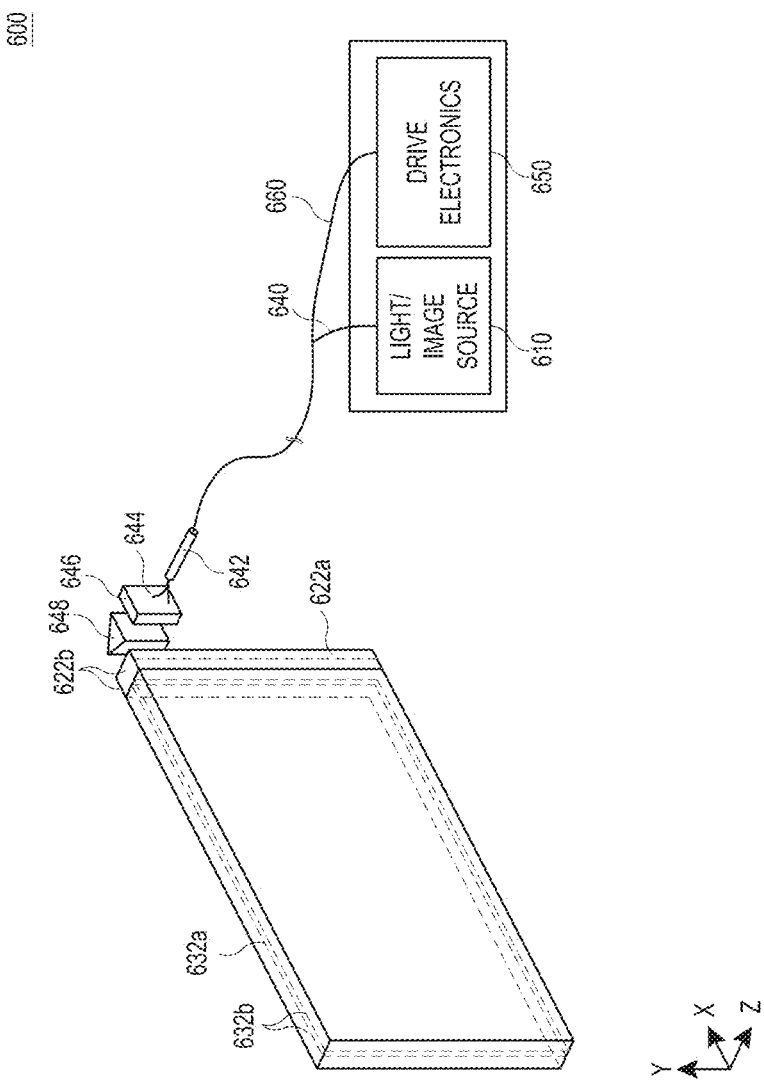
FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field.

FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field. The optical system can include a waveguide apparatus, an optical coupler subsystem to optically couple light to or from the waveguide apparatus, and a control subsystem. The optical system can be used to generate a multi-focal volumetric, image, or light field. The optical system can include one or more primary planar waveguides 632a (only one is shown in FIG. 6) and one or more DOEs 632b associated with each of at least some of the primary waveguides 632a. The planar waveguides 632b can be similar to the waveguides 432b, 434b, 436b, 438b, 440b discussed with reference to FIG. 4. The optical system may employ a distribution waveguide apparatus to relay light along a first axis (vertical or Y-axis in view of FIG. 6), and expand the light's effective exit pupil along the first axis (e.g., Y-axis). The distribution waveguide apparatus may, for example, include a distribution planar waveguide 622b and at least one DOE 622a (illustrated by double dash-dot line) associated with the distribution planar waveguide 622b. The distribution planar waveguide 622b may be similar or identical in at least some respects to the primary planar waveguide 632b, having a different orientation therefrom. Likewise, at least one DOE 622a may be similar or identical in at least some respects to the DOE 632a. For example, the distribution planar waveguide 622b or DOE 622a may be comprised of the same materials as the primary planar waveguide 632b or DOE 632a, respectively. Embodiments of the optical display system 600 shown in FIG. 6 can be integrated into the wearable system 200 shown in FIG. 2.

The relayed and exit-pupil expanded light may be optically coupled from the distribution waveguide apparatus into the one or more primary planar waveguides 632b. The primary planar waveguide 632b can relay light along a second axis, preferably orthogonal to first axis (e.g., horizontal or X-axis in view of FIG. 6). Notably, the second axis can be a non-orthogonal axis to the first axis. The primary planar waveguide 632b expands the light's effective exit pupil along that second axis (e.g., X-axis). For example, the distribution planar waveguide 622b can relay and expand light along the vertical or Y-axis, and pass that light to the primary planar waveguide 632b which can relay and expand light along the horizontal or X-axis.

The optical system may include one or more sources of colored light (e.g., red, green, and blue laser light) 610 which may be optically coupled into a proximal end of a single mode optical fiber 640. A distal end of the optical fiber 640 may be threaded or received through a hollow tube 642 of piezoelectric material. The distal end protrudes from the tube 642 as fixed-free flexible cantilever 644. The piezoelectric tube 642 can be associated with four quadrant electrodes (not illustrated). The electrodes may, for example, be plated on the outside, outer surface or outer periphery or diameter of the tube 642. A core electrode (not illustrated) may also be located in a core, center, inner periphery or inner diameter of the tube 642.

Drive electronics 650, for example electrically coupled via wires 660, drive opposing pairs of electrodes to bend the piezoelectric tube 642 in two axes independently. The protruding distal tip of the optical fiber 644 has mechanical modes of resonance. The frequencies of resonance can depend upon a diameter, length, and material properties of the optical fiber 644. By vibrating the piezoelectric tube 642 near a first mode of mechanical resonance of the fiber cantilever 644, the fiber cantilever 644 can be caused to vibrate, and can sweep through large deflections.

By stimulating resonant vibration in two axes, the tip of the fiber cantilever is scanned biaxially in an area filling two-dimensional (2D) scan. By modulating an intensity of light source(s) 610 in synchrony with the scan of the fiber cantilever 644, light emerging from the fiber cantilever 644 can form an image. Descriptions of such a set up are provided in U.S. Patent Publication No. 2014/0003762, which is incorporated by reference herein in its entirety.

A component of an optical coupler subsystem can collimate the light emerging from the scanning fiber cantilever 644. The collimated light can be reflected by mirrored surface 648 into the narrow distribution planar waveguide 622b which contains the at least one diffractive optical element (DOE) 622a. The collimated light can propagate vertically (relative to the view of FIG. 6) along the distribution planar waveguide 622b by TIR, and in doing so repeatedly intersects with the DOE 622a. The DOE 622a preferably has a low diffraction efficiency. This can cause a fraction (e.g., 10%) of the light to be diffracted toward an edge of the larger primary planar waveguide 632b at each point of intersection with the DOE 622a, and a fraction of the light to continue on its original trajectory down the length of the distribution planar waveguide 622b via TIR.

At each point of intersection with the DOE 622a, additional light can be diffracted toward the entrance of the primary waveguide 632b. By dividing the incoming light into multiple outcoupled sets, the exit pupil of the light can be expanded vertically by the DOE 4 in the distribution planar waveguide 622b. This vertically expanded light coupled out of distribution planar waveguide 622b can enter the edge of the primary planar waveguide 632b.

Light entering primary waveguide 632b can propagate horizontally (relative to the view of FIG. 6) along the primary waveguide 632b via TIR. As the light intersects with DOE 632a at multiple points as it propagates horizontally along at least a portion of the length of the primary waveguide 632b via TIR. The DOE 632a may advantageously be designed or configured to have a phase profile that is a summation of a linear diffraction pattern and a radially symmetric diffractive pattern, to produce both deflection and focusing of the light. The DOE 632a may advantageously have a low diffraction efficiency (e.g., 10%), so that only a portion of the light of the beam is deflected toward the eye of the view with each intersection of the DOE 632a while the rest of the light continues to propagate through the primary waveguide 632b via TIR.

At each point of intersection between the propagating light and the DOE 632a, a fraction of the light is diffracted toward the adjacent face of the primary waveguide 632b allowing the light to escape the TIR, and emerge from the face of the primary waveguide 632b. In some embodiments, the radially symmetric diffraction pattern of the DOE 632a additionally imparts a focus level to the diffracted light, both shaping the light wavefront (e.g., imparting a curvature) of the individual beam as well as steering the beam at an angle that matches the designed focus level.

Accordingly, these different pathways can cause the light to be coupled out of the primary planar waveguide 632b by a multiplicity of DOEs 632a at different angles, focus levels, and/or yielding different fill patterns at the exit pupil. Different fill patterns at the exit pupil can be beneficially used to create a light field display with multiple depth planes. Each layer in the waveguide assembly or a set of layers (e.g., 3 layers) in the stack may be employed to generate a respective color (e.g., red, blue, green). Thus, for example, a first set of three adjacent layers may be employed to respectively produce red, blue and green light at a first focal depth. A second set of three adjacent layers may be employed to respectively produce red, blue and green light at a second focal depth. Multiple sets may be employed to generate a full 3D or 4D color image light field with various focal depths.

Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an embodiment of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HMD, and display systems of the present disclosure are described in U.S. Patent Publication No. 2015/0016777, which is incorporated by reference herein in its entirety.

Example Wearable Systems, Environments, and Interfaces

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 7:
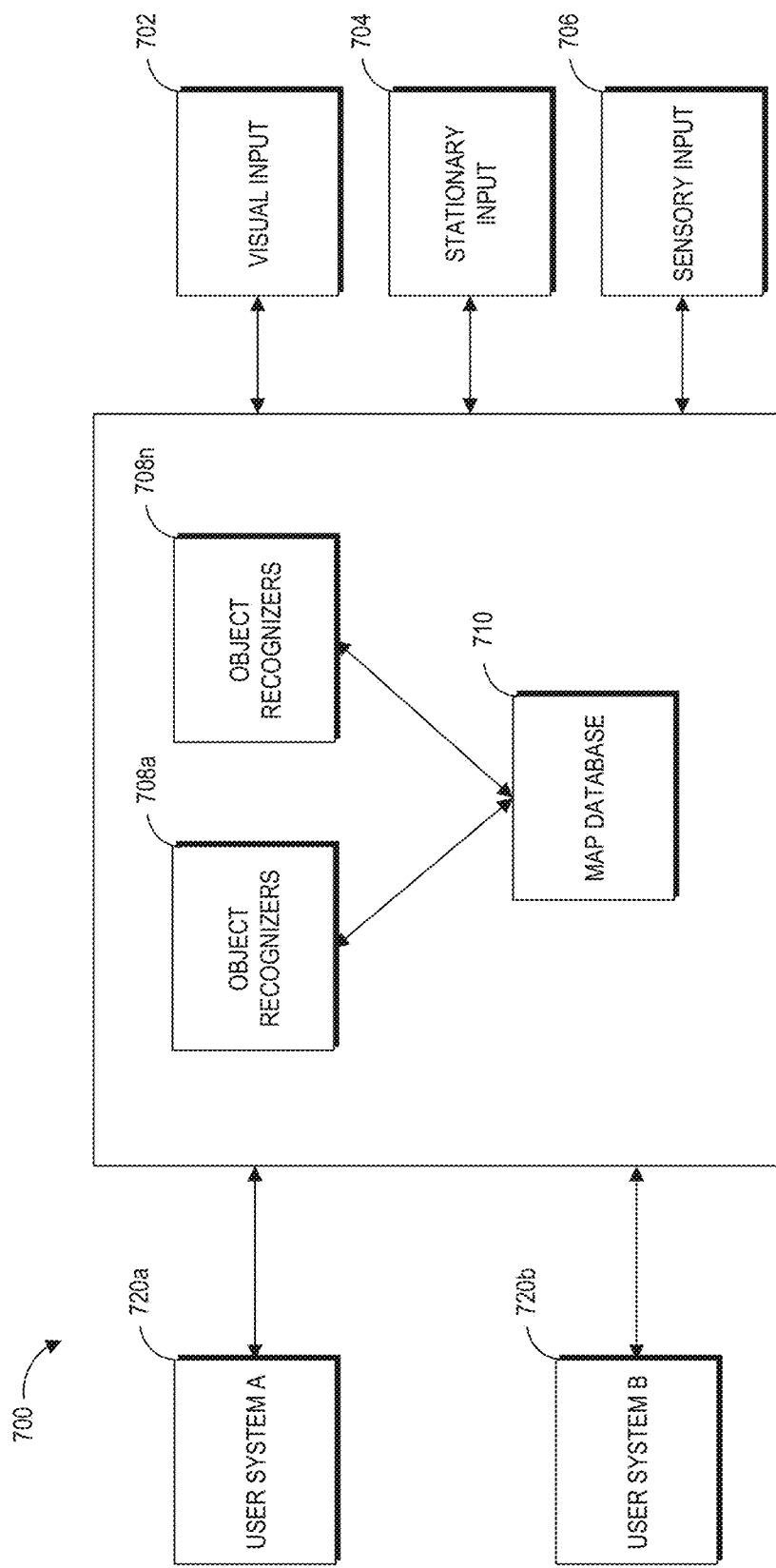
FIG. 7 is a block diagram of an example of a wearable system.

FIG. 7 is a block diagram of an example of an MR environment 700. The MR environment 700 may be configured to receive input (e.g., visual input 702 from the user's wearable system, stationary input 704 such as room cameras, sensory input from various sensors, gestures, totems, eye tracking, user input from the user input device 504, etc.) from one or more user wearable systems (e.g., wearable system 200 or display system 220) or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras and/or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708a to 708n may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. Over time the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

Figure 8:
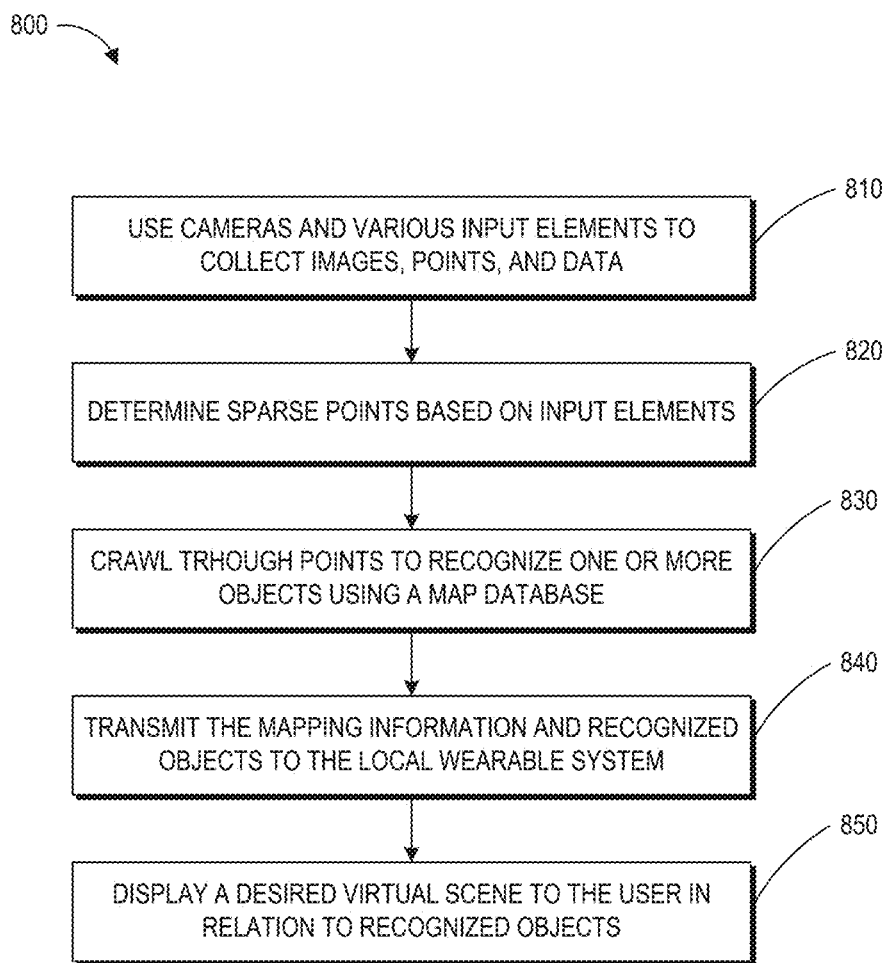
FIG. 8 is a process flow diagram of an example of a method of rendering virtual content in relation to recognized objects.

FIG. 8 is a process flow diagram of an example of a method 800 of rendering virtual content in relation to recognized objects. The method 800 describes how a virtual scene may be represented to a user of the wearable system. The user may be geographically remote from the scene. For example, the user may be New York, but may want to view a scene that is presently going on in California, or may want to go on a walk with a friend who resides in California.

At block 810, the AR system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, or hand gestures) that can be used in displaying and understanding the orientation and position of various objects in the user's surroundings. The object recognizers 708a-708n may crawl through these collected points and recognize one or more objects using a map database at block 830. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Figure 9:
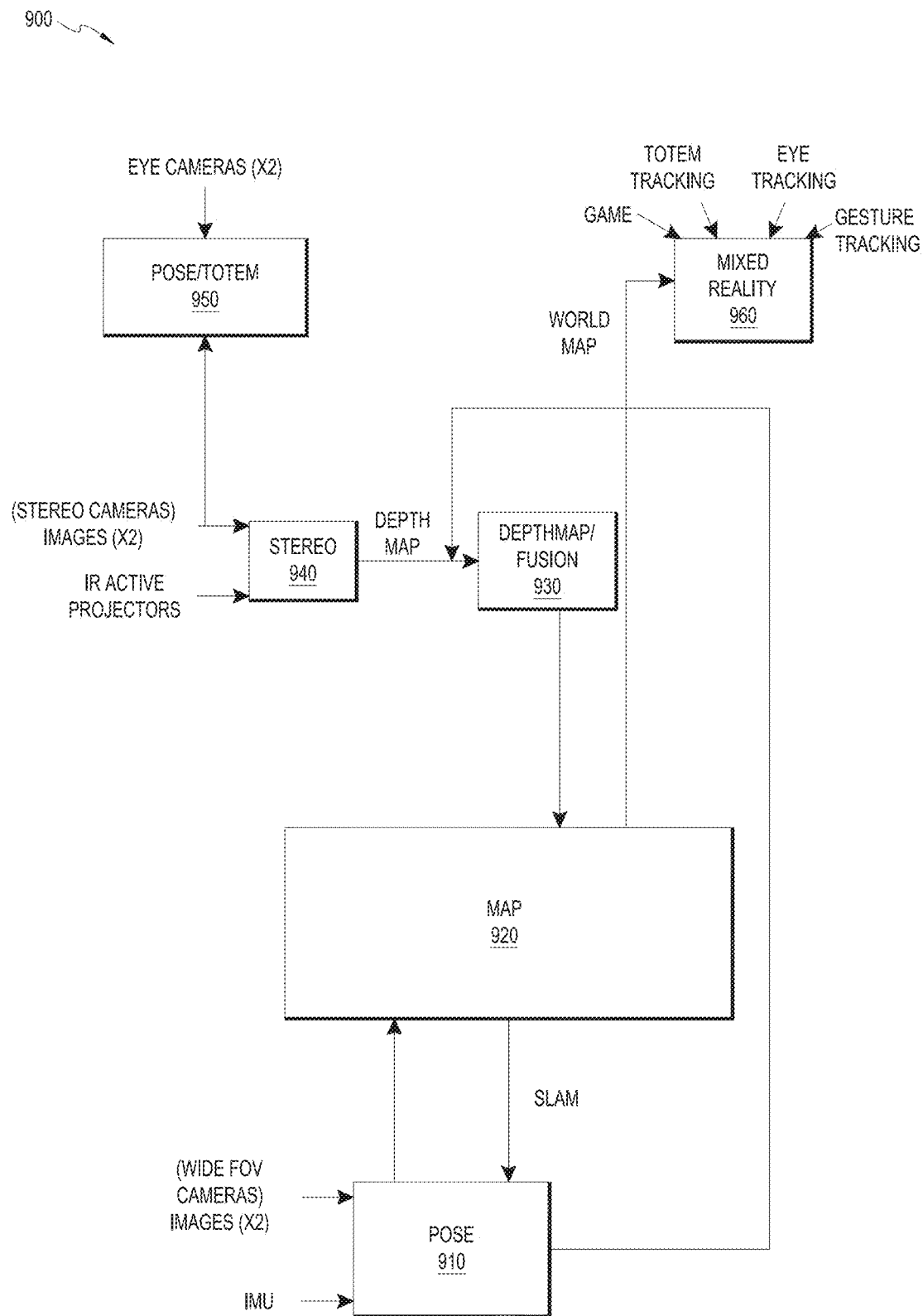
FIG. 9 is a block diagram of another example of a wearable system.

FIG. 9 is a block diagram of another example of a wearable system. In this example, the wearable system 900 comprises a map, which may include map data for the world. The map may partly reside locally on the wearable system, and may partly reside at networked storage locations accessible by wired or wireless network (e.g., in a cloud system). A pose process 910 may be executed on the wearable computing architecture (e.g., processing module 260 or controller 460) and utilize data from the map to determine position and orientation of the wearable computing hardware or user. Pose data may be computed from data collected on the fly as the user is experiencing the system and operating in the world. The data may comprise images, data from sensors (such as inertial measurement units, which generally comprise accelerometer and gyroscope components) and surface information pertinent to objects in the real or virtual environment.

A sparse point representation may be the output of a simultaneous localization and mapping (SLAM or V-SLAM, referring to a configuration wherein the input is images/visual only) process. The system can be configured to not only find out where in the world the various components are, but what the world is made of. Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 940, wherein depth information is determined using a technique such as triangulation or time-of-flight sensing. Image information and active patterns (such as infrared patterns created using active projectors) may serve as input to the Stereo process 940. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 940 may be combined in the fusion process 930. Pose may be an input to this fusion process 930 as well, and the output of fusion 930 becomes an input to populating the map process 920. Sub-surfaces may connect with each other, such as in topographical mapping, to form larger surfaces, and the map becomes a large hybrid of points and surfaces.

To resolve various aspects in a mixed reality process 960, various inputs may be utilized. For example, in the embodiment depicted in FIG. 9, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding where such objects are relative to each other, to be another valuable input to mixed reality. Pose relative to the world becomes an input as well and plays a key role to almost any interactive system.

Controls or inputs from the user are another input to the wearable system 900. As described herein, user inputs can include visual input, gestures, totems, audio input, sensory input, etc. In order to move around or play a game, for example, the user may need to instruct the wearable system 900 regarding what he or she wants to do. Beyond just moving oneself in space, there are various forms of user controls that may be utilized. In one embodiment, a totem (e.g. a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 900 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 900 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined.

With regard to the camera systems, the example wearable system 900 shown in FIG. 9 can include three pairs of cameras: a relative wide FOV or passive SLAM pair of cameras arranged to the sides of the user's face, a different pair of cameras oriented in front of the user to handle the stereo imaging process 940 and also to capture hand gestures and totem/object tracking in front of the user's face. The FOV cameras and the pair of cameras for the stereo process 940 may be a part of the outward-facing imaging system 464 (shown in FIG. 4). The wearable system 900 can include eye tracking cameras (which may be a part of an inward-facing imaging system 462 shown in FIG. 4) oriented toward the eyes of the user in order to triangulate eye vectors and other information. The wearable system 900 may also comprise one or more textured light projectors (such as infrared (IR) projectors) to inject texture into a scene.

Figure 10:
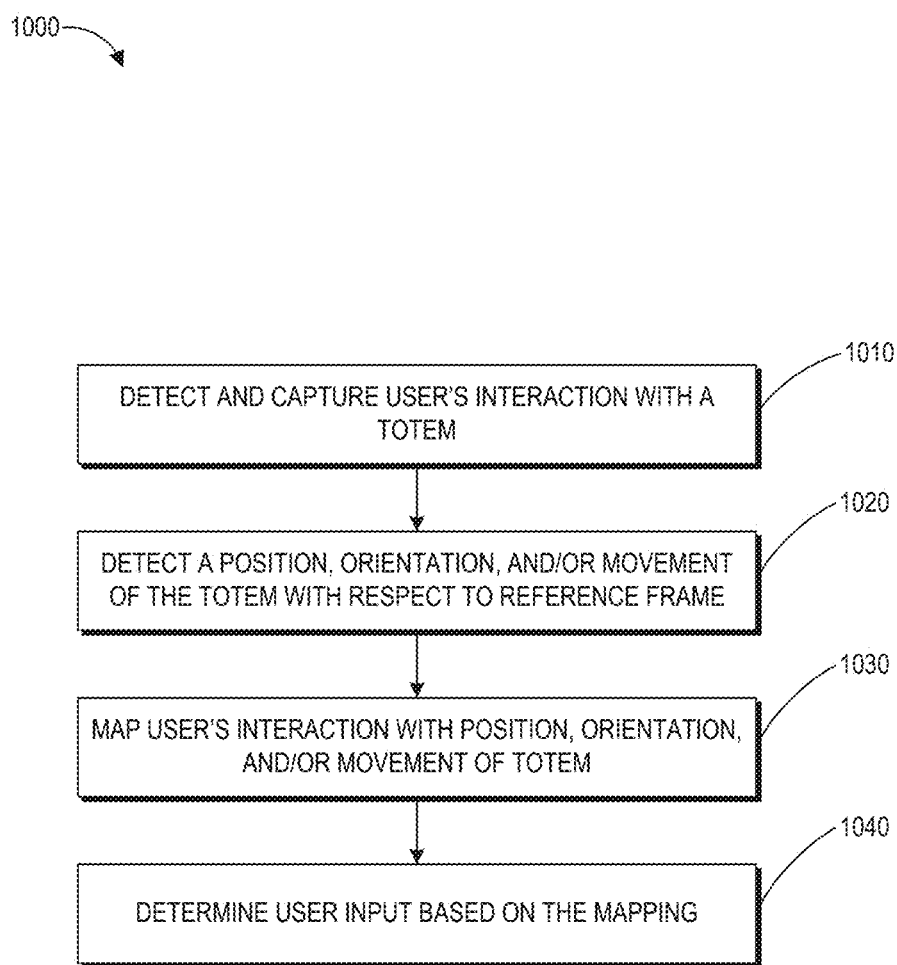
FIG. 10 is a process flow diagram of an example of a method for determining user input to a wearable system.

FIG. 10 is a process flow diagram of an example of a method 1000 for determining user input to a wearable system. In this example, the user may interact with a totem. The user may have multiple totems. For example, the user may have designated one totem for a social media application, another totem for playing games, etc. At block 1010, the wearable system may detect a motion of a totem. The movement of the totem may be recognized through the outward facing system or may be detected through sensors (e.g., haptic glove, image sensors, hand tracking devices, eye-tracking cameras, head pose sensors, etc.).

Based at least partly on the detected gesture, eye pose, head pose, or input through the totem, the wearable system detects a position, orientation, and/or movement of the totem (or the user's eyes or head or gestures) with respect to a reference frame, at block 1020. The reference frame may be a set of map points based on which the wearable system translates the movement of the totem (or the user) to an action or command. At block 1030, the user's interaction with the totem is mapped. Based on the mapping of the user interaction with respect to the reference frame 1020, the system determines the user input at block 1040.

For example, the user may move a totem or physical object back and forth to signify turning a virtual page and moving on to a next page or moving from one user interface (UI) display screen to another UI screen. As another example, the user may move their head or eyes to look at different real or virtual objects in the user's FOR. If the user's gaze at a particular real or virtual object is longer than a threshold time, the real or virtual object may be selected as the user input. In some implementations, the vergence of the user's eyes can be tracked and an accommodation/vergence model can be used to determine the accommodation state of the user's eyes, which provides information on a depth plane on which the user is focusing. In some implementations, the wearable system can use raycasting techniques to determine which real or virtual objects are along the direction of the user's head pose or eye pose. In various implementations, the ray casting techniques can include casting thin, pencil rays with substantially little transverse width or casting rays with substantial transverse width (e.g., cones or frustums).

The user interface may be projected by the display system as described herein (such as the display 220 in FIG. 2). It may also be displayed using a variety of other techniques such as one or more projectors. The projectors may project images onto a physical object such as a canvas or a globe. Interactions with user interface may be tracked using one or more cameras external to the system or part of the system (such as, e.g., using the inward-facing imaging system 462 or the outward-facing imaging system 464).

Figure 11:
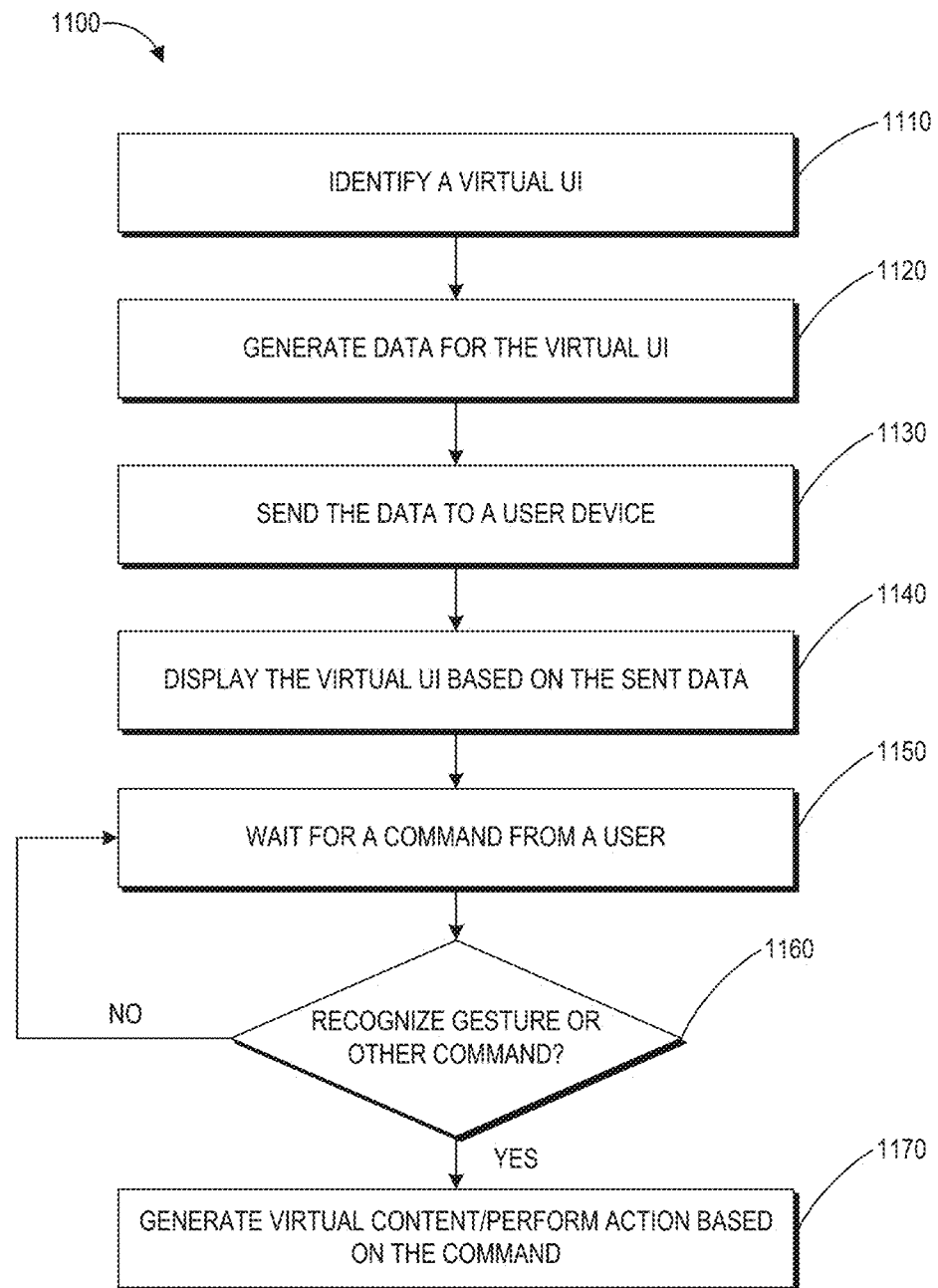
FIG. 11 is a process flow diagram of an example of a method for interacting with a virtual user interface.

FIG. 11 is a process flow diagram of an example of a method 1100 for interacting with a virtual user interface. The method 1100 may be performed by the wearable system described herein.

At block 1110, the wearable system may identify a particular UI. The type of UI may be predetermined by the user. The wearable system may identify that a particular UI needs to be populated based on a user input (e.g., gesture, visual data, audio data, sensory data, direct command, etc.). At block 1120, the wearable system may generate data for the virtual UI. For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. If the UI is hand centric, the map coordinates of the user's hands may be determined. These map points may be derived through data received through the FOV cameras, sensory input, or any other type of collected data.

At block 1130, the wearable system may send the data to the display from the cloud or the data may be sent from a local database to the display components. At block 1140, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 1150. For example, the UI may be a body centric ring around the user's body. The wearable system may then wait for the command (a gesture, a head or eye movement, input from a user input device, etc.), and if it is recognized (block 1160), virtual content associated with the command may be displayed to the user (block 1170). As an example, the wearable system may wait for user's hand gestures before mixing multiple steam tracks.

Additional examples of AR systems, UI, and user experiences (UX) are described in U.S. Patent Publication No. 2015/0016777, which is incorporated by reference herein in its entirety.

Examples Objects in the Field of Regard (FOR) and Field of View (FOV)

Figure 12:
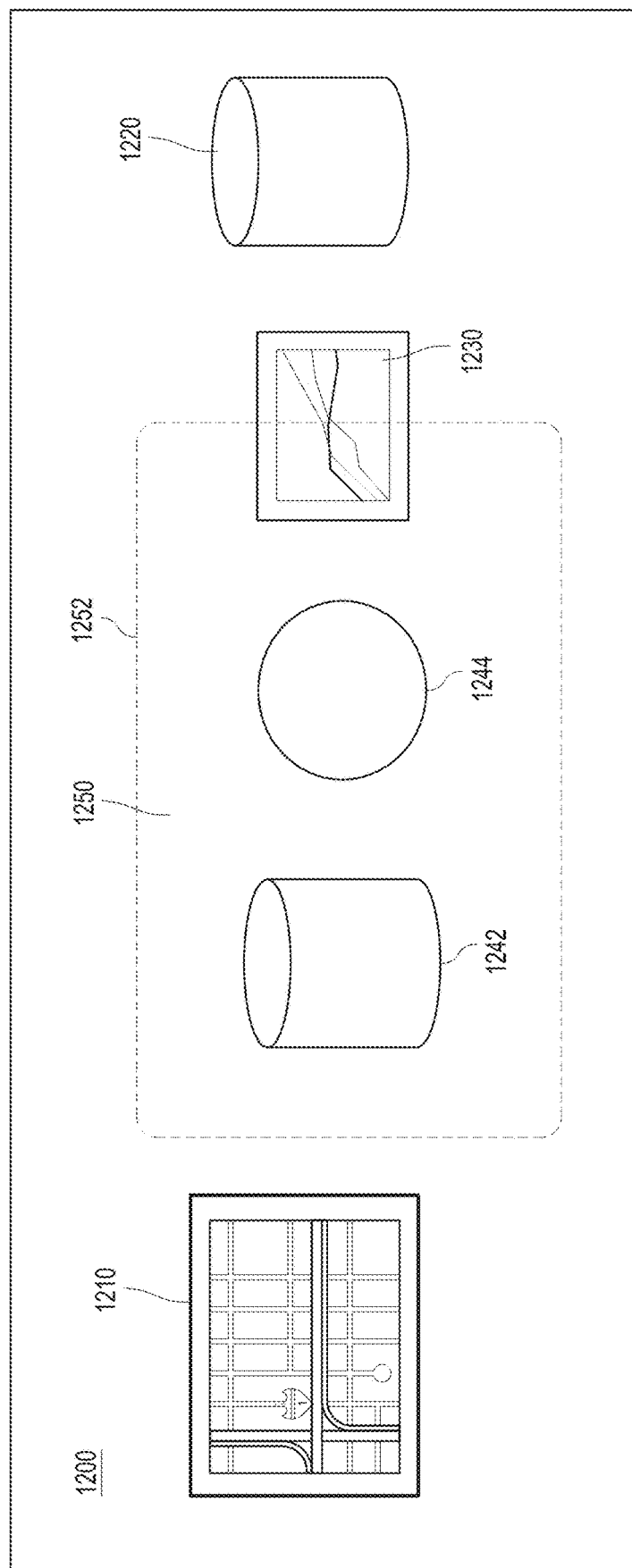
FIG. 12 illustrates an example of virtual objects in the field of view and virtual objects in the field of regard.

FIG. 12 schematically illustrates an example of virtual objects in a field of view (FOV) and virtual objects in a field of regard (FOR). As discussed with reference to FIG. 4, the FOR comprises a portion of the environment around the user that is capable of being perceived by the user via the wearable system. In FIG. 12, the FOR 1200 can contain a group of objects (e.g. 1210, 1220, 1230, 1242, and 1244) which can be perceived by the user via the wearable system. The objects within the user's FOR 1200 may be virtual and/or physical objects. For example, the user's FOR 1200 may include physical object such as a chair, a sofa, a wall, etc. The virtual objects may include operating system objects such as e.g., a recycle bin for deleted files, a terminal for inputting commands, a file manager for accessing files or directories, an icon, a menu, an application for audio or video streaming, a notification from an operating system, and so on. The virtual objects may also include objects in an application such as e.g., avatars, virtual objects in games, graphics or images, etc. Some virtual objects can be both an operating system object and an object in an application. In some embodiments, the wearable system can add virtual elements to the existing physical objects. For example, the wearable system may add a virtual menu associated with a television in the room, where the virtual menu may give the user the option to turn on or change the channels of the television using the wearable system.

Figure 16:
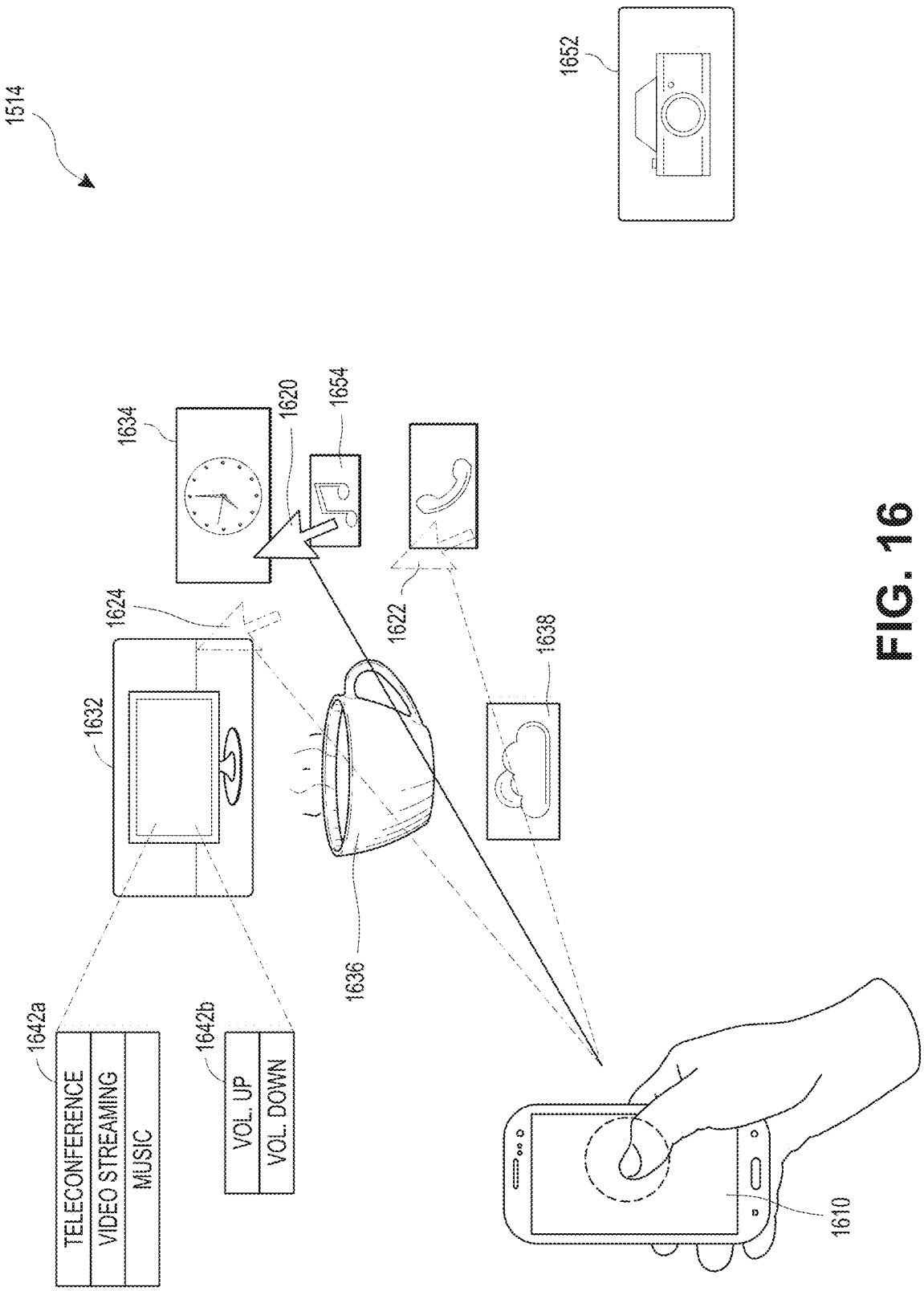
FIG. 16 illustrates an example of interacting with interactable objects with hand gestures.

A virtual object may be a three-dimensional (3D), two-dimensional (2D), or one-dimensional (1D) object. For example, as schematically illustrated in FIG. 16, the virtual object may be a 3D coffee mug 1636 (which may represent a virtual control for a physical coffee maker). The virtual object may also be a 2D graphical representation of a clock 1634 (displaying current time to the user). In some implementations, one or more virtual objects may be displayed within (or associated with) another virtual object. For example, with reference to FIG. 13, the virtual coffee mug 1636 is shown inside of the user interface plane 1514, although the virtual coffee mug appears to be 3D within this 2D planar virtual space.

The objects in the user's FOR can be part of a world map as described with reference to FIG. 9. Data associated with objects (e.g. location, semantic information, properties, etc.) can be stored in a variety of data structures such as, e.g., arrays, lists, trees, hashes, graphs, and so on. The index of each stored object, wherein applicable, may be determined, for example, by the location of the object. For example, the data structure may index the objects by a single coordinate such as the object's distance from a fiducial position (e.g., how far to the left or right of the fiducial position, how far from the top or bottom of the fiducial position, or how far depth-wise from the fiducial position). The fiducial position may be determined based on the user's position (such as the position of the user's head). The fiducial position may also be determined based on the position of a virtual or physical object (such as a target interactable object) in the user's environment. The way, the 3D space in the user's environment may be collapsed into a 2D user interface where the virtual objects are arranged in accordance with the object's distance from the fiducial position.

Within the FOR 1200, the portion of the world that a user perceives at a given time is referred to as the FOV 1250 (e.g., the FOV 1250 may encompass the portion of the FOR that the user is currently looking toward). In FIG. 12, the FOV 1250 is schematically illustrated by dashed line 1252. The user of the wearable system can perceive multiple objects in the FOV 1250, such as the object 1242, the object 1244, and a portion of the object 1230. The FOV can depend on the size or optical characteristics of the display of a wearable device. For example, an AR display may include optics that only provides AR functionality when the user looks through a particular portion of the display. The FOV 1250 may correspond to the solid angle that is perceivable by the user when looking through an AR display such as, e.g., the stacked waveguide assembly 480 (FIG. 4) or the planar waveguide 600 (FIG. 6).

As the user's pose changes (e.g., head pose or eye pose), the FOV 1250 will correspondingly change, and the objects within the FOV 1250 may also change. For example, the map 1210 is initially outside the user's FOV in FIG. 12. If the user looks toward the map 1210, the map 1210 may move into the user's FOV 1250, and (for example), the object 1230 may move outside the user's FOV 1250. As will be described herein, the wearable system may keep track of the objects in the FOR 1200 as well as the objects in the FOV 1250.

Examples of Interactable Objects

In FIG. 12, a user can interact with a subset of the objects in the user's FOR 1200. This subset of objects may sometimes be referred to as interactable objects. In some implementations, the interactable objects may encompass all objects (virtual and physical) in the user's environment; while in other implementations, the interactable objects may include only a portion of the objects in the user's environment.

The wearable system can identify a subgroup of interactable objects (e.g. 1242, 1244, and 1230) which are within a user's FOV 1250. The subgroup of interactable objects in the FOV is sometimes referred to as selectable objects, because the user is currently perceiving them and can select them (e.g., to move them, activate them, obtain information about them, etc.). As discussed herein, when the user moves his body, head, or eyes, the user's FOV can change. In general, some objects will remain in the FOV, some objects will move from inside to outside of the FOV (and no longer be selectable), and other objects that were outside the FOV will move into the FOV (and become selectable). Accordingly, the wearable system can update the subgroup of interactable objects in the FOV based on the user's body, head, or eye pose.

The wearable system may identify a target interactable object within a user's FOV. The target interactable object may be the object that the user desires to interact with or the object the wearable system expects the user will interact with (e.g., the interactable object toward which the user is looking or the interactable object nearest the center of the user's FOV). The target interactable object can be identified using a variety of rules, such as the location of the object, the user's preference, or the user's pose. For example, the wearable system can choose the object closest to the center of the FOV to be the target interactable object. The wearable system can also choose the left most object or the right most object in the user's FOV to be the target interactable object. As another example, the wearable system can use the inward-facing imaging system 462 (shown in FIG. 4) alone or in combination with the IMUs to determine the user's direction of gaze. The wearable system can identify the object which collides with the user's direction of gaze as the target interactable object.

In some implementations, the AR system can automatically orient the target interactable object so that the normal of the interactable object faces the user. For example, a virtual TV screen may initially face upward toward the ceiling of the room. Once the AR system determines that the user is looking toward the virtual TV screen, the AR system can automatically rotate the virtual TV screen so that the virtual TV screen faces the user.

Examples of a Focus Indicator

The wearable system may assign a focus indicator to the target interactable object so that the user can more readily perceive the target interactable object. The focus indicator can be displayed to the user. For example, the focus indicator can comprise a halo, a color, a perceived size or depth change (e.g., causing the target object to appear closer and/or larger when selected), or other visual effects which draw the user's attention. The focus indicator can also include audible or tactile effects such as vibrations, ring tones, beeps, etc.

In some embodiments, the wearable system may initially identify an object as the a target interactable object based on the rules described herein and change the target interactable object to another object based on the changes in the user's pose. As a result, the focus indicator may move from one object to the other as the user changes his pose.

The wearable system may also display a cursor which corresponds to the user's current position. The cursor may take a variety of shapes such as a geometric cone, a beam of ray, a reticle, an arrow, an oval, a circle, a polygon, or other 1 D, 2D, or 3D shapes. The cursor may be presented in the same form as the focus indicator. For example, the cursor may have the same visual, audio, or tactile effect as the focus indicator. As an example, the cursor may be a reticle which corresponds to the user's head position. As another example, the cursor may have the shape of an arrow which corresponds to the current position associated with a user input device. As the user changes his pose or actuates the user input device, the cursor can move accordingly. The cursor may point at one or more objects or an empty space in the user's environment as the user moves around. For example, with reference to FIG. 16, the AR system can move the cursor on the virtual user interface 1514, such as from the position 1620 to the position 1624 or from the position 1622 to the position 1620.

The wearable system can present the cursor in addition to or in an alternative to the focus indicator. For example, in FIG. 15, the wearable system can display either a reticle (which can correspond to the user's direction of gaze), or provide a light blue halo as a focus indicator, or both on the virtual object 1514. In some implementations, the cursor is an embodiment of the focus indicator. For example, when the user is staring at a virtual object, the wearable system may present a halo around that virtual object, a reticle object, or an arrow on the object. These visual indications may represent both the target object that the user is interested in interacting with and the user's current position.

Examples Interactions with Interactable Objects

The user can interact with interactable objects within the user's FOR 1200 and in particular with interactable objects within the user's current FOV 1250 through the wearable system. For example, the virtual object 1230 may be a graph that shows the change in price of a stock over time. By selecting the virtual object 1230, the user may interact with the virtual object 1230 to, for example, obtain stock quotes, buy or sell the stock, obtain information about the company, etc. To perform these interactions, the wearable system may display menus, toolbars, etc., associated with the virtual object, which can permit the user to perform various actions (e.g., obtaining the stock quote).

The user can interact with objects within his FOV using a variety of techniques, such as e.g., by selecting the objects, moving the objects, opening a menu or toolbar associated with an object, or choosing a new set of selectable objects. The user may interact with the interactable objects using hand gestures to actuate a user input device (see e.g., user input device 466 in FIG. 4), such as, e.g., by clicking on a mouse, tapping on a touch pad, swiping on a touch screen, hovering over or touching a capacitive button, pressing a key on a keyboard or a game controller (e.g., a 5-way d-pad), pointing a joystick, wand, or totem toward the object, pressing a button on a remote control, or other interactions with a user input device. The user may also interact with interactable objects using head, eye, hand, foot, or other body poses, such as, e.g., gazing or pointing with an arm at an object for a period of time, tapping foot, blinking eyes for a certain number of times during a threshold time interval. These hand gestures on the user input device and poses of the user can cause the AR system to initiate a selection event in which, for example a user interface operation is performed (a menu associated with the target interactable object is displayed, a gaming operation is performed on an avatar in a game, etc.).

Upon initiation of the selection event, the AR system can assign a focus indicator to a target interactable object in the user's FOV using the rules described herein. For example, in FIG. 12, the AR system may assign a focus indicator to the object 1244 because it is the closest to the midpoint of the FOV.

During the selection event, the user can change the target interactable object using a variety of hand gestures described herein. For example, in FIG. 12, the user can swipe leftwards on a touch screen which can cause the AR system to change the target interactable object from the object 1244 to the object 1230. The AR system can also transport the visible focus indicator from the object 1244 to the object 1230 accordingly.

In some implementations, hand gestures may cause the AR system to update the list of selectable objects in the user's FOV. For example, in FIG. 12, when the user swipes rightward, the AR system can move the object 1210 into the user's FOV and move object 1230 out of the user's FOV. The AR system may also update the target interactable object based on the new group of selectable objects. For example, after the object 1210 is moved into the FOV, the system may change the target interactable object from the object 1244 to the object 1242.

The user can confirm selection of the target interactable object using hand gestures or poses discussed herein. The user's action confirming the selection of the target intractable object may be the same or different action from the ones used for initiating the selection event. The AR system may change the focus indicator when the user confirms the selection, for example, by changing the color, brightness, or shape of the focus indicator.

The user can perform a series of user interface operations on the target interactable object. These operations can sometimes be referred to as interaction events. An interaction event can comprise, for example, resizing the interactable object, displaying a menu of the interactable object, browsing the menu, selecting an item on the menu, searching for an item, playing a game, watching a video, conducting a teleconference, previewing the target interactable object, and so on. The interaction event may occur concurrently or sequentially with a selection event. In some implementations, an interaction event may be part of a selection event.

In some embodiments, once the selection event is initiated, the wearable system may "lock" the user's FOV such that the wearable system will stop updating the group of selectable objects within the user's FOV even though the user's FOV has changed after the selection event is initiated. In some implementations, the user can still transport the focus indicator among the selectable objects within the user's FOV through actuations of the user input device or changes in poses.

The selection event can be terminated by a user input or by other interactions with the wearable system. For example, a selection event can be terminated by confirming the selection of the target interactable object, initiating an interaction event, actuating a user input device to end the selection event, determining a change in head or body pose which has the effect of terminating the selection event, and so on.

Examples of Selecting Virtual Objects in 3D Space Using Hand Gestures

The user may target and select an interactable object by actuating a user input device. FIG. 13A is an example of selecting an interactable object with a touch gesture on a touch screen 1310 of a user input device 1300. The user input device may be an embodiment of the user input device 466 shown in FIG. 4. The touch gesture can trigger the wearable system to assign a focus indicator to a target interactable object within the user's FOV. The touch gesture can also cause the wearable system to initiate a selection event, initiate an interaction event, terminate the selection event, terminate the interaction event, confirm the selection of the target interactable object, etc., alone or in combination.

Figure 13B:
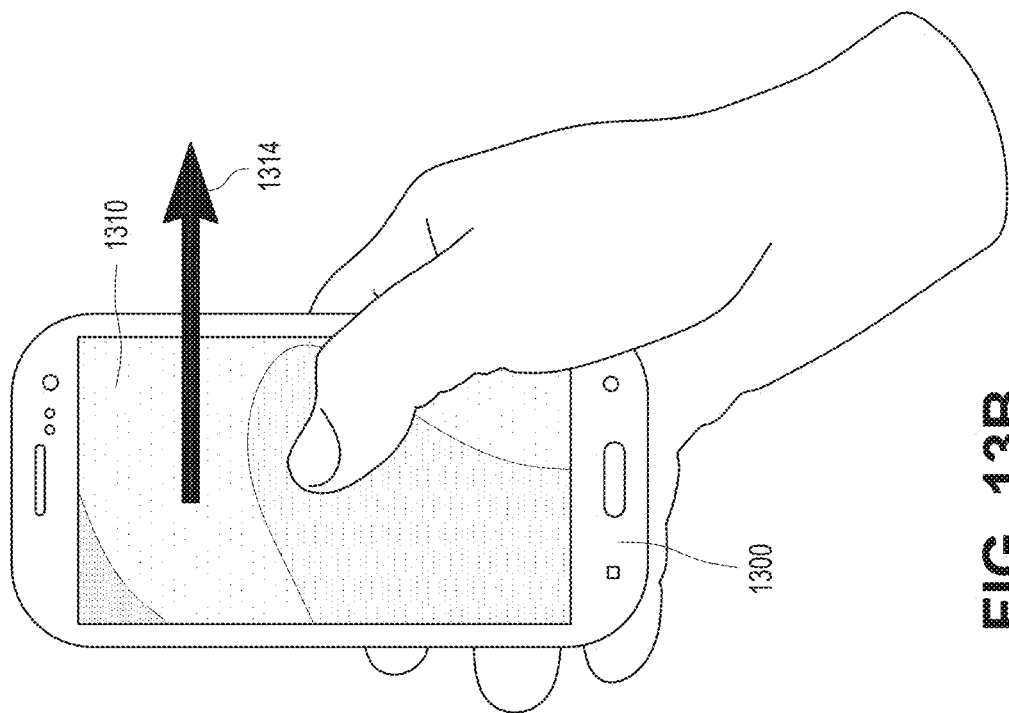
FIG. 13B illustrates an example of filtering selectable objects with hand gestures on a user input device.
Figure 13A:
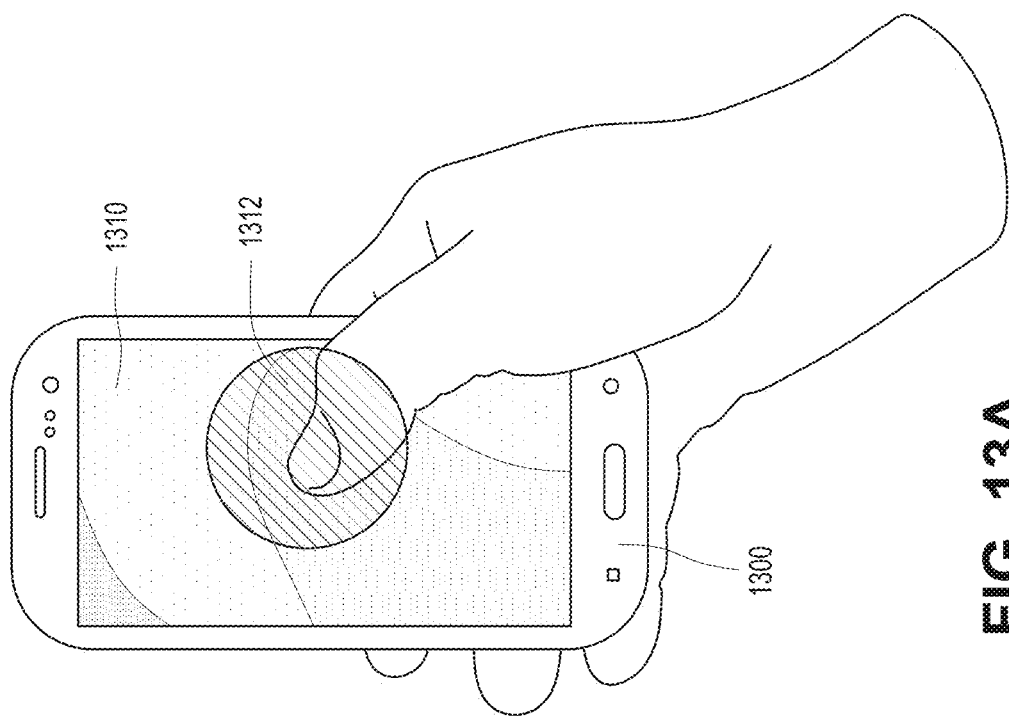
FIG. 13A illustrates an example of selecting an interactable object with a touch gesture on a touch screen of a user input device.

FIG. 13B is an example of filtering selectable objects with hand gestures on a user input device. The user may swipe along a path on the user input device 1300. For example, as indicated by arrow 1314 in FIG. 13B, the user may swipe along a path toward the right on a touch screen 1310. Any type of path can be used (e.g., horizontal, vertical, diagonal relative to the input device, or other trajectories) or any type of direction can be used (e.g., left or right, up or down, etc.).

The swipe gesture can cause the wearable system to move the visible focus indicator from one object to the other. With reference to the examples shown in FIG. 12, when the user swipes rightward (as indicated in the example in FIG. 13B), the AR system can transport the focus indicator from the object 1244 to the object 1242. In some embodiments, the swipe gesture can cause the AR system to update the list of selectable objects within the user's FOV. For example, when the user swipes rightward, the AR system can move the object 1210 into the user's FOV while moving the object 1230 out of the user's FOV. The object that receives the visible focus indicator can also be updated accordingly (e.g. from object 1244 to 1242).

The swipe gesture may be used in combination with a touch gesture (described with reference to FIG. 13A) and a head pose (described with reference to FIG. 14) to filter and select 3D virtual objects in the FOR or the FOV. As discussed herein, the user may also use other gestures or movements to change the set of selectable objects onto change the target interactable object.

Examples of Selecting Virtual Objects in 3D Space Using Head Poses

Figure 14:
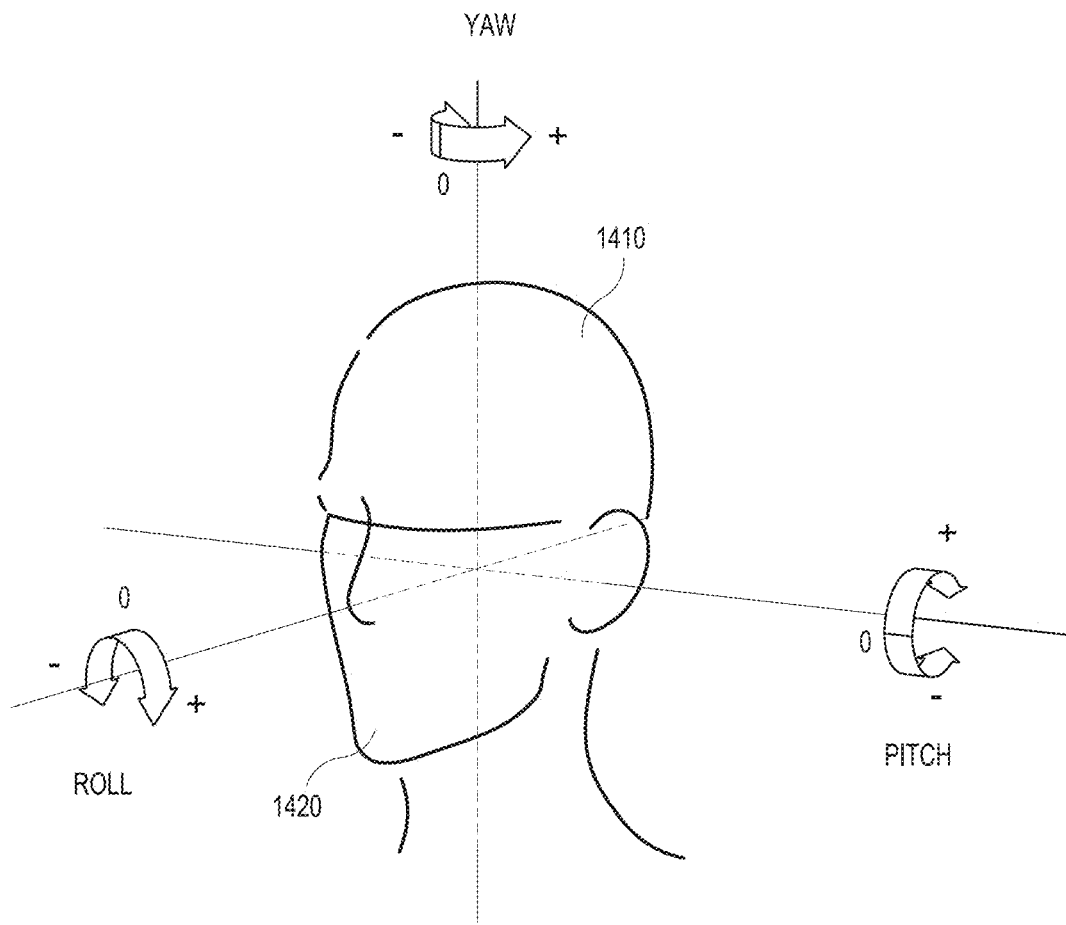
FIG. 14 is an example of a coordinate system for head poses.

FIG. 14 is an example of a coordinate system for head pose. A head 1410 may have multiple degrees of freedom. As the head 1410 moves toward different directions, the head pose will change relative to the natural resting direction 1420. The coordinate system in FIG. 14 shows three angular degrees of freedom (e.g. yaw, pitch, and roll) that can be used for measuring the head pose relative to the natural resting state 1420 of the head. As illustrated in FIG. 14, the head 1410 can tilt forward and backward (e.g. pitching), turning left and right (e.g. yawing), and tilting side to side (e.g. rolling). In other implementations, other techniques or angular representations for measuring head pose can be used, for example, any other type of Euler angle system.

The wearable system can use a variety of sensors described herein (such as with reference to FIGS. 2, 4, and 7) to determine the user's head pose. For example, the wearable system can use the IMUs or the inward-facing imaging system to calculate the user's head pose or eye pose. The wearable system can use data acquired by these sensors to identify a target interactable object. For example, the target interactable object may be the object that collides with the user's direction of gaze. The wearable system can identify the target interactable object and assign a visible focus indicator to the target interactable object based on an extended gaze towards a direction (e.g., the focus indicator is assigned to the target object if the user looks at the object for longer than a threshold time).

The wearable system can determine and update which object becomes the target interactable object based on a change in head pose such as e.g. rolling, yawing, or pitching during a selection event. For example, with reference to FIG. 12, when the user may turn his head 1410 leftward, the target interactable object may be updated from the object 1244 to its neighboring object such as the object 1230. In some implementations, the wearable system can transport the focus indicator from the object 1244 to the object 1230 to reflect this update.

The wearable system can also update the list of selectable objects in the user's FOV based on a change in the head pose. For example, the user may turn the head 1410 rightward, which can cause the wearable system to move the object 1230 out of the user's FOV and move the object 1210 into the user's FOV 1250. The target interactable object can also be updated accordingly using the rules described herein.

The user may use various changes of head poses or eye poses to switch among multiple planes. The user may also use variations of head poses or eye poses to initiate a selection event, confirm selection of the target interactable object, initiate an interaction event, interact with the target interactable object during an interaction event, terminating a selection event, or to perform other interactions with the user interface.

In some implementations, the wearable system can associate a certain depth plane to the user's head movement such that the user can only interact with virtual objects at that depth plane. For example, the wearable system can set the cursor (e.g., a reticle) corresponding to the user's head position to certain depth plane. As a result, as the user moves his head, the cursor will be transported within the set depth plane and the user can select among the objects at the set depth plane even though there may be other virtual objects at different depth planes. In some implementations, the depth plane may involve a virtual user interface. The wearable system can set the reticle to the depth plane of a target virtual user interface so that the user can interact with virtual objects within the target user interface plane.

Examples Interactions with a Combination of Head Pose and Hand Gestures on a User Input Device A user can also select a virtual object using a combination of the user's pose and the user's hand gestures. As an example, the user can perceive a group of virtual objects in the user's FOV. This group of virtual objects may be an embodiment of the selectable objects described herein. The group of virtual objects may be presented using the light field display described with reference to FIGS. 2, 4-6. The light field display can project the virtual objects at different depth planes to the user such that some virtual objects may appear to be in front of another virtual object.

The wearable system can maintain an array of virtual objects that are currently in the user's FOV. The wearable system may use the position of the virtual object in the user's environment as the array index for the virtual object. For example, the wearable system can use the y-value of the virtual object in a x-y-z coordinate (e.g. the x-y-z coordinate shown in FIG. 6) as the array index for the object. In other embodiments, the wearable system can use the x-value or the z-value, alone or in combination with the y-value to determine the virtual object's array index.

As the user moves his head or his direction of gaze, the group of virtual objects appear in the user's FOV may change. The wearable system can also update the array accordingly. In some implementations, the wearable system can use the array to maintain the virtual objects in the user's FOR and identify a group of virtual objects in the FOV when upon the user initiates the selection event.

The user can initiate a selection event on the virtual objects within the user's FOV by actuating a user input device. Upon initiation of the selection event, the wearable system can present a user interface which includes all (or a portion of the) virtual objects in the user's FOV. In some implementations, the wearable system can display a "hidden virtual object", such as a virtual user interface menu or certain information about the virtual object, etc. The "hidden virtual object" may become perceivable upon the initiation of the selection event while hidden prior to or after the initiation of the selection event.

In some embodiments, upon initiation of the selection event, the wearable system may change the positions of the virtual objects in the user's FOV. For example, the wearable system can bring the distant objects closer to the user or move nearby objects to be farther away from the user such that all virtual objects appear to be substantially at the same depth plane. In some implementations, the wearable system can change (increase or decrease) the size of the virtual object such that the virtual objects can fit the size of the user's FOV. Additionally or alternatively, the wearable system can show a portion of the virtual object (such as showing the icon instead of the content of a virtual email application) to the user.

The wearable system can also consolidate the virtual objects in the user's FOV into multiple depth planes upon initiation of the selection event. Each depth plane may be associated with a virtual user interface.

The wearable system can arrange the virtual objects on one or more user interface using the array index of the virtual object. For example, the wearable system can consolidate and present virtual objects whose y-axis value is within a certain range to be on the same user interface. Additionally or alternatively, the wearable system can arrange the virtual objects on the depth plan based on the user's pose. For example, where there may be multiple virtual objects in the user's direction of gaze because they are at different depth planes in the user's environment, the wearable system can present these virtual objects inside of the user's FOV upon the initiation of the selection event while place other virtual objects outside of the user's FOV. The user can move the virtual objects in and out of the FOV using the techniques described with reference to FIGS. 12 and 13.

The wearable system can identify a target interactable object and present a focus indicator indicating the target interactable object. The wearable system can reorganize the virtual objects near the target interactable object and present the reorganized virtual objects in the user's FOV. For example, with reference to FIG. 12, the wearable system can identify a group of virtual objects near the target interactable object based on the virtual object's distance from a fiducial position (such as the position of the target interactable object). The wearable system can reorganize the positions of these virtual objects based on the array index, a value in the x-y-z coordinate (shown in FIG. 6), or a distance from the target interactable object, etc. As shown in FIG. 12, the objects 1242, 1244, and 1230 may have different initial positions in the user's FOR. For example, the object 1242 may be positioned higher than the object 1244 (e.g. closer to the ceiling of the user's room) and may be farther away from the user than the object 1244. The initial position of the object 1230 may be lower (e.g. closer to the floor of the user's room) than the object 1244 in the user's FOR. When the wearable system identifies the object 1244 as the target interactable object, the wearable system can "collapse" the 3D space of the user into a 2D user interface based on the y-axis value, where the object with a larger y-axis value is positioned to the left side of the user's FOV. Accordingly, in the FOV 1250, the virtual object 1242 appears to be on the left of the virtual object 1244 which is to the left of the virtual object 1230. In other examples, different techniques for reorganization of the virtual objects may be used. For example, the FOV 1250 may show a 2D projection of the virtual objects in the 3D space. As described in FIG. 12, the user can use hand gestures to transport the focus indicator among the objects in the FOV. The user can also use hand gestures to change the target interactable object, which may cause the wearable system to present another set of virtual objects in the FOV based on the reorganizations of virtual objects near the new target interactable object. Where the wearable system is configured to present multiple user interfaces at different depth planes, the user can use also use hand gestures to transport the focus indicator among multiple depth planes to switch user interfaces. In some embodiments, the wearable system may restore the positions of the virtual objects to their original positions prior to the reorganization when the virtual objects are no longer in the user's FOV. In some situations, the virtual user interface presenting the reorganized virtual objects may be generated after the user initiates a selection event on the target interactable object. Additional details on interacting with multiple user interfaces are further described with reference to FIG. 15.

Examples of User Interaction Based on Contextual Information

The wearable system can automatically select or recommend a mode (e.g., poses or hand gesture on a user input device) of the user's interaction based on the contextual information. The contextual information can include the type of the objects (e.g., physical or virtual), the layout of the objects (e.g., the density of the objects, the locations and sizes of the objects, and so forth), the user's characteristics, or the user's current interactions with objects in the environment, in combination or the like. For example, during ray casting (described with reference to FIG. 10), the wearable system may detect that a user is looking at multiple virtual objects located closely to each other. The wearable system can calculate the density of the virtual objects in the user's FOV. When the density passes a certain threshold, the wearable system can recommend the user to switch the mode of user interaction. For example, when the density exceeds a certain threshold (which indicates that the objects are located very close to each other), the wearable system can switch the mode of user interaction from head pose to hand gestures on a user input device so as to allow more precise interactions with the objects. As another example, when the density drops below a certain threshold (which indicates that the objects are far away from each other), the wearable system can switch the mode of user interaction from hand gestures on the user input device to head pose. These implementations may be particularly advantageous because head position may be difficult to control with accuracy and it may cause user fatigue when the user tries to accurately position his head to interact with densely clustered objects. On the other hand, the hand gestures on a user input device may provide a more refined control of the user's position but it may cause user fatigue when the user has to move his hand for a large amount of distance in order to select sparsely located objects.

Figure 15:
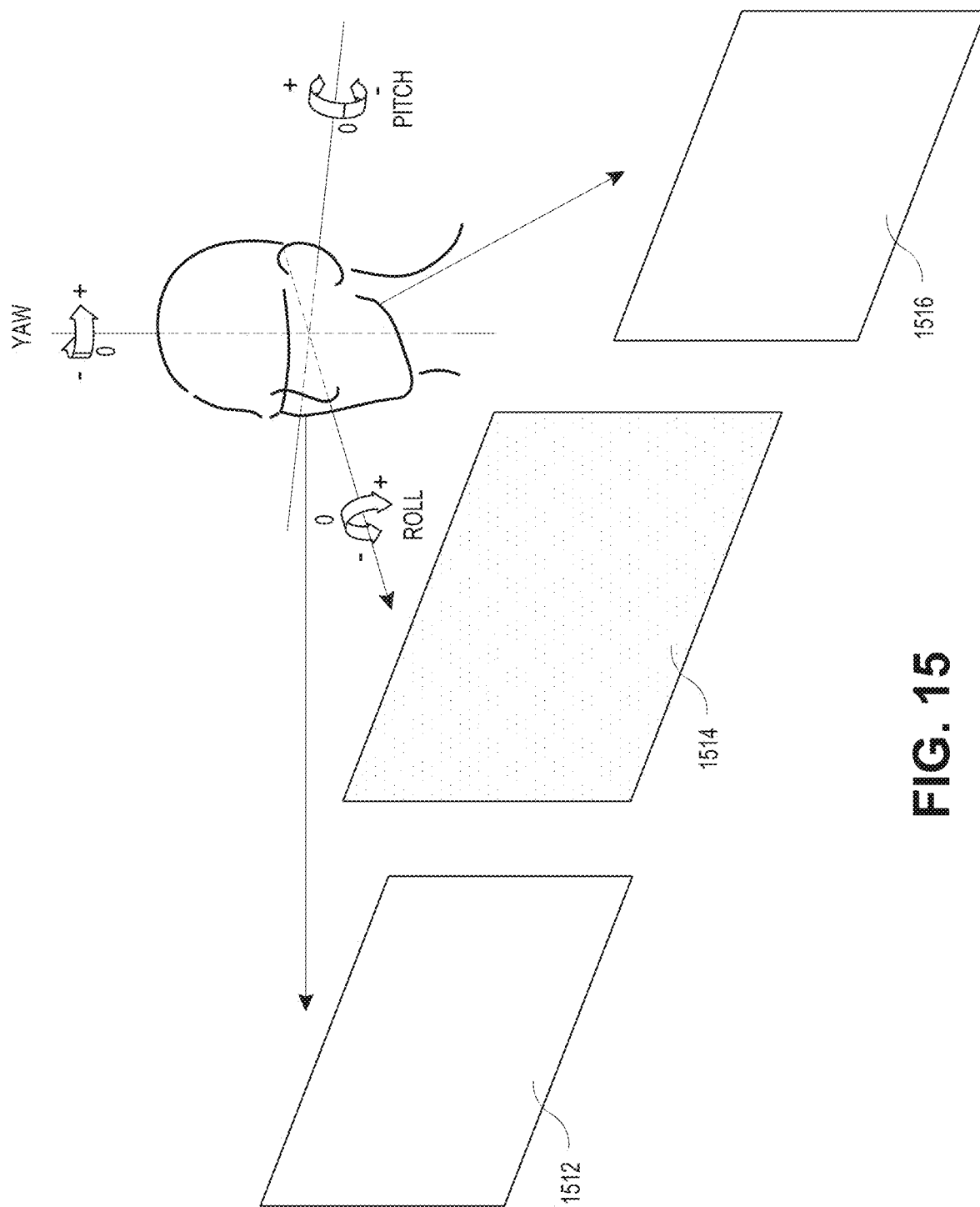
FIG. 15 illustrates an example of interacting with interactable objects with head poses.

FIGS. 15 and 16 provide an example of changing the mode of user interaction based on the contextual information. FIG. 15 illustrates an example of interacting with interactable objects with head poses. FIG. 16 illustrates an example of interacting with interactable objects with hand gestures on a user input device. The user input device 1610 shown in FIG. 16 may be an embodiment of the user input device 466 described in FIG. 4.

In FIG. 15, the user's FOR includes interactable objects such as virtual user interfaces 1512, 1514, and 1516. In some implementations, the virtual user interfaces 1512, 1514, and 1516 may be planar objects which include other virtual objects (1D, 2D, or 3D) within the virtual user interface planes. The virtual user interfaces 1512, 1514, and 1516 have a large size and are not densely located next to each other. As a result, the wearable system may determine that the head movement may be an optimal mode of user interaction because the user does not have to move a large distance on the user input device in order to select a virtual user interface. The wearable system may use ray casting technique to identify that the user is currently looking at the virtual user interface 1514. The user may initiate a selection event on the virtual user interface 1514 to interact with objects in the user interface 1514. As shown in FIG. 16, the virtual user interface 1514 can include multiple virtual objects such as, e.g., a virtual TV screen 1632, a virtual coffee cup 1636, a virtual clock 1634, a camera application 1652, a weather application 1638, and a music application, etc.

Examples of Recommending a Mode of User Interaction Based on Contextual Information As an example, in FIG. 16, the wearable system can determine the relative positions among the virtual TV 1632, the virtual clock 1634, the virtual coffee mug 1636, and the weather application 1638. Because these four objects are close to each other, the wearable system may present an option to the user whether he wants to switch from head pose to hand control on when the wearable system determines that the user's current position is at the position 1620.

On the other head, the object 1652 (a camera application) does not have other objects in its vicinity. Accordingly, the wearable system may not provide option of using user input device to interact with the object 1652. But the user may still interact with the object 1652 using poses such as head pose and eye pose.

The user can confirm switching the mode of user interactions using the user input device or by changing a body pose (such as nodding the head). When the mode of user interaction is switched to the user input device, the user can actuate the user input device 1610 to interact with virtual objects. For example, the user can swipe along a path on the user input device 1610 which transports a cursor from position 1620 to the position 1624. Similarly, the user can actuate the user input device 1610 which moves the cursor (which may be in the shape of an arrow) from position 1620 to 1622. Besides these examples, the user may swipe along any type of paths (e.g., horizontal, vertical, or diagonal relative to the input device) or any type of directions (e.g., left or right, up or down, etc.) on the user input device 1610.

When the cursor is at position 1624, a portion of the cursor overlaps with the virtual TV screen 1632. The user may actuate the user input device 1610 (e.g., by clicking on the touch screen) to select the virtual TV screen 1632. When the wearable system receives the selection of the virtual TV screen 1632, the wearable system may display one or more virtual menus (e.g., virtual menus 1642*a* and 1642*b*) associated with the TV screen. For example, the virtual menu may include options such as, e.g., adjusting volumes, choosing a video application (e.g., a movie or television streaming service), choosing to initiate a teleconference, etc.

Examples of Automatically Switching User Interaction Mode Based on Contextual Information The wearable system can also automatically switch the mode of user interactions. For example, the mode of user interactions may be set to head pose when the user is selecting among virtual user interface planes 1512, 1514, 1516. Once the user selects a virtual user interface plane, the mode of user interactions may be automatically changed to hand gestures on the user input device (as shown in FIG. 16). As another example, the mode of user interactions can be set to body pose when the objects are sufficiently sparse or when the layout of objects meets certain criteria (such as when there is no occlusions among objects). The wearable system can automatically change the mode of user interactions to hand gestures on the user input device when the objects become densely positions or when the layout of objects no longer meets the criteria (such as when one object occludes another object).

The wearable system can consider the relative positions of objects in the 3D space additionally or alternatively to the relative positions of the objects in the 2D space. For example, the user interface 1514 may be a 3D user interface instead of a 2D user interface. As shown in FIG. 16, the weather application 1638 may be located in a depth plane farther away from the user than the coffee mug application 1636. When the user's direction of gaze is at the position 1620, the wearable system may detect two virtual objects (the virtual clock 1634 and the music application 1654) which intersect with the user's direction of gaze, even though the music application 1654 may appear to be farther away than the virtual clock 1634. Based on this information, the wearable system may determine that the objects are sufficiently close to each other. Accordingly, the wearable system may automatically switch the mode of user interactions to hand gestures or prompt an option for user to switch to hand gestures.

Other Examples User Interface Features Based on Contextual Information

In some implementations, the wearable system may reposition the dense cluster of virtual objects to one or more fixed depth planes when the user switched to hand gestures. As described with reference to FIGS. 12, 13A-13B, the user can select the virtual objects within the fixed depth planes or switch the depth planes using hand gestures. This implementation may be particularly advantageous because it reduces cumbersome operations on the user input device caused by navigating among virtual objects each located at a slightly different depth plane in the 3D space.

The wearable system can change the focus indicator or the cursor, alone or in combination, when the mode of user interaction has changed from one method to another. For example, the wearable system may change the color of the focus indicator when the user changes the mode of user interaction from head pose to hand gestures on the user input device (and vice versa). In another example, the wearable system may change the appearance of the focus indicator from a reticle shape to an arrow shape (shown in FIG. 16) to indicate the option of changing input control from head pose to hand gestures on the user input device.

In some implementations, the change in the focus indicator or the cursor, alone or in combination, may be used to indicate an option for changing the mode of user interaction has become available. For example, while the user is interacting with a group of sparsely positioned objects using hand gestures on the user input device, the wearable system can change the appearance of the focus indicator from an arrow to a reticle indicating that the option of interaction using head pose is available. The user can confirm the change from hand gestures to head pose by, for example, actuating the user input device (such as tapping the user input device) or changing the body pose (such as nodding his head). As another example, the wearable system can provide a vibration on the user input device as a focus indicator to show that an alternative mode of user interaction becomes available.

Although the examples are described with reference to selecting one object, the wearable system may be configured to identify multiple target objects and selecting multiple target objects. The AR system may be configured to recursively perform a selection event on a subgroup of the target interactable objects. For example, the AR system may identify several target objects which collide with a virtual cone in a ray cast (described in FIG. 10). The target objects may include interactable objects. The AR system can magnify these target objects and allow the user to select within these target objects using the poses and/or hand gestures described herein. Furthermore, although the examples are described with reference to changing between head pose and hand gestures on the user input device, similar techniques can also be used to switch among other modes of user interactions. For example, the wearable system may employ similar techniques to change the mode of user interactions among body pose, hand gestures, head pose, foot pose, eye pose, etc., alone or in combination.

Examples of an Interaction Event

A user can initiate an interaction event on an interactable object in his FOV after the user selects the interactable object. In some implementations, the virtual object may correspond to a physical object. As a result, when the user performs an interaction event on the virtual object, the virtual object may communicate to the physical object thereby allowing the user to interact with the physical object via the virtual user interface. For example, the 3D coffee mug 1636 in FIG. 16 may be in communication with a coffee machine in the user's environment. Water level shown in the 3D coffee mug 1636 may represent the coffee making progress. As an example, the water level may initially be invisible because the coffee machine is idle. The user can select 3D coffee mug 1636 and initiate an interaction event which causes the wearable system to send an instruction to the coffee machine in the user's kitchen to start brewing coffee. During the brewing process, the water level in the 3D coffee mug 1636 may gradually increase as the coffee machine generates more coffee. When the coffee machine finishes the brewing, the wearable system may show that the 3D coffee mug 1636 is full. In some implementations, the wearable system may also provide a focus indicator (such as a sound or a halo) on the 3D coffee mug indicating that the coffee has finished brewing.

Figure 17:
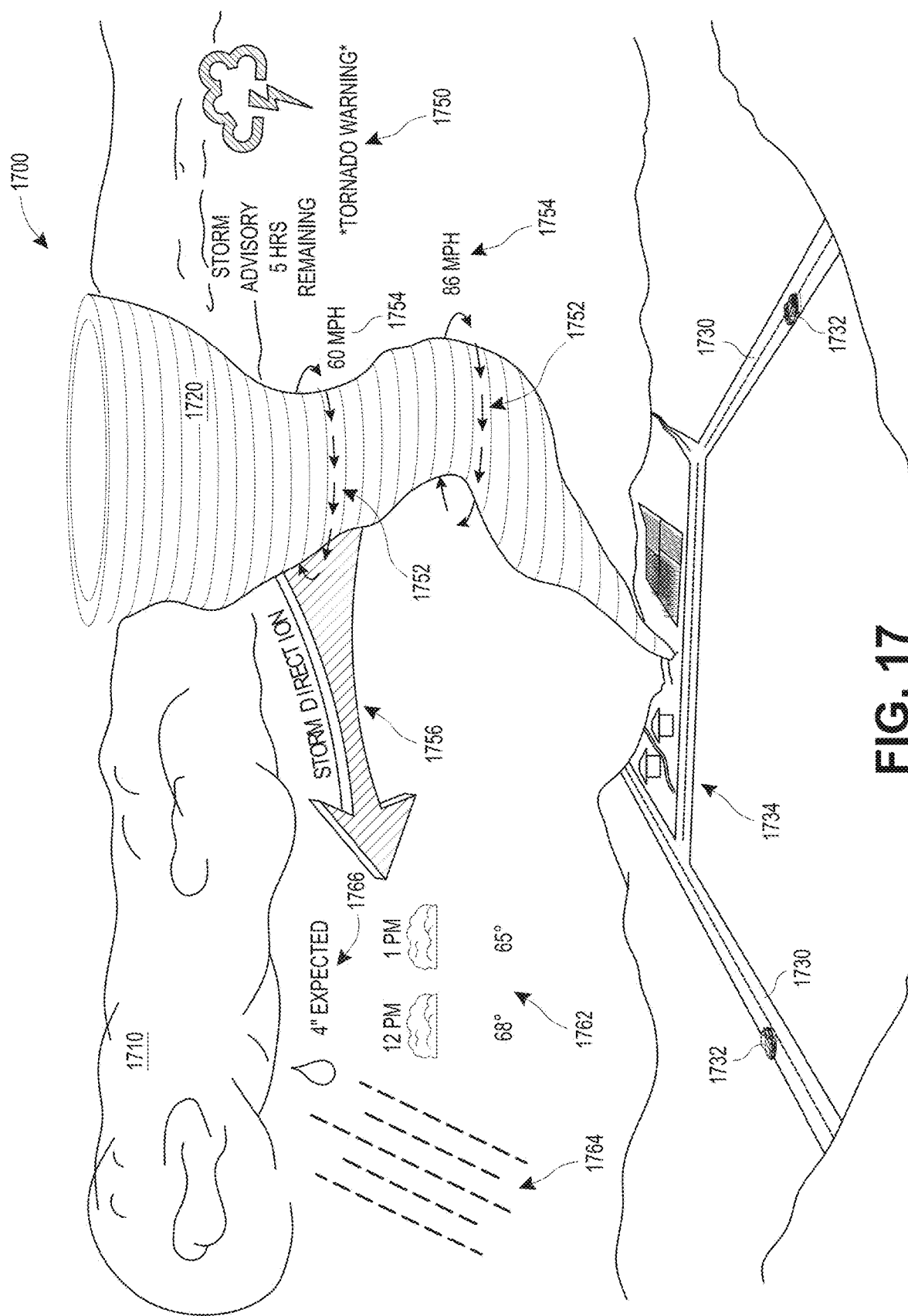
FIG. 17 illustrates an example interaction event with a weather application.

As another example, the wearable system can present virtual content associated with physical objects in the user's environment during an interaction event. In FIG. 16 a user can select the weather application 1638 and initiate an interaction event on the weather application 1638. FIG. 17 illustrates an example interaction event with the weather application 1638. In this example, user of the wearable system may be outside of his home and can perceive physical objects such as distant storm clouds 1710 and a tornado 1720. The user can also perceive other physical objects such as roads 1730, vehicles 1732, and buildings 1734.

The wearable system can identify the user's location by analyzing the images of the user's environment. When the user initiates an interaction event on the weather application 1638 (shown in FIG. 16), the wearable system can present an AR/MR scene 1700 superimposed on the physical objects in the user's FOR. The wearable system can use geolocation sensors (e.g., global positioning system (GPS) sensors) to determine the user's location and information about the weather near the user (e.g., the presence of the storm clouds 1710 and the tornado 1720 that the user is viewing). In some implementations, the wearable system can also use an outward-facing imaging system to acquire the images of the user's environment. The wearable system can determine that the user is looking toward the storm 1710 and the tornado 1720 using the sensors such as outward-facing imaging system 464, inward-facing imaging system 462, or IMUs (described in FIG. 4) alone or in combination.

The wearable system can communicate with a network (wired or wireless) to access information about the storm and display the information to the user as virtual content, e.g., the existence and duration of a storm advisory 1750, the speed 1754 of the tornado, a weather forecast 1762 (e.g., temperature, chance of rain, as a function of time), the storm's direction 1756 (e.g., storm position as a function of time), expected rainfall 1766, etc. This information can be presented via text or graphics to the user so that at least a portion of the information is perceived to be at or near the location of the storm clouds 1710 or the tornado 1720 (e.g., the virtual content can appear as superposed on the physical content). For example, as shown in FIG. 17, arrows 1752 indicate the direction in the storm (e.g., in the tornado) and appear as if they are 3D and superimposed on or around the tornado 1720 from the perspective of the user of the wearable system. Wind speeds 1754 can be presented near the direction arrows 1752. The wearable system can present to the wearer other information about the storm such as, e.g., temperature forecast 1762, where rain is currently or expected to be falling (e.g., shown via slanting dashed lines 1764 below the storm clouds 1710), how much rain is expected to fall (as shown with reference numeral 1766), the direction 1752 and speed 1754 of winds in the storm (e.g., at different heights in the tornado 1720), and so forth.

The wearable system can use the light field display (shown in FIGS. 4-6) to present realistic, 3D virtual content 1750, 1752, 1754, 1756, 1762, 1764, 1766 so that it appears at an appropriate distance from the user (e.g., on or near the storm 1710 and the tornado 1720) and appropriately sized, shaped, or scaled (e.g., as schematically shown in FIG. 17) to the user of the wearable system.

Figure 18:
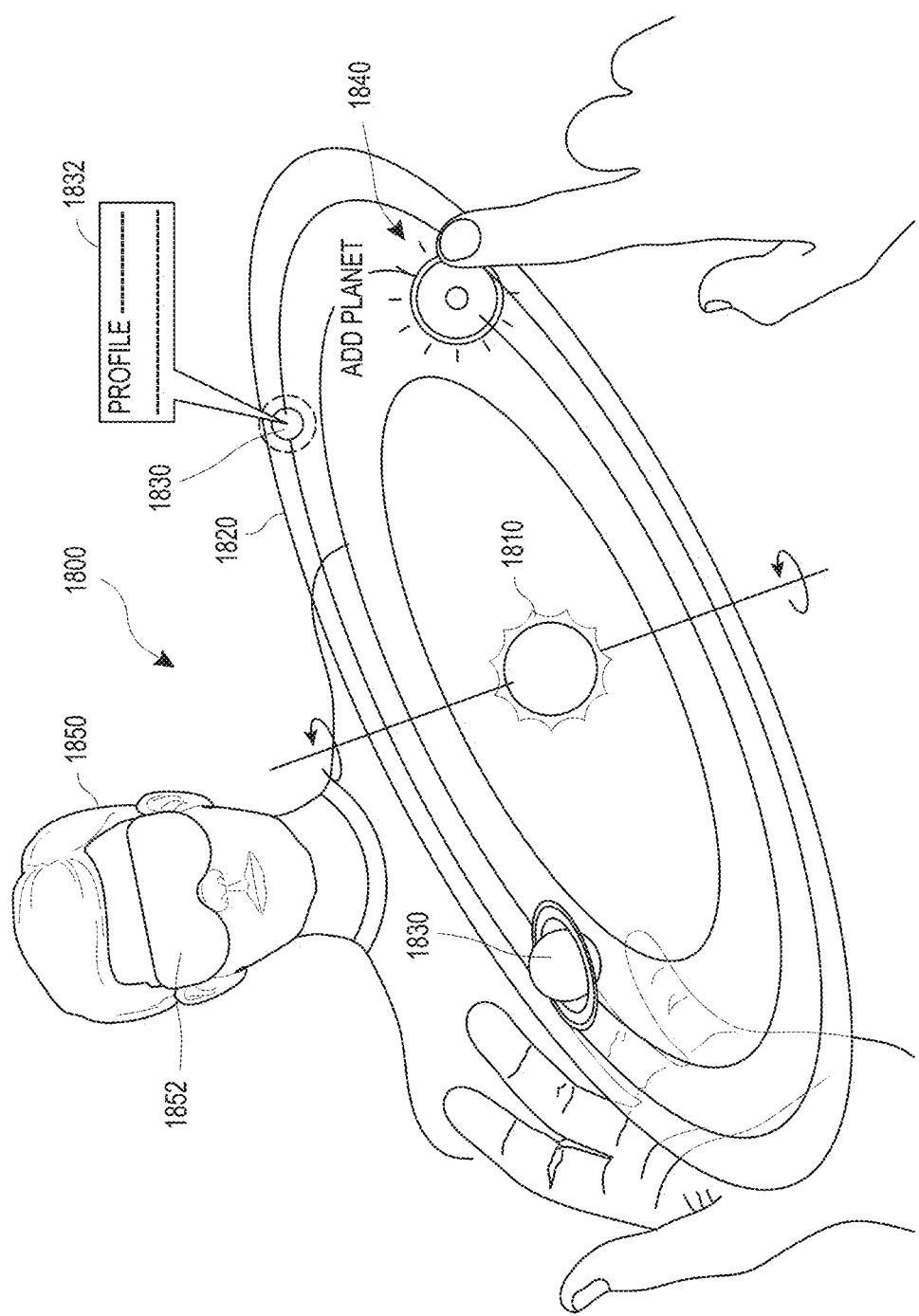
FIG. 18 illustrates an example user experience of interacting with a 3D virtual object.

The wearable system can also allow two or more users to interact with an interactable object. Both users may wear their respective wearable systems (such as their head mounted device). FIG. 18 illustrates an example user experience of multiple users interacting with a 3D virtual object. In this example, a user is wearing a wearable device 1852. The user can perceive virtual content 1800 through the wearable device 1852. In this example, the virtual content can include an astronomical object 1810 (e.g., a star or in other cases a galaxy, planet, nebula, or solar system). Information about the virtual content 1800 can be displayed so that it appears on or adjacent to the virtual content. For example, orbits 1820 of stars or planets 1830, constellations, nearby stars, etc. can be displayed near the astronomical object 1810. The wearable system can present a user interface to the wearer, who can use poses or a user input device to access virtual menus 1832 or virtual input features 1840 in which different actions can be selected (e.g. by gestures). For example, as shown in FIG. 18, the virtual menu 1832 may permit the wearer to edit/delete or save a profile of the virtual content 1800 being displayed. The profile can allow the wearer (or another authorized user) to access the virtual content at a different time or place. Another virtual menu may permit the user to interact with the virtual content and to modify the virtual content being displayed. For example, as shown in FIG. 18, the user input element 1840 can permit the wearer to "Add Planet" (e.g., by selecting the virtual button 1840 with a gesture such as "pressing" the wearer's finger at the position of the virtual button 1840). After selection, the wearer may be able to access functionality (e.g., via a virtual menu, virtual drop down box, etc.) to create a planet profile with information such as a name, diameter, temperature, or distance of the planet. After selection, the additional virtual content (an additional planet, in this example) can be displayed to the wearer.

The wearable systems can permit a user to share the virtual content with others, for example by passing the world map of the user's environment or communicating the virtual content (or updates to the virtual content) between the wearable systems via a network. For example, as shown in FIG. 18, another user wearing a wearable system 200 can view the virtual content being shared and manipulated by the first user. Both users can enjoy the experience of interacting with each other and with the virtual content. Although an astronomical object 1810 is used 3 in this example, the virtual content 1800 can be any type of content. For example, an encyclopedia may be accessed and content on one or more subjects displayed and shared (with virtual text, virtual images, sounds, etc.). The group of users sharing the virtual content need not be physically present in the same location to view the virtual content and many users (e.g., 2, 3, 4, 5, 10, 100, or more) can substantially simultaneously view the shared virtual content.

Although the examples are described with reference to a virtual planetary system and a weather application, those examples are not limiting. The techniques described herein can also apply to other applications that present an interactive virtual content in an AR/MR/VR environment. For example, the wearable system can be programmed to include a clothes shopping application. While a user is in a department store, the application can access a database associated with the department store to identify information or a rack of clothes. The application can present the accessed information as virtual content superimposed on the physical clothes in the department store.

Figure 19:
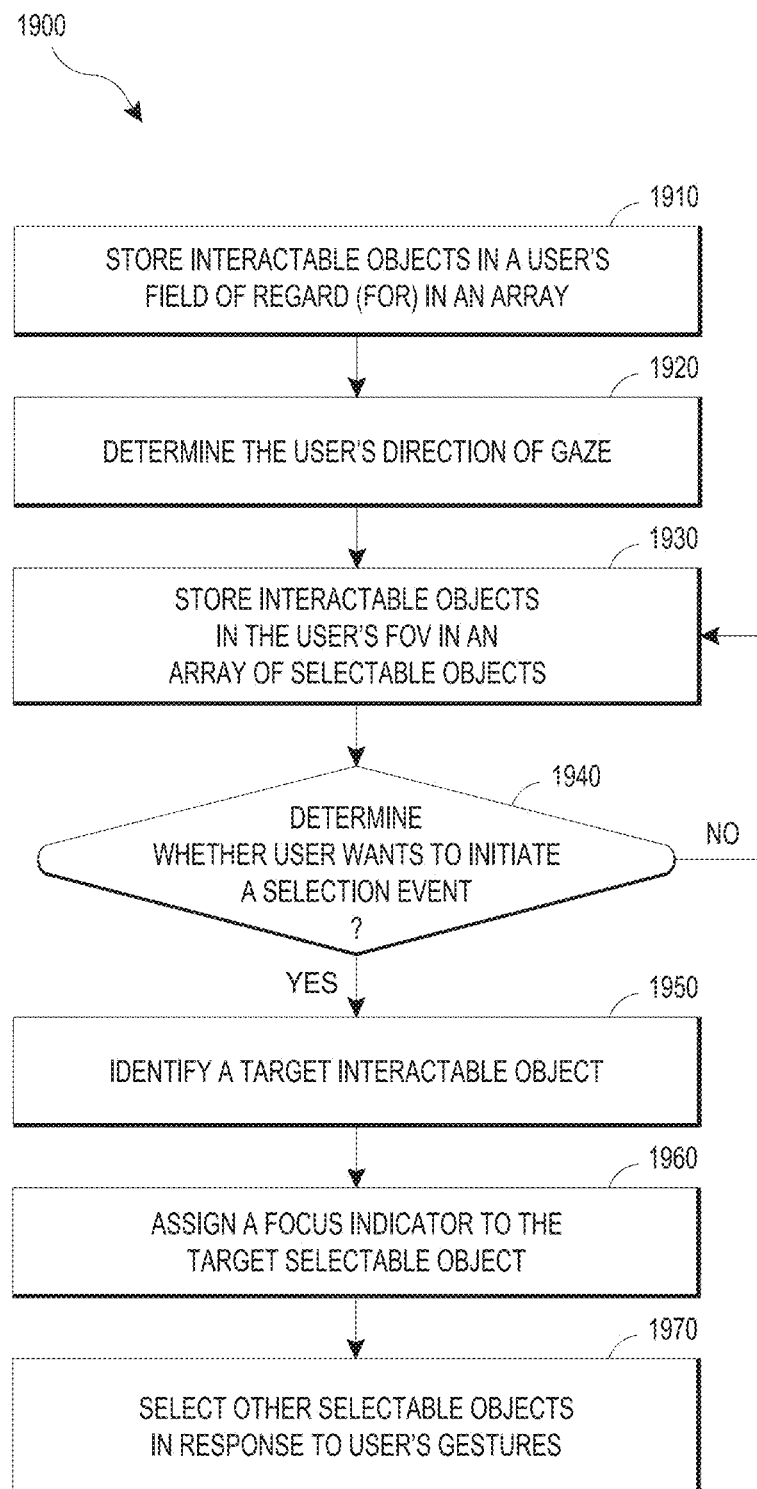
FIG. 19 illustrates an example process for selecting a virtual object using a combination of poses and hand gestures on the user input device.

Example Processes of Selecting a Virtual Object Using a Combination of Poses and User Input Device FIG. 19 illustrates an example process for selecting a virtual object using a combination of poses and hand gestures on the user input device. The process 1900 can be performed by the wearable system (e.g. an HMD) described herein (e.g., by one or both of the processing modules 260, 270). The wearable system may include a user input device (see e.g. user input device 466 in FIG. 4), various imaging system such as an outward-facing imaging system (see e.g. outward-facing imaging system 464 in FIG. 4) and an inward-facing imaging system (see e.g. inward-facing imaging system 462 in FIG. 4).

At block 1910, the wearable system can identify interactable objects in the user's FOR. The interactable objects may be stored, for example, in a remote data repository 280 (shown in FIG. 2) using a data structure such as an array. The interactable objects in the user's FOR can be a subset of all objects in the user's FOR. The wearable system can use the outward-facing imaging system 462 as well as other sensors (such as IMUs and GPS) to determine the location of the user and use this location information to determine interactable objects in the user's environment.

At block 1920, the wearable system can measure the user's poses using the sensors described herein. The wearable system can use inward-facing imaging system 462 to identify the user's direction.

At block 1930, the wearable system can identify interactable objects in the user's FOV based on the user's direction of gaze. The FOV can also use ray casting to determine which interactable objects intersect with the user's direction of gaze. In some implementations, the interactable objects in the user's FOV may be referred to as selectable objects. The wearable system can store the selectable objects in an array using the positions of the selectable objects. For example, the wearable system can index the selectable objects (and/or the interactable objects) based on the x-axis value (see e.g. x-y-z coordinate in FIG. 6). The wearable system can sort the objects based on the x-axis value and present the selectable objects from left to right in the user's FOV in a 1 D or 2D view.

In some implementations, the wearable system may not have a separate array just for selectable objects. In these implementations, the wearable system can identify and retrieve the selectable objects from the array of interactable objects using, for example, the array indices of the selectable objects (which are determined based on the user's FOV).

In some embodiments, however, the wearable system may maintain two arrays in which one array is for the interactable objects in the user's FOR while another array is for selectable objects in the user's FOV. For example, the array for the interactable objects may be kept in the remote data repository 280 (shown in FIG. 2) while the array for the selectable objects may be kept in a data store local to the wearable system. This implementation may be advantageous because the local storage and data processing capacity of the wearable system may be limited while the remote data repository may have larger data storage and a more powerful data processing capacity. By only keeping a subset of all interactable objects in the local store of the wearable system, it may reduce the hardware requirements for the wearable system and decrease the likelihood of data overflow in the wearable system.

If there are no interactable objects within the user's FOV, the wearable system can go back to the block 1910. The wearable system can continuously monitor the user's pose, update the user's FOV, and continuously determine the list of interactable objects within the user's FOV.

At block 1940, the wearable system can determine whether the user wants to initiate a selection event on an object in the user's FOV. The wearable system can make such determinations based on a variety of indications, such as, e.g., gazing at an object for an extended period of time, user's head pose such as nodding, or input from the user input device, alone or in combination. If the wearable system receives an indication that the user wants to select an object, the wearable system may allow the user to interact with selectable objects using various hand gestures described herein. For example, the user can swipe along a trajectory on the user input device to browse the selectable objects or click on a user input device to select a selectable object.

The initiation of a selection vent may cause the wearable system to identify a target interactable object in the user's FOV (at block 1940) and assign a focus indicator (at block 1950) to the target interactable object. The target interactable object may be the object at the left or right hand side of the FOV. The visible focus indicator may also be placed on the object at the center of the FOV when the object at the center is the target interactable object. The wearable system may also use 3D eye tracking to determine the direction of the user's eye pose and place a visible focus indicator on the object which intersects with the direction of the user's eye pose.

At block 1960, the user can transport the focus indicator to another object using various gestures described herein. The target interactable object can accordingly be updated to the other object. For example, the user can move the focus indicator from its current position to its neighboring object and as a result, the target interactable object is updated to the neighboring object.

In some embodiments, these gestures may cause the wearable system to move virtual objects along a path within a user's FOV (instead of transporting the visible focus indicator itself). For example, with reference to FIG. 12, when the user swipes leftward on a touchpad, it may have the effect of moving object 1230 entirely into the FOV, while shifting the position of object 1242 leftward.

Figure 20:
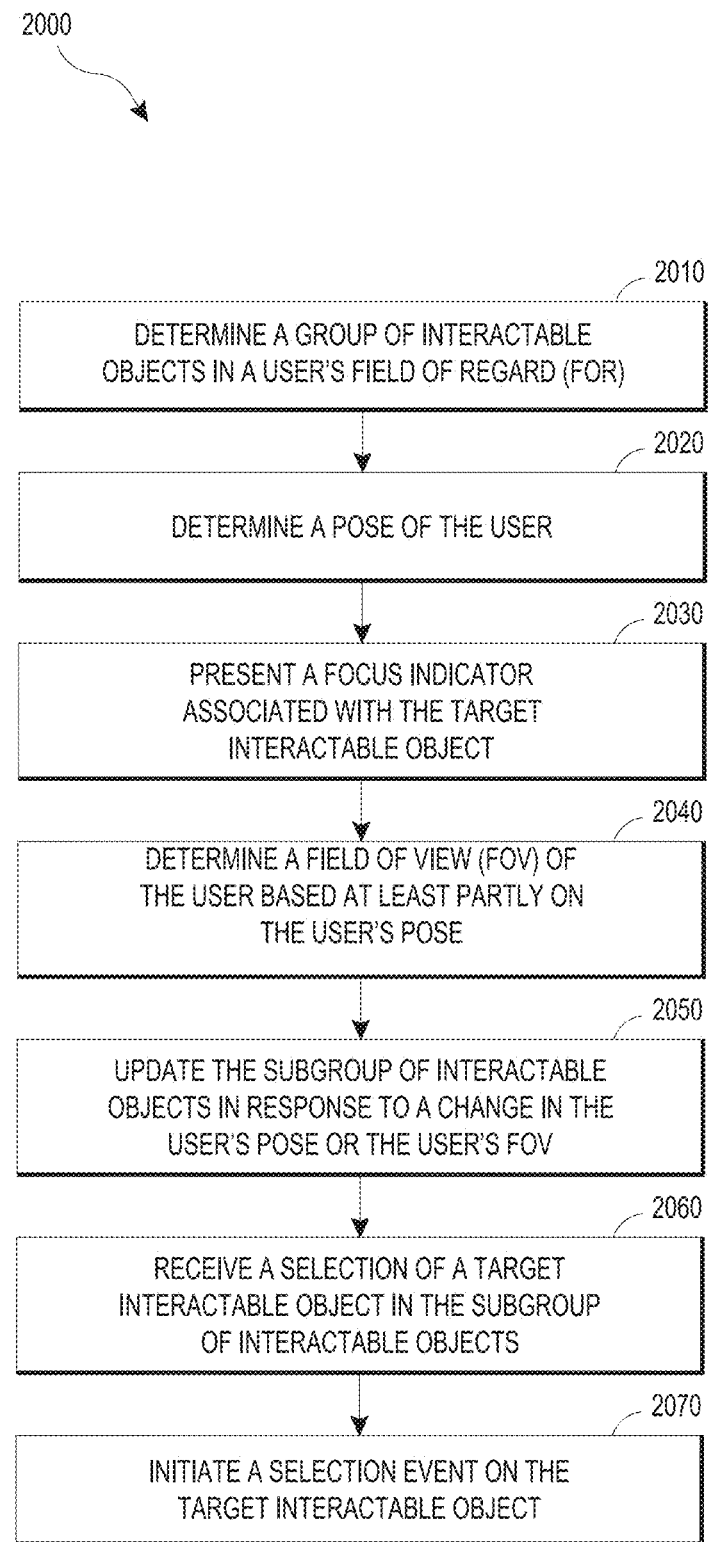
FIG. 20 illustrates an example process for interacting with a virtual object using a combination of poses and hand gestures on the user input device.

FIG. 20 illustrates an example process for interacting with a virtual object using a combination of poses and hand gestures on the user input device. The process 2000 can be performed by the wearable system described herein.

At block 2010, the wearable system can determine a group of interactable objects in the user's FOR. The group of interactable objects can be a subset of objects in the user's environment. The interactable objects can be virtual objects and/or physical objects. In some embodiments, the AR system can add virtual elements to the existing physical objects. For example, the AR system may add a virtual menu to a television in the room, where the virtual menu may give the user the option to turn on the television using the AR system.

As described with reference to FIG. 12, the AR system may store the interactable objects and information associated with the interactable objects in a variety of data structures. Locations of the objects may be used as indices to store information associated with the objects.

At block 2020, the wearable system can determine the user's pose. The user's pose may be the head, eye, foot, or other body poses, alone or in combination. The wearable system can determine the user's pose using a variety of sensors shown in FIG. 4, such as e.g., the inward-facing imaging system 462, inputs received on the user input device 466, or the outward-facing imaging system 464.

At block 2030, the wearable system can determine the user's FOV based on the user's pose. The FOV can comprise a portion of the FOR that is perceived at a given time by the user. Based on the user's FOV, at block 2040, the AR system can determine a subgroup of interactable objects which are within the user's FOV. This subgroup of interactable objects is sometimes referred to as selectable objects. As the user's FOV changes, the selectable objects within the user's FOV also change.

At block 2050, the wearable system receives a selection of a target interactable object from the subgroup of interactable objects. The wearable system can initially choose a target interactable object based on a variety of rules (such as the location of the target interactable object relative to the user's FOV) as described with reference to FIG. 12. The AR system can assign a focus indicator to the target interactable object. The visible focus indicator may move from one object to the other as the user's FOV changes.

In some embodiments, the wearable system can identify a target interactable object after the user actuates an user input device. The user can actuate the user input device using various hand gestures described with reference to FIGS. 12-13. These hand gestures can trigger the wearable system to assign a focus indicator to the target interactable object within the user's FOV. In some implementations, when the AR system receives a selection of the target interactable object from the user, the AR system may stop updating the group of selectable objects in the user's FOV while the user's FOV changes. The user can still browse the interactable objects or transport the visible focus indicator from one object to the other within his FOV.

At block 2070, the user may decide to initiate a selection event on the target interactable object. The selection event can be initiated using the poses and gestures described herein. In some embodiments, the initiation of a selection event may trigger the wearable system to assign a visible focus indicator to the target interactable object. The wearable system may stop updating the group of selectable objects in the user's FOV even though the user's FOV may change with changes in user's poses. The user may transport the visible focus indicator from one object to the other within the user's FOV using gestures described herein. For example, the user may swipe along a trajectory (such as left and right) on a touchpad which can cause the wearable system to move the visible focus indicator from one object to its nearest neighbor.

In some implementations, the user may initiate an interaction event during or after a selection event. The interaction event may also be part of the selection event. For example, as described with reference to FIG. 12, the interaction event can comprise resizing the interactable object, displaying a menu of the interactable object, browsing the menu, selecting an item on the menu, searching for an item, playing a game, watching a video, conducting a teleconference, and so on. The user can participate in the interaction event using the various poses and gestures described herein. The user may also confirm the selection of the target interactable object using poses and gestures discussed herein.

Example Processes of Interacting with Objects Based on Contextual Information

Figure 21:
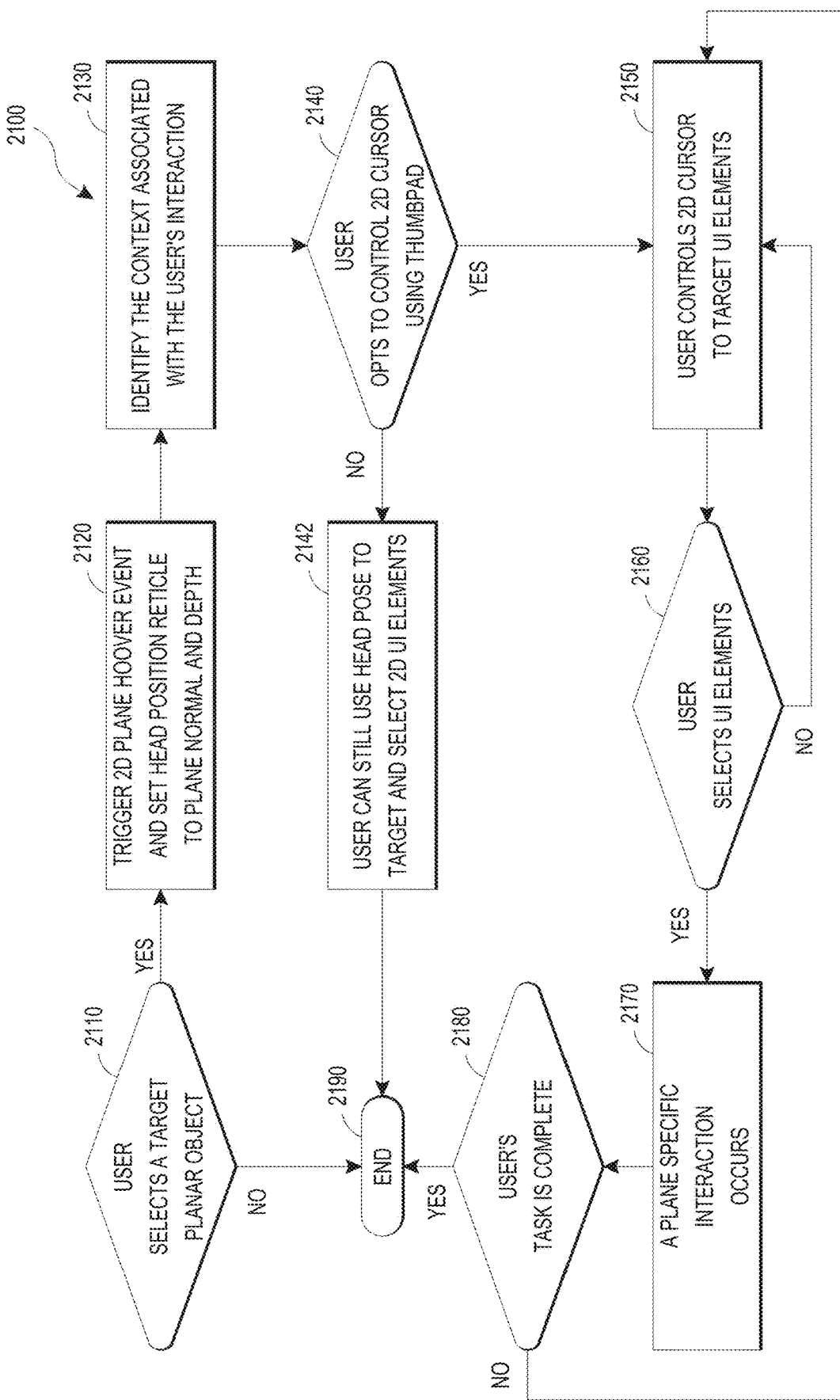
FIG. 21 illustrates an example process for switching an input control from a head pose to a hand gesture based on contextual information.

FIG. 21 illustrates an example process for switching input control head pose to hand gesture based on the contextual information. The process 2100 can be performed by the wearable system described herein (e.g., by one or both of the processing modules 260, 270).

The wearable system can display a cursor indicating the user's current position. The cursor can be a reticle corresponding to the user's head position. As the user moves around, the cursor may be moved to a target interactable object. The user can select the target interactable object using poses, hand gestures on the user input device, alone or in combination. In the process 2100, the user may initially be interacting with objects using head pose. At block 2110, the wearable system can determine whether the user has selected a target interactable object. The target interactable object may be a 2D planar virtual user interface. If the user does not select the target interactable object, the process ends at block 2190. In some embodiments, the wearable system can continuously determine the user's current position as the user moves around. The wearable system can identify other target interactable objects in the user's FOV based on the user's head pose.

As shown in block 2120, when the wearable system receives the selection of the target interactable object such as the 2D planar virtual user interface, the wearable system may assign a focus indicator to the target interactable object. For example, the wearable system can display a halo around the target interactable object and bring the target interactable object to be closer to the user as if the target interactable object appears to be hovering in the 3D space. The wearable system can also set normal and depth of the cursor (which corresponds to the head position) to be the same as the normal and depth of the target interactable object. As a result, the user may continue interacting with virtual objects within the target interactable object using head poses.

At block 2130, the wearable system can identify the context associated with the user's interactions. For example, the wearable system can determine the layout of the virtual objects (or physical objects) in the user's FOV.

At block 2140, if the wearable system determines that the layout meets a certain pattern (such as one virtual object is occluded by another virtual object) or the density exceeds a certain threshold, the wearable system may provide an option to the user for switching the mode of the input control. As an example, the wearable system may provide an option to the user for switching interaction mode from head pose to user input device.

As shown in block 2142, if the user chooses not to switch, then the user can still use head poses to target and select interactable objects. The process ends at block 2190.

If the user chooses to switch the input control to hand gestures, at block 2150, the user can actuate the user input device to interact with a virtual object. At block 2160, the wearable system can receive the user's selection of a target virtual object such as a UI element on the 2D planar virtual user interface. For example, with reference to FIG. 16, the user can select the weather application 1638, the coffee-making application 1636, etc. If the user does not select the target virtual object at block 2160, the user may continue actuating the user input device as shown in block 6150.

The wearable system can initiate a selection event or an interaction event on the selected virtual object. For example, the wearable system can provide a focus indicator on the selected virtual object. The wearable system can also present the VR/AR/MR scenes associated with the selected virtual object. For example, the wearable system can present the scenes 1700 (shown in FIG. 17) and 1800 (shown in FIG. 18) with which the user can interact.

At block 2180, the wearable system can determine whether the user has completed the selection event or the interaction event. If the wearable system determines that the user has finished interacting with the target virtual object, the process 2100 ends at block 2190. In some embodiments, at block 2190, the wearable system can switch the mode of the user interface control from hand gestures back to head pose.

Figure 22:
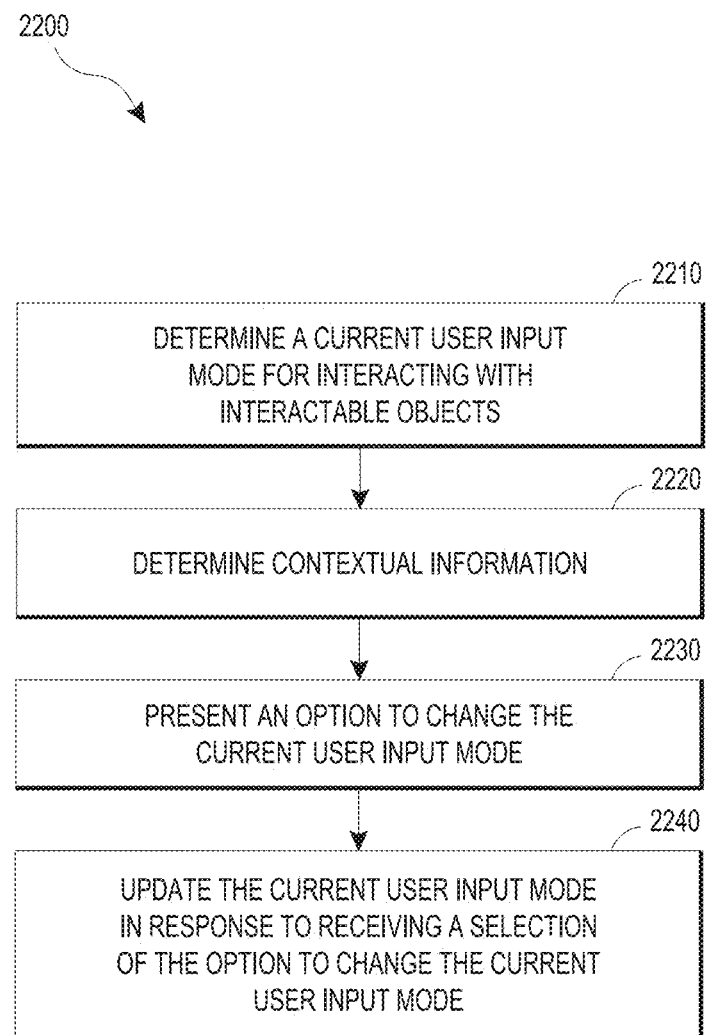
FIG. 22 illustrates an example process for switching a mode of user interaction based on contextual information.

FIG. 22 illustrates an example process for switching the mode of user interaction based on contextual information. The process 2200 can be performed by the wearable system described herein (e.g., by one or both of the processing modules 260, 270).

At block 2210, the wearable system can determine the current input mode which the user uses for interacting with interactable objects. The current input mode may be poses or hand gestures on the user input device.

At block 2220, the wearable system can determine contextual information such as the layout of the objects in the user's FOV, the density of the objects in the user's FOV, the characteristics (such as the size, the position, object types, etc.) of the objects in the user's FOV.

Based on the contextual information, wearable system can present an option to change the current user input mode at block 2230. For example, while the user is using head pose to interact with objects, the wearable system can present an option to change the user input mode to user input device when the wearable system identifies a dense group of objects in the user's direction of gaze. As another example, the wearable system can provide the option to change the current user input mode from the user input device to head pose when the wearable system determines that the objects are sparsely located.

As another example, the wearable system may allow the user to interact with a user interface plane (which may include other virtual objects) using poses while interacting with user interface elements (such as applications within the user interface plane) using a user input device. As a result, when the wearable system detects that the user has selected a user interface plane, the wearable system may change the user input mode from head pose to the user input device. On the other hand, when the user has finished interacting with a user interface element, the wearable system may change the user input mode from the user input device to the head pose.

In some implementations, the appearance of the focus indicators (including cursors) may be changed based on different user input modes. For example, the wearable system may use a reticle to indicate that the user is interacting with the objects using head pose, while use an arrow to indicate that the user is interacting with the object using user input device. In some implementations, the wearable system can change the appearance of the focus indicator to show that the option for switching the user input mode is available. For example, the wearable system may initially display reticle when the user is interacting with head pose. When the wearable system detects a dense group of objects, the wearable system may display an arrow (instead of the reticle) to indicate that the user can switch the user input mode to the user input device. However, when the user moves away from the dense group of objects, the wearable system may change the focus indicator from the arrow back to the reticle.

At block 2240, the user can select the option for a new user input mode. For example, the user can actuate the user input device to confirm that he wants to change the user input mode from head pose to hand gestures on the user input device. The wearable system can accordingly update the current user input mode to the newly selected mode. The wearable system may also update the focus indicator to the one associated with the newly selected mode.

Figure 23:
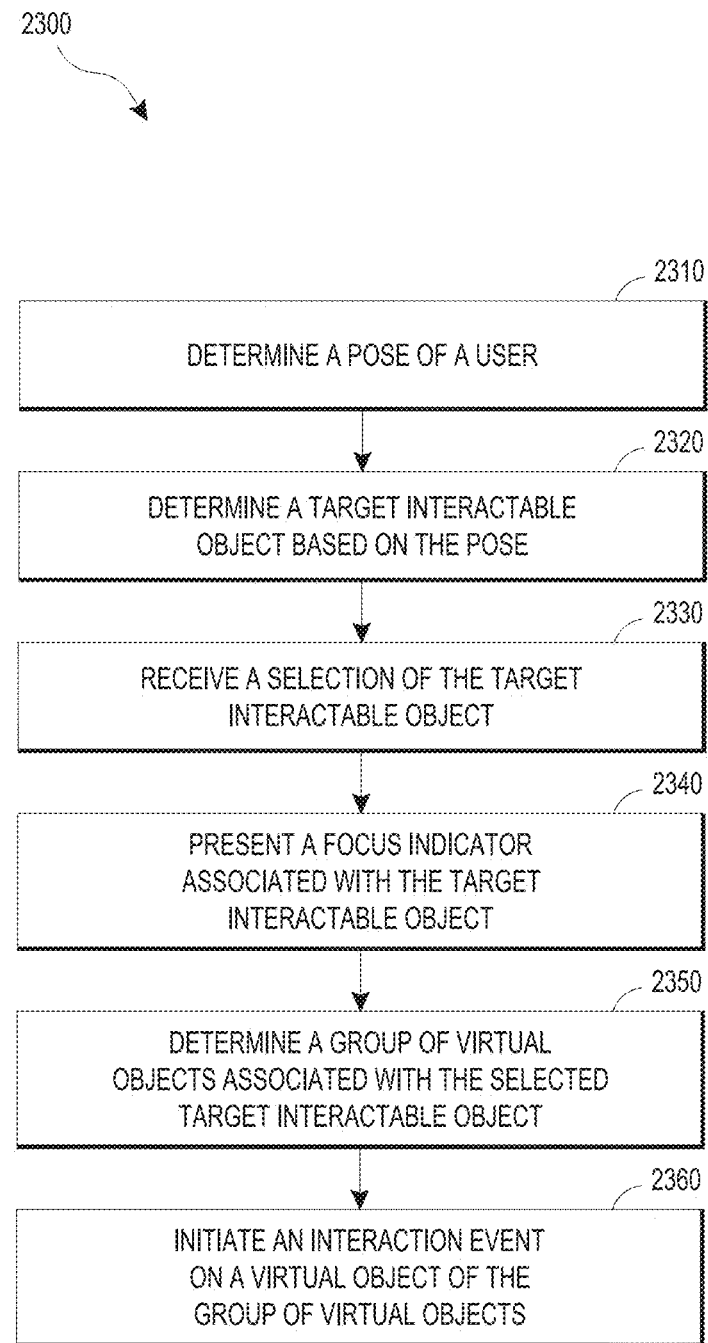
FIG. 23 illustrates an example process of interacting with an interactable object which comprises a group of virtual objects.

FIG. 23 illustrates an example process of interacting with an interactable object which comprises a group of virtual objects. The process 2300 can be performed by the wearable system described herein (e.g., by one or both of the processing modules 260, 270). The wearable system may include a user input device 466 (shown in FIG. 4), a light field display (described with reference to FIG. 2 or 4-6), various sensors such as the outward-facing imaging system 464 (shown in FIG. 4) and the inward-facing imaging system 462 (shown in FIG. 4).

At block 2310, the wearable system determines a pose of a user. The pose may be the head, eye, foot, or other body poses, etc. The wearable system can determine the user's pose using a variety of sensors, such as e.g., the inward-facing imaging system 462, outward-facing imaging system 464 (such as FOV camera described with reference to FIG. 10), IMUs, etc.

The wearable system can determine a group of interactable objects in the user's FOR. For example, the wearable system can access a map of the user's environment which comprises information of the objects in the user's environment. At block 6230, the wearable system can determine a target interactable object from the group of the interactable objects. The target interactable object may be determined based on the user's pose. For example, the target interactable object may be the object which intersects with the user's direction of gaze. As the user's poses change, the target interactable object may also change.

At block 2330, the wearable system can receive a selection of the target interactable object. A user can select a target interactable object by actuating the user input device, changing poses, alone or in combination. As shown in block 2340, the wearable system can assign a focus indicator to the target interactable object after receiving the selection of the target interactable object (as shown in block 6250).

In some implementations, one or more virtual objects may further be displayed within the target interactable object. For example, a virtual user interface may include user interface elements such as a weather application, a video streaming application, and so on. At block 2350, the wearable system can determine a group of virtual objects associated with the selected target interactable objects. The user can interact with the group of virtual objects using head poses and hand gestures. For example, the user can select a virtual object in the group of virtual objects using poses or hand gestures. The user can also initiate an interaction event such as playing a video game, view VR/AR/MR scene, or other user interface interactions with the selected virtual object.

In some embodiments, the wearable system may change the mode of interactions from poses to the user input device when the user selects the target interactable object. For example, the user may initially target and select interactable objects in his environment using head poses. Once the user selects a target interactable object, the wearable system can change the input mode from head pose to user input device so that the user can interact with virtual objects in the target interactable object using a user input device. Once the user finishes interacting with the virtual object, the wearable system may change the input mode back to head pose so that the user can continue target and interact with other interactable objects in his environment. In certain implementations, the wearable system can provide an option for the user to switch the mode of input control. For example, if the user decides not to switch from head poses to hand gestures after selecting the target interactable object, the user can continue interacting with virtual objects in the target interactable object using head poses.

Additional User Interface Experiences/Additional Examples of AR and MR Visual Experiences As described above, a wearable system (such as a head-mounted display) can be configured to present 3D virtual objects superimposed on a physical world. For example, a user of the wearable device may be in a school gymnasium and perceives not only the local physical environment and physical objects (e.g., the gymnasium and students sitting or standing in the gymnasium) but also perceives virtual objects superimposed on the physical world (e.g., the school gymnasium). The virtual objects may include a jumping whale surrounded by splashing water. For example, the user can perceive an experience in which the whale appears from the floor of the school gymnasium, jumps partially across the gymnasium, lands back on the floor in a big splash of water, and then disappears. In this example the wearable system can determine dimensions of the region in the outside world that the wearer is viewing (e.g., in this example the size of the gymnasium) in order to display the images of the jumping whale so that they are perceived by the wearer as originating from a sub-region of the region (e.g., from the floor of the gymnasium in) and use the light field display described in FIGS. 4-6 so that the jumping whale and splashing water appear realistic and lifelike to the user. In some implementations, the wearable system can present to the user (e.g., via speakers 240 shown in FIG. 2) a sound of the jumping whale that accompanies the images displayed to the user. The AR system can (additionally or alternatively) display additional virtual content, such as text or graphics, on the scene viewed by the user. For example, the AR system could display information about whales (such as the type, age, habit of the whales, etc.) to the wearer before, during, or after the virtual whale appears to jump from the gymnasium floor.

As another example, a user of the wearable system may be in a retail market. The user can view real, physical people in the environment, as well as virtual content which include an image of an astronaut walking through the market. The virtual content may be superimposed within the FOV of the wearable system's display.

The wearable system can modify images of physical world and provide an MR experience to the user. For example, a user can see a physical flock of birds flying in a v-formation. An outward-facing imaging system (e.g. shown in FIG. 4) can capture this physical content and the wearable system can process it to identify that a flock of birds is flying in the v-formation. The wearable system can add to the flock or replace one (or more) of the birds with a virtual object (e.g., a dragon in this example) flying in or near the formation. As another example, the wearable system can add a virtual object (e.g. a virtual whale) hovering or flying over the beach to a user's view of a physical beach. The capability of light field displays to present realistic images as if appearing at different distances permits the wearable display system to present the image of the whale as being near to or far from the wearer. In some implementations, the wearable system can use shadow mapping techniques so that the virtual content appears to have a virtual shadow, which may also lend more realism to the virtual content displayed by the wearable system.

In some implementations, a user of the wearable system can perceive a sequence of virtual images in an AR/MR environment. For example, a user may be looking toward his cupped hands. A virtual object, such as a small elephant, may be displayed by the display of the wearable system so that the user perceives the virtual object as being within the user's cupped hands. The wearable system can use the outward-facing imaging system to image a region of environment such as the region including the wearer's hands (and any background past the hands). The wearable system can determine the distance to the wearer's hands so that the virtual content (e.g., the elephant) can be scaled so that the content appears at the appropriate size and distance in a particular sub-region (e.g., the hands) of the overall region being viewed. The wearable system can cause the scene to appear as if the wearer were holding the elephant in the wearer's hands. The elephant's position may change for each picture so that the elephant can appear closer to the user in the temporal sequence as compared to earlier in the temporal sequence. The imagery of the leaping elephant can be accompanied by sound (e.g., voices, music).

Additional Examples of Interacting with Virtual Objects

As an example of user interaction with a virtual user interface, a user of the wearable system can perceive and interact with virtual objects in a physical room where people are dancing. In this example, the user may be a disk jockey (DJ), and the wearable system can display to the DJ a virtual UI that can be manipulated by movements of the DJ's hands (e.g., gestures). The virtual UI can include virtual content that permits the DJ to interact with the UI. In this example, the virtual UI can be configured to be a DJ audio control system that can control the sound played to the dancers. The UI can include user input features such as dials (e.g., jog shuttle dials), switches, sliders, buttons, or turntables that can be adjusted by the DJ via gestures. The virtual UI can include output features such as sound level graphics or an equalizer. The output features can respond in real time as the sound levels or audio mix is changed by the DJ. The outward-facing imaging system of the wearable system can image the DJ's hands and arms to determine the DJ's gestures (e.g., hand or finger movements). In response to the determined gestures, the wearable system can adjust the audio, e.g., by increasing or decreasing the volume, fading or panning the music, mixing the music, and so forth.

As another example, a user of the wearable system can view an operating room with physicians operating on a patient. The wearable system can present to a user virtual content displaying patient anatomy or an organ (such as a heart) that is being operated on. The orientation and position of the virtual organ can be adjusted via gestures (e.g., via the wearer reaching out and grasping or moving the virtual image of the heart) or a user input device. The virtual organ can represent an idealization of a heart (e.g., a textbook image) or an actual image of the patient's heart (e.g., taken during surgery or pre-mapped prior to surgery). The light field display capability (described in FIGS. 4-6) of the wearable system permits the wearer to view a 3D image of the organ. In some implementations, the user need not be physically present in the environment (e.g. the operating) to interact with the objects (virtual and/or physical objects) in the environment. The user can interact with avatars of the physicians or the appearance of the operating room, such as, for example, by communicating with the physicians (e.g. via a speaker) or interacting with the virtual image of virtual organ.

The user can also view and interact with educational virtual content using the wearable system. In this example, the educational virtual content can include an avatar (e.g., a creature designed to be appealing and non-threatening to students) who is holding a pointer and pointing to graphics (e.g., numbers) that are displayed to the wearer as part of an educational lesson. An educational system in communication with the wearable system can generate and deliver educational virtual content to be presented to the wearer as part of an educational lesson. The virtual content can include text, images, video, graphics, and sound. For example, the avatar can be explaining an arithmetic lesson to students (e.g., what is 4 multiplied by 5 equal to?). In some cases, the wearable system includes a microphone that can receive sounds in the ambient environment, for example, voices of the students. The students can ask questions, the wearable system (or the educational system) can use voice recognition technologies to translate the questions to electronic format, and the educational system can communicate a response back to the wearable system. For example, the avatar could respond to a student's question by answering the question, pointing (e.g., with the wand) to different parts of the virtual content to explain the answer, and so forth.

In another AR experience, the user of the wearable system (such as a HMD) can view physical objects (e.g., another person and a house) as well as the virtual entertainment display. The virtual entertainment display shows a presentation of a sporting event (a basketball game in this example). The virtual entertainment display can present to the user of the wearable system information about the game being viewed or other games (e.g., scores, play-by-play commentary, game recap, player statistics, standings, etc.). The virtual entertainment display can appear to be 3D, which allows the user to move around the display to see different sides of the virtual entertainment display (which can display different content, different games, different sports, or even different entertainment genres (e.g., a movie) on different sides of the display). The sporting event may be presented to user in real-time as the sporting event is occurring. This provides the user the ability to interact with the sporting event even though the user is not physically present at the sporting event. A particular user may control the virtual entertainment display by using gestures or a user input device. In some cases, a single user has control of the virtual entertainment display, while other users can watch the action on the display but cannot alter the content being displayed. In other implementations, the virtual entertainment display can present content created or updated as a result of multiple users' actions.

Additional Example Interactions among Multiple Users

When a group of persons each wear a wearable device, a user can interact with another user in an AR/VR/MR environment. For example, people in the group can enjoy, interact with, share, or manipulate (e.g., via gestures) the virtual content (which can include images, video, sounds, text, etc.) via the wearable devices that they are wearing.

Such user interactions may take place in a virtual game. As the players engage each other in the game, the wearable device can present virtual content and sound to the user of the wearable device. In this example, a user can perceive a room with physical objects (e.g., a bed, tables, a window, and another player 404 of the game). The user can also perceive a fire-breathing dragon flying around the other player. One or both of the players may control the position, movements, and actions (e.g., whether it breathers fire) of the dragon by gestures (e.g., hand or arm gestures), totems (e.g., wands), or controllers or interfaces (physical or virtual). In some cases, the other player is not physically present in the room and is displayed to the user of the wearable device as being physically present (e.g. via telepresence). For example, the wearable device can present an avatar of the other player (such as in the form of a virtual child) as they play the game. The child avatar (and the dragon) can be generated by the wearable system or another gaming system and communicated to the wearable system for display to the wearer. The child avatar may be a representation of the actual appearance of the other player or may be selected as the form in which the other player chooses to be perceived by the user of the wearable. The other player can be a human player or a machine player. In other examples, more than one player can appear in the environment of the wearer (e.g., in the room, outside the room and looking through the window, etc.). The capabilities of a light field display (such as, e.g., the light field displays described with reference to FIGS. 4-6) to present images as if they were at different distances from the wearer (e.g., at different depth planes) can greatly enhance the realism and playability of the game. In addition to the dragon, the wearable device can optionally display other information (e.g., text or graphics) to the user (e.g., game play statistics or status).

As described with reference to FIG. 7, the wearable device can pass maps of physical or virtual environments as well as the objects in the environments to another wearable device. For example, the wearable device can pass the map of the user's room and the virtual objects in the room to another user's wearable device. Accordingly, the users can interact with virtual objects as if they are in the same environment.

Additional Embodiments

In a 1st aspect, a method for viewing virtual content, the method comprising: accessing region data relating to a region in a field of view of a user; analyzing the region data to identify a sub-region of the region where virtual content is going to be displayed; accessing or generating virtual content based in part on the region data and sub-region data; and displaying the virtual content such that when viewed by the user, the virtual content appears as if it were disposed in or on the sub-region of the region.

In a 2nd aspect, the method of aspect 1, wherein the identified sub-region comprises a physical object in the region.

In a 3rd aspect, the method of aspect 1 or aspect 2, wherein the region data is obtained from analyzing an image of the region in the field of view of the user.

In a 4th aspect, the method of any one of the aspects 1 to 3 wherein the virtual content is modified based in part on newly received region data or sub-region data.

In a 5th aspect, the method of any one of the aspects 1 to 4, further comprising: receiving user input; accessing or generating additional virtual content base at least in part on the user input; and displaying the additional virtual content.

In a 6th aspect, the method of any one of the aspects 1 to 5, wherein the sub-region comprises a portion of the region that is nearby the user.

In a 7th aspect, a method for interacting with virtual content, the method comprising: accessing or generating virtual content; displaying the virtual content in a field of view of a user; displaying a virtual user interface associated with the virtual content; receiving a user input; associating the user input with a function associated with a user input feature of the virtual user interface; and performing the function.

In an 8th aspect, the method of aspect 7, further comprising manipulating or modifying the virtual content based in part on the received user input.

In a 9th aspect, the method of any one of the aspects 7 to 8, wherein the user input is a gesture.

In a 10th aspect, the method of any one of the aspects 7 to 9, wherein the user input is a movement of a user's eye.

In an 11th aspect, the method of any one of the aspects 7 to 10, wherein the virtual content comprises educational content or entertainment content.

In a 12th aspect, the method of any one of the aspects 7 to 11, wherein the virtual content or the virtual user interface appears to be three-dimensional when perceived by the user.

In a 13th aspect, the method of any one of the aspects 7 to 12, wherein the user input feature of the virtual user interface comprises a dial, a switch, a slider, or a button.

In a 14th aspect, the method of any one of the aspects 7 to 13, wherein the virtual user interface comprises an output feature configured to display information relating to a functionality of the virtual user interface.

In a 15th aspect, the method of aspect 14, wherein the output feature is updated in real time.

In a 16th aspect, a method of displaying information in an augmented reality environment, the method comprising: determining a location of a user; identifying a physical object in a field of view of the user; accessing or generating, based at least in part on the location or the identified physical object, information related to the identified physical object; generating virtual content based on the information; and displaying the virtual content such that the information appears to the user to be associated with the physical object.

In a 17th aspect, the method of aspect 16, wherein the virtual content comprises text, an image, a graphic, or a video.

In an 18th aspect, the method of aspect 16 or aspect 17, further comprising playing an audio associated with the displayed virtual content.

In a 19th aspect, the method of any one of the aspects 16 to 18, further comprising displaying additional virtual content based at least in part on a user input.

In a 20th aspect, the hardware processor programmed with executable instructions such that, when the instructions are executed, the hardware processor performs the method of any one of the aspects 1 to 19.

In a 21st aspect, a wearable display system comprising: the hardware processor of aspect 20; and a display configured to provide an image to an eye of a user of the wearable display system.

In a 22nd aspect, the wearable display system of aspect 21, wherein the display comprises a light field display.

In a 23rd aspect, the wearable display system of aspect 21 or aspect 22, wherein the display is configured to display images at multiple depth planes.

In a 24th aspect, the wearable display system of any one of the aspects 21 to 23, further comprising an image capture device configured to capture an image of a region comprising physical objects, wherein the wearable display system is configured to display virtual content that is perceived by a user to be associated with one or more of the physical objects.

In a 25th aspect, a method for selecting a virtual object located in three-dimensional (3D) space, the method comprising: under control of an augmented reality (AR) system comprising computer hardware, the AR system configured to permit user interaction with interactable objects in a field of regard (FOR) of a user, the FOR comprising a portion of the environment around the user that is capable of being perceived by the user via the AR system: determining a group of interactable objects in the FOR of the user; determining a pose of the user; determining a field of view (FOV) of the user based at least partly on the pose of the user, the FOV comprising a portion of the FOR that is perceived at a given time by the user; updating, based on a change in the pose or the FOV of the user, a subgroup of the interactable objects that are located in the FOV of the user; receiving a selection of a target interactable object from the subgroup of interactable objects; and initiating a selection event on the target interactable object.

In a 26th aspect, the method of aspect 25, further comprising storing the group of interactable objects in a data structure.

In a 27th aspect, the method of aspect 26, wherein each interactable object in the group of interactable objects is represented in the data structure based at least in part on a location of the interactable object in the FOV of the user.

In a 28th aspect, the method of aspect 27, wherein the location comprises a distance from an edge of the FOV of the user.

In a 29th aspect, the method of aspect 25, wherein receiving the selection of the target interactable object from the subgroup of interactable objects comprises: receiving a first input from a user device; and in response to the first input, identifying the target interactable object from the subgroup of the interactable objects.

In a 30th aspect, the method of aspect 25, further comprising: receiving a second input from the user device; and in response to the second input, initiating an interaction event on the target interactable object.

In a 31st aspect, the method of aspect 30, wherein the target interactable object is the interactable object in the subgroup of interactable objects that is closest to a midpoint of the user's FOV.

In a 32nd aspect, the method of aspect 30, wherein the target interactable object is a leftmost or a rightmost interactable object in the subgroup of interactable objects in the user's FOV.

In a 33rd aspect, the method of any one of the aspects 30-32, wherein initiating an interaction event comprises one or more of the following: resizing the target interactable object; displaying a menu of the target interactable object; browsing the menu of the target interactable object; selecting a first item on the menu; searching for a second item in a database; playing a video game associated with the target interactable object; watching a video; or conducting a teleconference.

In a 34th aspect, the method of aspect 25, wherein receiving the selection of the target interactable object is performed by: determining a path of the user's gaze based on the pose of the user; and selecting an object which intersects the path of the user's gaze as the target interactable object.

In a 35th aspect, the method of any one of the aspects 25-34, further comprising assigning a visible focus indicator to the target interactable object.

In a 36th aspect, the method of aspect 35, wherein the visible focus indicator comprises a highlight, a halo aura, a color change, a size change, or a change in a perceived depth of the target interactable object.

In a 37th aspect, the method of aspect 25, wherein initiating a selection event comprises one or more of the following: changing the target interactable object to a different interactable object that becomes the target interactable object; opening a menu associated with the target interactable object; or receiving a confirmation from user to select the target interactable object.

In a 38th aspect, the method of any one of the aspects 25-37, wherein the group of interactable objects comprises virtual objects.

In a 39th aspect, the method of any one of the aspects 25-38, wherein the pose of the user comprises an eye pose.

In a 40th aspect, the method of any one of the aspects 25-39, wherein the pose of the user comprises a head pose.

In a 41st aspect, an augmented reality (AR) system for selecting a virtual object located in three-dimensional (3D) space, the system comprising: a display system; a network interface; computer processors configured to communicate with the network interface and the display system to: determine a group of interactable objects in the FOR of a user; determine a pose of the user; determine a field of view (FOV) of the user based at least partly on the pose of the user, the FOV comprising a portion of the FOR that is perceived at a given time by the user; update, based on a change in the pose or the FOV of the user, a subgroup of the interactable objects that are located in the FOV of the user; receive a selection of a target interactable object from the subgroup of interactable objects; and initiate a selection event on the target interactable object.

In a 42nd aspect, the system of aspect 41, wherein the computer processors are further configured to store the group of interactable objects in a data structure.

In a 43rd aspect, the system of aspect 42, wherein one or more interactable objects in the group of interactable objects is represented in the data structure based at least in part on a location of the interactable object in the FOV of the user.

In a 44th aspect, the system of aspect 43, wherein the location comprises a distance from an edge of the FOV of the user.

In a 45th aspect, the system of any one of the aspects 41-44, wherein the computer processor configured to receive the selection of the target interactable object from the subgroup of interactable objects comprises: receive a first input from a user device; and in response to the first input, identify the target interactable object from the subgroup of the interactable objects.

In a 46th aspect, the system of any one of the aspects 41-45, wherein the target interactable object is the interactable object in the subgroup of interactable objects that is closest to a midpoint of the user's FOV.

In a 47th aspect, the system of any one of the aspects 41-45, wherein the target interactable object is a leftmost or a rightmost interactable object in the subgroup of interactable objects in the user's FOV.

In a 48th aspect, the system of the aspects 41-47, wherein the computer processor configured to receive the selection of the target interactable object from the subgroup of interactable objects comprises: determine a path of the user's gaze based on the pose of the user; and select an object which intersects the path of the user's gaze as the target interactable object.

In a 49th aspect, the system of any one of the aspects 41-48, wherein the computer processor is further configured to assign a visible focus indicator to the target interactable object.

In a 50th aspect, the system of aspect 49, wherein the visible focus indicator comprises a highlight, a halo aura, a color change, a size change, or a change in a perceived depth of the target interactable object.

In a 51st aspect, the system of the aspects 41-50, wherein the computer processor configured to initiate a selection event comprises one or more of the following: change the target interactable object to a different interactable object that becomes the target interactable object; open a menu associated with the target interactable object; or receive a confirmation from user to select the target interactable object.

In a 52nd aspect, the method of any one of the aspects 41-51, wherein the group of interactable objects comprises virtual objects.

In a 53rd aspect, the method of any one of the aspects 41-52, wherein the pose of the user comprises an eye pose.

In a 54th aspect, the method of any one of the aspects 51-53, wherein the pose of the user comprises a head pose.

In a 55th aspect, a system for interacting with virtual objects in a three-dimensional (3D) space, the system comprising: an augmented reality display, for displaying a plurality of interactable objects; a user input device; one or more sensors configured to determine a pose of a user; one or more processors, wherein the one or more processors are configured to switch between a first user input mode and a second user input mode for selecting virtual objects, the first user input mode based at least partly on the pose of the user, the second user input mode based at least partly on signals from the user input device, and the one or more processors are further configured to: while the system is operating in the first user input mode: monitor the pose of the user; display, based at least partly on the monitored pose, a first focus indicator associated with the first user input mode in a direction related to the pose of the user; receive an indication to switch to the second user input mode, wherein, the indication further indicates selection of a target interactable object; and while the system is operating in the second user input mode: monitor user input from the user input device; and display, based at least partly on the monitored user input, a second focus indicator associated with the second user input mode.

In a 56th aspect, the system of aspect 55, wherein the first focus indicator comprises a cursor in a first shape and the second focus indicator comprises the cursor in a second shape.

In a 57th aspect, the system of aspect 56, wherein the first shape comprises a reticle and the second shape comprises an arrow.

In a 58th aspect, the system of aspect 55, wherein the one or more processors are further configured to: determine contextual information associated with the location of the first focus indicator or the second focus indicator; and display an option for switching to a different user input mode based at least partly on the contextual information.

In a 59th aspect, the system of any one of the aspects 55-58, the target interactable object comprises one or more virtual objects.

In a 60th aspect, the system of any one of the aspects 55-59, wherein the pose of the user comprises at least one of the following: head pose, eye pose, or body pose.

In a 61st aspect, the system of any one of the aspects 55-60, wherein the user input device is a thumb pad, trackpad, d-pad, or touch screen.

In a 62nd aspect, a method for selecting an interactable object located in three-dimensional (3D) space, the method comprising: under control of an augmented reality (AR) system comprising computer hardware, the AR system configured to permit user interaction with interactable object in a field of regard (FOR) of a user, the FOR comprising a portion of the environment around the user that is capable of being perceived by the user via the AR system, the AR system further comprising a user input device: determining a group of interactable objects associated with virtual objects in the FOR of the user; determining a pose of the user; determining a target interactable object from among the group of interactable objects based at least partly on the pose of the user; associating a focus indicator to the selected target interactable object; and initiating a selection event on the selected target surface based at least partly on the input of the user input device.

In a 63rd aspect, the method of aspect 62, wherein determining a target interactable object is performed by a ray casting.

In a 64th aspect, the method of aspect 63, wherein the ray casting comprises casting a pencil ray.

In a 65th aspect, the method of aspect 63, wherein the ray casting comprises casting a ray with substantial transverse width.

In a 66th aspect, the method of aspect 62, wherein the focus indicator is visible to the user.

In a 67th aspect, the method of aspect 66, further comprising displaying the focus indicator to the user.

In a 68th aspect, the method of aspect 62, further comprising: determining a field of view (FOV) of the user based at least partly on the pose of the user, the FOV comprising a portion of the FOR that is perceived at a given time by the user; accessing contextual information of one or more interactable objects in the field of view (FOV); and providing one or more options for a user input mode based at least partly on the contextual information.

In a 69th aspect, the method of aspect 68, further comprising: receiving a selection of an option for the user input mode; determining a current user input mode; and updating the current user input mode to the selected option in response to a determination that the current user input mode is different from the selected option.

In a 70th aspect, the method of aspect 69, further comprising updating the focus indicator to indicate that the current user input mode has changed.

In a 71st aspect, the method of aspect 70, wherein the user input mode comprises one or more of the following: pose of the user or user input device.

In a 72nd aspect, the method of any one of the aspects 62-71, wherein the group of interactable objects comprises one or more virtual user interface planes.

In a 73rd aspect, the method of any one of the aspects 62-72, wherein the pose of the user comprises at least one of eye pose, head pose, or body pose.

In a 74th aspect, a method for interacting with virtual objects in a three-dimensional (3D) environment, the method comprising: under control of an augmented reality (AR) system comprising computer hardware, the AR system configured to permit user interaction with interactable object in a field of regard (FOR) of a user, the FOR comprising a portion of the environment around the user that is capable of being perceived by the user via the AR system, the AR system further comprising a user input device: determining a pose of a user; displaying a first focus indicator associated with a target interactable object in a direction related to the pose of the user, wherein the target interactable object comprises a plurality of virtual objects; receiving a selection of the target interactable object; displaying the plurality of virtual objects; displaying a second focus indicator associated with a target virtual object; updating the second focus indicator based at least partly on input from the user input device.

In a 75th aspect, the method of aspect 74, wherein the first focus indicator comprises a cursor in a first shape and the second focus indicator comprises the cursor in a second shape.

In a 76th aspect, the method of aspect 75, wherein the first shape comprises a reticle and the second shape comprises an arrow.

In a 77th aspect, the method of any one of the aspects 74-76, wherein the pose of the user comprises at least one of the following: head pose, eye pose, or body pose.

In a 78th aspect, the method of any one of the aspects 74-77, wherein the user input device is a thumb pad, trackpad, d-pad, or touch screen.

In a 79th aspect, a method for interacting with virtual objects in a three-dimensional (3D) space, the method comprising: under control of an augmented reality (AR) system comprising computer hardware, the AR system configured to permit user interaction with interactable object in a field of regard (FOR) of a user, the FOR comprising a portion of the environment around the user that is capable of being perceived by the user via the AR system, the AR system further comprising a user input device: while the AR system is operating in a first user input mode, wherein the first user input mode is based at least partly on a pose of the user: monitoring the pose of the user; displaying, based at least partly on the monitored pose, a first focus indicator associated with the first user input mode in a direction related to the pose of the user; receiving an indication to switch to the second user input mode, wherein, the indication further indicates selection of a target interactable object; and while the AR system is operating in the second user input mode, wherein the second user input mode is based at least partly on signals from the user input device: monitoring user input from the user input device; and displaying, based at least partly on the monitored user input, a second focus indicator associated with the second user input mode.

In an 80th aspect, the method of aspect 79, wherein the first focus indicator comprises a cursor in a first shape and the second focus indicator comprises the cursor in a second shape.

In an 81st aspect, the method of aspect 80, wherein the first shape comprises a reticle and the second shape comprises an arrow.

In an 82nd aspect, the method of aspect 79, further comprising: determine contextual information associated with the location of the first focus indicator or the second focus indicator; and display an option for switching to a different user input mode based at least partly on the contextual information.

In an 83rd aspect, the method of any one of the aspects 79-82, the target interactable object comprises one or more virtual objects.

In an 84th aspect, the method of any one of the aspects 79-83, wherein the pose of the user comprises at least one of the following: head pose, eye pose, or body pose.

In an 85th aspect, the method of any one of the aspects 79-84, wherein the user input device is a thumb pad, trackpad, d-pad, or touch screen.

In an 86th aspect, an augmented reality device comprising computer hardware programmed to perform the method of any one of the aspects 62-85.

In an 87th aspect, a system for changing a user input mode for a wearable device, the system comprising: a display system of a wearable device configured to present a three-dimensional (3D) view to a user, the 3D view comprising interactable objects; a user input device configured to receive a user input; a sensor configured to acquire data associated with a pose of the user; a hardware processor in communication with the user input device, the processor programmed to: determine whether a current user input mode for interacting with the interactable objects is a first user input mode or a second user input mode, wherein the first user input mode is based at least partly on the pose of the user and the second user input mode is based at least partly on the user input from the user input device; in response to a determination that the current user input mode is the first user input mode: monitor the pose of the user using the sensor; present via the display system, based at least partly on the monitored pose, a focus indicator in a first shape associated with the first user input mode in a direction related to the pose of the user; receive a first indication to switch to the second user input mode; and switch the current user input mode to the second user input mode in response the first indication; and in response to a determination that the current user input mode is the second user input mode: monitor the user input from the user input device; present via the display system, based at least partly on the monitored input, the focus indicator in the second shape associated with the second user input mode; receive a second indication to switch to the first user input mode; and switch the current user input mode to the first user input mode in response the second indication.

In an 88th aspect, the system of aspect 87, wherein the pose of the user comprises at least one of the following: a head pose, an eye pose, a foot pose, or a body pose, or wherein the sensor comprises at least one of: an inward-facing imaging system, an outward-facing imaging system, or an inertial measurement unit, or wherein the display system comprises a light field display configured to display one or more of the interactable objects at multiple depth planes.

In an 89th aspect, the system of any one of aspects 87-88, wherein the processor is further programmed to: determine a field of view (FOV) of the user based at least partly on the pose of the user, the FOV comprising a portion of an environment of the user that is perceived at a given time by the user; determine contextual information associated with the FOV wherein the contextual information comprises at least one of: a layout of the interactable objects in the FOV, a size of the FOV, a size of one or more of the interactable objects in the user's FOV; and present an option for switching from the first user input mode to the second user input mode or from the second user input mode to the first user input mode based at least partly on the contextual information.

In a 90th aspect, the system of aspect 89, wherein to present the option, the processor is programmed to present the focus indicator in the second shape when the current user input mode is in the first user input mode, and to present the focus indicator in the first shape when the current user input mode is in the second user input mode.

In a 91st aspect, the system of any one of aspects 87-90, wherein the first indication comprises a change in the pose of the user, and wherein the second indication comprises an actuation of the user input device.

In a 92nd aspect, a method for changing a user input mode for a wearable device, the method comprising: under control of a wearable device comprising a computer processor, the wearable device configured to permit user interaction with interactable objects in a field of regard (FOR) of a user, the FOR comprising a portion of an environment around the user that is capable of being perceived by the user via a display system of the wearable device: determining a pose of a user; displaying, via the display system, a first focus indicator associated with a target interactable object in a direction related to the pose of the user, wherein the target interactable object comprises a plurality of virtual objects; receiving a selection of the target interactable object; presenting an option to the user for switching the user input mode from poses to hand gestures on a user input device; displaying, via the display system, the plurality of virtual objects; displaying, via the display system, a second focus indicator associated with a target virtual object of the plurality of virtual objects in response to a determination that the user has switched the user input mode from poses to hand gestures on the user input device; and updating the second focus indicator based at least partly on a user input from the user input device.

In a 93rd aspect, the method of aspect 92, wherein the option is presented in response to the selection of the target interactable object or contextual information associated with the plurality of virtual objects or the target interactable object.

In a 94th aspect, the method of aspect 93, wherein the contextual information comprises a density of the plurality of virtual objects, wherein the option for switching the user input mode from poses to hand gestures on a user input device comprises is presented in response to a determination that density of the plurality of virtual object exceeds a threshold density.

In a 95th aspect, the method of any one of aspects 92-94, wherein the target virtual object is identified based at least partly on the pose of the user.

In a 96th aspect, the method of any one of aspects 92-95, wherein updating the second focus indicator comprises transporting the second focus indicator from the target virtual object to another virtual object of the plurality of virtual objects.

In a 97th aspect, the method of any one of aspects 92-96, further comprising initiating a selection event on the target virtual object, the selection event comprising at least one of opening a menu associated with the target virtual object or receiving an indication of selecting the target virtual object.

In a 98th aspect, the method of any one of aspects 92-97, wherein the plurality of virtual objects comprises at least one of a weather application or an astronomy application, wherein in response to a selection of the weather application, the wearable device is programmed to display virtual weather information superimposed on an object in the environment of the user, and wherein in response to a selection of the astronomy application, the wearable device is programmed to display an interactive planetary system comprising a three-dimensional virtual planet superimposed on the environment of the user.

In a 99th aspect, a wearable system for selecting a virtual object located in a three-dimensional (3D) space, the wearable system comprising: a display system configured to present virtual objects in a 3D space; a non-transitory data store configured to store interactable objects in the 3D space; a sensor configured to determine a pose of a user; and a hardware processor programmed to communicate with the display system, the data store, and the sensor to: determine the pose of the user based at least partly on data received from the sensor; determine a field of view (FOV) of the user based at least partly on the pose of the user, the FOV comprising a portion of an environment of the user that is perceived at a given time by the user; identify a group of interactable objects in the FOV; identify a target interactable object in the FOV based least partly on the pose of the user; and initiate a selection event associated with the target interactable object.

In a 100th aspect, the wearable system of aspect 99, wherein the group of interactable objects is stored in a data structure where an index associated with each interactable object is determined based at least partly on a position of the interactable object in the 3D space.

In a 101st aspect, the wearable system of any one of aspects 99-100, wherein in response to initiating a selection event on the target interactable object, the processor of the wearable system is programmed to presenting, in a two-dimensional (2D) interface, of virtual objects within a threshold range of the target interactable object in the 3D space.

In a 102nd aspect, the wearable system of aspect 101, wherein the 2D interface is interactable via a user input device.

In a 103rd aspect, the wearable system of any one of aspects 99-102, wherein to identify the target interactable object in the FOV, the processor is configured to perform at least one of: determining a path of a gaze of the user based on the pose of the user and select an interactable object which intersects the path of the gaze as the target interactable object; or selecting a leftmost or a rightmost interactable object in the user's FOV as the target interactable object, wherein the leftmost or the rightmost interactable object is selected based at least partly on indices associated with the group of interactable objects.

In a 104th aspect, the wearable system of any one of aspects 99-103, wherein the processor is configured to initiate the selection event in response to at least one of: receiving an input from a user input device or detecting a change of the pose of the user.

In a 105th aspect, the wearable system of any one of aspects 99-104, wherein the processor is further configured to present a focus indicator associated with the target interactable object.

In a 106th aspect, the wearable system of any one of aspects 99-105, further comprising a geolocation sensor configured to acquire data associated with a location of the user, and wherein the target interactable object comprises a weather application which is programmed to: determine the location of the user based on the data acquired by the geolocation sensor; communicate with a remote computing device to acquire weather data based on the location of the user; generate a virtual element associated with the weather data; and superimpose the virtual element in the 3D space of the user.

CONCLUSION

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one or more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for selecting an interactable object located in three-dimensional (3D) space, the method comprising:

under control of an augmented reality (AR) system comprising computer hardware, the AR system configured to permit user interaction with interactable object in a field of regard (FOR) of a user, the FOR comprising a portion of the environment around the user that is capable of being perceived by the user via the AR system, the AR system further comprising a user input device:

determining a group of interactable objects associated with virtual objects in the FOR of the user;

determining a pose of the user;

selecting a target interactable object from among the group of interactable objects based at least partly on the pose of the user;

associating a focus indicator to the selected target interactable object; and initiating a selection event on the selected target surface based at least partly on an input of the user input device.

2. The method of claim 1, wherein determining a target interactable object is performed by a ray casting.

3. The method of claim 2, wherein the ray casting comprises casting a pencil ray.

4. The method of claim 2, wherein the ray casting comprises casting a ray with substantial transverse width.

5. The method of claim 1, wherein the focus indicator is visible to the user.

6. The method of claim 5, further comprising displaying the focus indicator to the user.

7. The method of claim 1, further comprising: determining a field of view (FOV) of the user based at least partly on the pose of the user, the FOV comprising a portion of the FOR that is perceived at a given time by the user; accessing contextual information of one or more interactable objects in the field of view (FOV); and providing one or more options for a user input mode based at least partly on the contextual information.

8. The method of claim 7, further comprising: receiving a selection of an option for the user input mode; determining a current user input mode; and updating the current user input mode to the selected option in response to a determination that the current user input mode is different from the selected option.

9. The method of claim 8, further comprising updating the focus indicator to indicate that the current user input mode has changed.

10. The method of claim 9, wherein the user input mode comprises one or more of the following: pose of the user or user input device.

11. The method of claim 1, wherein the group of interactable objects comprises one or more virtual user interface planes.

12. The method of claim 1, wherein the pose of the user comprises at least one of eye pose, head pose, or body pose.

13. A method for interacting with virtual objects in a three-dimensional (3D) environment, the method comprising:

under control of an augmented reality (AR) system comprising computer hardware, the AR system configured to permit user interaction with interactable object in a field of regard (FOR) of a user, the FOR comprising a portion of the environment around the user that is capable of being perceived by the user via the AR system, the AR system further comprising a user input device:

determining a pose of a user;
displaying a first focus indicator associated with a target interactable object in a direction related to the pose of the user, wherein the target interactable object comprises a plurality of virtual objects;
receiving a selection of the target interactable object;
displaying the plurality of virtual objects;
displaying a second focus indicator associated with a target virtual object; and
updating the second focus indicator based at least partly on input from the user input device.

14. The method of claim 13, wherein the first focus indicator comprises a cursor in a first shape and the second focus indicator comprises the cursor in a second shape.

15. The method of claim 14, wherein the first shape comprises a reticle and the second shape comprises an arrow.

16. The method of claim 13, wherein the pose of the user comprises at least one of the following: head pose, eye pose, or body pose.

17. The method of claim 13, wherein the user input device is a thumb pad, trackpad, d-pad, or touch screen.

* * * * *